US011825015B2

United States Patent
Shah et al.

(10) Patent No.: US 11,825,015 B2
(45) Date of Patent: *Nov. 21, 2023

(54) METHODS AND APPARATUS TO GENERATE AUDIENCE MEASUREMENT DATA FROM POPULATION SAMPLE DATA HAVING INCOMPLETE DEMOGRAPHIC CLASSIFICATIONS

(71) Applicant: The Nielsen Company (US), LLC, New York, NY (US)

(72) Inventors: Dipti Umesh Shah, Pleasanton, CA (US); Antonia Toupet, Sunnyvale, CA (US)

(73) Assignee: The Nielsen Company (US), LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/733,609

(22) Filed: Apr. 29, 2022

(65) Prior Publication Data

US 2022/0272204 A1 Aug. 25, 2022

Related U.S. Application Data

(63) Continuation of application No. 17/406,940, filed on Aug. 19, 2021, now Pat. No. 11,349,999, which is a (Continued)

(51) Int. Cl.
*H04M 15/00* (2006.01)
*H04N 21/442* (2011.01)
(Continued)

(52) U.S. Cl.
CPC ........ *H04M 15/8044* (2013.01); *H04H 60/37* (2013.01); *H04H 60/66* (2013.01);
(Continued)

(58) Field of Classification Search
None
See application file for complete search history.

(56) References Cited

U.S. PATENT DOCUMENTS 5,481,294 A 1/1996 Thomas et al.
6,108,637 A 8/2000 Blumenau
(Continued)

OTHER PUBLICATIONS

United States Patent and Trademark Office, "Notice of Allowance and Fees Due," issued in connection with U.S. Appl. No. 17/362,520, dated Aug. 5, 2022, 12 pages.
(Continued)

*Primary Examiner* — James R Marandi

(57) ABSTRACT

Methods and apparatus to generate audience measurement data from population sample data having incomplete demographic classifications are disclosed. An example method includes detecting that a number of impressions a time segment of a video occurred based on messages; detecting that no impressions for the time segment of the video were detected by the database proprietor; determining respective percentages of exposures of the video that are attributable to corresponding ones of multiple demographic groups, determining the respective percentages being based on the first demographic information provided by the database proprietor for exposures of other time segments of the video; attributing respective portions of the number of impressions to the demographic groups based on the respective percentages to determine imputed numbers of impressions; generating adjusted numbers of impressions based on the imputed numbers of impressions; and determining ratings information for the video using the adjusted numbers of impressions.

21 Claims, 23 Drawing Sheets

Related U.S. Application Data continuation of application No. 16/900,485, filed on Jun. 12, 2020, now Pat. No. 11,102,357, which is a continuation of application No. 16/291,801, filed on Mar. 4, 2019, now Pat. No. 10,694,045, which is a continuation of application No. 16/003,720, filed on Jun. 8, 2018, now Pat. No. 10,237,419, which is a continuation of application No. 14/757,416, filed on Dec. 23, 2015, now Pat. No. 10,045,057.

(51) Int. Cl.
  *H04N 21/845* (2011.01)
  *H04N 21/258* (2011.01)
  *H04H 60/37* (2008.01)
  *H04H 60/66* (2008.01)
  *H04N 21/25* (2011.01)
  *H04N 21/266* (2011.01)
  *H04N 21/426* (2011.01)
  *H04N 21/61* (2011.01)
  *H04N 21/658* (2011.01)
  *H04L 61/5084* (2022.01)
  *H04L 9/00* (2022.01)
  *H04M 7/00* (2006.01)
  *G06Q 30/0201* (2023.01)
  *H04H 60/33* (2008.01)
  *G06Q 30/02* (2023.01)
  *H04L 101/38* (2022.01)

(52) U.S. Cl.
  CPC ............ *H04L 9/50* (2022.05); *H04L 61/5084* (2022.05); *H04M 7/0012* (2013.01); *H04M 15/8055* (2013.01); *H04M 15/82* (2013.01); *H04M 15/8351* (2013.01); *H04M 15/84* (2013.01); *H04M 15/85* (2013.01); *H04M 15/851* (2013.01); *H04N 21/251* (2013.01); *H04N 21/25808* (2013.01); *H04N 21/25883* (2013.01); *H04N 21/26603* (2013.01); *H04N 21/42684* (2013.01); *H04N 21/44204* (2013.01); *H04N 21/44226* (2020.08); *H04N 21/6125* (2013.01); *H04N 21/6582* (2013.01); *H04N 21/8456* (2013.01); *G06Q 30/02* (2013.01); *G06Q 30/0201* (2013.01); *H04H 60/33* (2013.01); *H04L 2101/38* (2022.05); *H04M 15/852* (2013.01); *H04N 21/258* (2013.01)

(56) References Cited

U.S. PATENT DOCUMENTS

| | | | |
|---|---|---|---|
| 6,647,548 | B1 | 11/2003 | Lu et al. |
| 6,654,411 | B1 | 11/2003 | Roberts et al. |
| 7,333,439 | B2 | 2/2008 | Itoh et al. |
| 7,421,510 | B2 | 9/2008 | Padmanabhan et al. |
| 7,729,381 | B2 | 6/2010 | Savoor et al. |
| 7,924,739 | B2 | 4/2011 | Sen et al. |
| 7,933,392 | B1 | 4/2011 | Hannan et al. |
| 8,270,314 | B2 | 9/2012 | Finn et al. |
| 8,370,489 | B2 | 2/2013 | Mazumdar et al. |
| 8,688,524 | B1 | 4/2014 | Ramalingam et al. |
| 8,843,626 | B2 | 9/2014 | Mazumdar et al. |
| 9,237,339 | B1 | 1/2016 | Bordner-Babayigit et al. |
| 10,045,057 | B2 | 8/2018 | Shah et al. |
| 10,237,419 | B2 | 3/2019 | Shah et al. |
| 10,332,158 | B2 | 6/2019 | Sullivan et al. |
| 10,694,045 | B2 | 6/2020 | Shah et al. |
| 11,055,752 | B2 | 7/2021 | Sullivan et al. |
| 11,102,357 | B2 | 8/2021 | Shah et al. |
| 11,349,999 | B2 | 5/2022 | Shah et al. |
| 2002/0010919 | A1 | 1/2002 | Lu et al. |
| 2008/0075103 | A1 | 3/2008 | Noble et al. |
| 2011/0158112 | A1 | 6/2011 | Finn et al. |
| 2012/0072469 | A1 | 3/2012 | Perez et al. |
| 2012/0143713 | A1 | 6/2012 | Dittus et al. |
| 2012/0158954 | A1 | 6/2012 | Heffernan et al. |
| 2013/0035980 | A1 | 2/2013 | Verma et al. |
| 2013/0046615 | A1 | 2/2013 | Liyanage |
| 2013/0332604 | A1 | 12/2013 | Seth et al. |
| 2014/0003263 | A1 | 1/2014 | Sheriff |
| 2014/0003342 | A1 | 1/2014 | Sheriff et al. |
| 2014/0095702 | A1 | 4/2014 | Kalus et al. |
| 2014/0108130 | A1 | 4/2014 | Vos et al. |
| 2014/0156761 | A1 | 6/2014 | Heffernan et al. |
| 2014/0269850 | A1 | 9/2014 | Abdelmonem et al. |
| 2014/0279074 | A1 | 9/2014 | Chen et al. |
| 2014/0324544 | A1 | 10/2014 | Donato et al. |
| 2014/0337104 | A1 | 11/2014 | Splaine et al. |
| 2015/0019322 | A1 | 1/2015 | Alla et al. |
| 2015/0193816 | A1 | 7/2015 | Toupet et al. |
| 2015/0262207 | A1 | 9/2015 | Rao et al. |
| 2017/0091834 | A1 | 3/2017 | Sullivan et al. |
| 2018/0332177 | A1 | 11/2018 | Shah et al. |
| 2019/0378177 | A1 | 12/2019 | Sullivan et al. |
| 2021/0385336 | A1 | 12/2021 | Shah et al. |

OTHER PUBLICATIONS

United States Patent and Trademark Office, "Notice of Allowance and Fee(s) Due," issued in connection with U.S. Appl. No. 16/450,457, dated Mar. 2, 2021, 10 pages.

United States Patent and Trademark, "Corrected Notice of Allowability," issued in connection with U.S. Appl. No. 14/757,416, dated Jul. 11, 2018, 5 pages.

United States Patent and Trademark, "Notice of Allowance and Fee(s) Due," issued in connection with U.S. Appl. No. 14/757,416, dated Feb. 6, 2018, 8 pages.

United States Patent and Trademark, "Non-Final Office Action," issued in connection with U.S. Appl. No. 14/757,416, dated Sep. 21, 2017, 15 pages.

United States Patent and Trademark, "Final Office Action," issued in connection with U.S. Appl. No. 14/757,416, dated Jul. 13, 2017, 15 pages.

United States Patent and Trademark, "Non-Final Office Action," issued in connection with U.S. Appl. No. 14/757,416, dated Jan. 17, 2017, 13 pages.

United States Patent and Trademark, "Final Office Action," issued in connection with U.S. Appl. No. 14/864,416, dated May 23, 2018, 23 pages.

United States Patent and Trademark, "Non-Final Office Action," issued in connection with U.S. Appl. No. 14/864,416, dated Oct. 17, 2017, 16 pages.

United States Patent and Trademark, "Advisory Action," issued in connection with U.S. Appl. No. 14/864,416, dated Aug. 31, 2018, 4 pages.

United States Patent and Trademark, "Notice of Allowance and Fee(s) Due," issued in connection with U.S. Appl. No. 16/003,720, dated Nov. 1, 2018, 8 pages.

United States Patent and Trademark, "Non-Final Office Action," issued in connection with U.S. Appl. No. 16/291,801, dated Sep. 18, 2019, 8 pages.

United States Patent and Trademark, "Notice of Allowance and Fee(s) Due," issued in connection with U.S. Appl. No. 16/291,801, dated Feb. 19, 2020, 8 pages.

United States Patent and Trademark Office, "Notice of Allowability," issued in connection with U.S. Appl. No. 16/900,485, dated Apr. 19, 2021, 5 pages.

United States Patent and Trademark Office, "Non-Final Office Action," issued in connection with U.S. Appl. No. 16/450,457, dated Sep. 24, 2020, 9 pages.

Lodish et al., "How T.V. Advertising Works: A Meta-Analysis of 389 Real World Split Cable T.V. Advertising Experiments," Journal of Marketing Research, vol. 32, No. 2, May 1995, pp. 125-139, 16 pages.

(56) References Cited

OTHER PUBLICATIONS

United States Patent and Trademark Office, "Notice of Allowance and Fee(s) Due," issued in connection with U.S. Appl. No. 17/406,940, dated Feb. 16, 2022, 8 pages.

United States Patent and Trademark, "Notice of Allowance and Fee(s) Due," issued in connection with U.S. Appl. No. 14/864,416, dated Feb. 6, 2019, 10 pages.

United States Patent and Trademark Office, "Notice of Allowance and Fee(s) Due," issued in connection with U.S. Appl. No. 16/900,485, dated Mar. 31, 2021, 17 pages.

United States Patent and Trademark Office, "Supplemental Notice of Allowability," issued in connection with U.S. Appl. No. 16/450,457, dated Apr. 9, 2021, 7 pages.

United States Patent and Trademark Office, "Notice of Allowability," issued in connection with U.S. Appl. No. 16/900,485, dated Apr. 14, 2021, 5 pages.

United States Patent and Trademark Office, "Non-Final Office Action," issued in connection with U.S. Appl. No. 17/362,520, dated Apr. 12, 2022, 11 pages.

FIG. 6 (600)

| Dist. | Prog. | Ep. | Segment | Min Watched | Demo | UA (from DP) | Gender UA Distr | Imp (from DP) | Gender Imp. Distr | Redist UA | Redist Imp |
|---|---|---|---|---|---|---|---|---|---|---|---|
| Distr1 | Pr1 | Ep1 | V_1_00000 | N/A | D1 = M12+ | 100 | 54.1% | 110 | 53.7% | 111 | 126 |
|  |  |  |  |  | D2 = F12+ | 85 | 45.9% | 95 | 46.3% | 94 | 109 |
|  |  |  |  |  | Unknown Gender 12+ | 20 |  | 30 |  |  |  |
|  |  |  |  |  | Total | 205 |  | 235 |  | 205 | 235 |
| Distr1 | Pr1 | Ep1 | D_1_10000 | 1 | D1 = M12+ | 100 | 54.1% | 110 | 53.7% | 111 | 126 |
|  |  |  |  | 1 | D2 = F12+ | 85 | 45.9% | 95 | 46.3% | 94 | 109 |
|  |  |  |  | 1 | Unknown Gender 12+ | 20 |  | 30 |  |  |  |
|  |  |  |  | 1 | Total | 205 |  | 235 |  | 205 | 235 |

FIG. 8 (800)

| Distributor | Program | Episode | Demo | Unique Audience (UA) (from DP, deduplicated across all segments) | Gender UA Distr | Redistributed UA |
|---|---|---|---|---|---|---|
| Distr1 | Pr1 | Ep1 | D1 = M12+ | 105 | 54.7% | 116 |
| Distr1 | Pr1 | Ep1 | D2 = F12+ | 87 | 45.3% | 96 |
| Distr1 | Pr1 | Ep1 | Unknown Gender 12+ | 20 |  |  |
| Distr1 | Pr1 | Ep1 | Total | 212 |  | 212 |

| Distributor | Program | Demo | UA (from DP, deduplicated across all episodes) | Gender UA Distr | Redistributed UA |
|---|---|---|---|---|---|
| Distr1 | Pr1 | D1 = M12+ | 125 | 38.5% | 133 |
| Distr1 | Pr1 | D2=F12+ | 200 | 61.5% | 212 |
| Distr1 | Pr1 | Unknown Gender 12+ | 20 | | |
| Distr1 | Pr1 | Total | 345 | | 345 |

FIG. 9

| Distributor | Demo | UA (from DP, deduplicated across all programs) | Gender UA Distr | Redistributed UA |
|---|---|---|---|---|
| Distr1 | D1 = M12+ | 250 | 45.5% | 259 |
| Distr1 | D2=F12+ | 300 | 54.5% | 311 |
| Distr1 | Unknown Gender 12+ | 20 | | |
| Distr1 | Total | 570 | | 570 |

FIG. 10

| Distr | Prog | Ep | Segment | Min Watched | Demo | UA (from DP, after Gender Redist) | Imp (from DP after Gender Redist) |
|---|---|---|---|---|---|---|---|
| Distr1 | Pr1 | Ep1 | I_1_00000 | | N/A | | |
| Distr1 | Pr1 | Ep1 | V_1_00000 | N/A | D1 | 111 | 126 |
| | | | | | D2 | 94 | 109 |
| | | | | | Total | 205 | 235 |
| Distr1 | Pr1 | Ep1 | D_1_10000 | 1 | D1 | 111 | 126 |
| | | | | 1 | D2 | 94 | 109 |
| | | | | 1 | Total | 205 | 235 |
| Distr1 | Pr1 | Ep1 | D_1_01111 | 4 | D1 | 60 | 70 |
| | | | | 4 | D2 | 35 | 45 |
| | | | | 4 | Total | 95 | 115 |
| Distr1 | Pr1 | Ep1 | D_1_01010 | 2 | D1 | x | x |
| | | | | 2 | D2 | x | x |
| | | | | 2 | Total | x | x |
| Distr1 | Pr1 | Ep2 | D_3_11111 | 5 | D1 | 55 | 75 |
| | | | | 5 | D2 | 70 | 77 |
| | | | | 5 | Total | 125 | 152 |
| Distr1 | Pr1 | Ep1 | D_2_11111 | 5 | D1 | 35 | 35 |
| | | | | 5 | D2 | 40 | 42 |
| | | | | 5 | Total | 75 | 77 |

FIG. 12A

| Imp (from SC) | UA Adj Factor (at site / dist level) | Adj UA | Adj Imps | Imp Scaling Factor | Adj & Scaled Imps | Adj & Scaled Duration |
|---|---|---|---|---|---|---|
| 350 | | | | | | N/A |
| | 0.60 | 185 | 210 | | 113 | 113 |
| | 0.40 | 236 | 273 | | 147 | 147 |
| 260 | | | 483 | 0.54 | 260 | 260 |
| | 0.60 | 185 | 210 | | 113 | 113 |
| | 0.40 | 236 | 273 | | 147 | 147 |
| 260 | | | 483 | 0.54 | 260 | 260 |
| | 0.60 | 100 | 117 | | 68 | 272 |
| | 0.40 | 88 | 112 | | 65 | 260 |
| 133 | | | 229 | 0.58 | 133 | 532 |
| | 0.60 | x | x | x | x | x |
| | 0.40 | x | x | x | x | x |
| 20 | | | | | | |
| | 0.60 | 92 | 125 | | 84 | 419 |
| | 0.40 | 175 | 193 | | 129 | 646 |
| 213 | | | 318 | 0.67 | 213 | 1065 |
| | 0.60 | 58 | 58 | | 39 | 193 |
| | 0.40 | 100 | 105 | | 69 | 347 |
| 108 | | | 163 | 0.660161 | 108 | 540 |

| Distributor | Program | Episode | Demo | RedistUA (from DP, deduplicated across all segments) | Raw DP Exps. | Provider Freq | Adj & Scaled Exps. | Adj & Scaled Duration (in mins) | Adj & Scaled UA | Adj & Scaled Exps. Distribution Ratio | Adj & Scaled Duration Distribution Ratio |
|---|---|---|---|---|---|---|---|---|---|---|---|
| Distr1 | Pr1 | Ep1 | D1 | 116 | 141 | 1.22 | 130 | 1,254 | 107 | 41.85% | 40.19% |
|  |  |  | D2 | 96 | 129 | 1.34 | 180 | 1,865 | 134 | 58.15% | 59.81% |
|  |  | Total |  | 212 | 270 | 1.27 | 310 | 3,119 | 243 |  |  |
| Distr1 | Pr1 | Ep2 | D1 | 105 | 165 | 1.57 | 182 | 1,783 | 116 | 36.01% | 34.49% |
|  |  |  | D2 | 155 | 195 | 1.26 | 323 | 3,385 | 257 | 63.99% | 65.51% |
|  |  | Total |  | 260 | 360 | 1.38 | 505 | 5,168 | 365 |  |  |
| Distr1 | Pr2 | Ep1 | D1 | 96 | 119 | 1.24 | 132 | 1,332 | 107 | 37.78% | 37.85% |
|  |  |  | D2 | 113 | 130 | 1.15 | 218 | 2,187 | 190 | 62.22% | 62.15% |
|  |  | Total |  | 209 | 249 | 1.19 | 350 | 3,519 | 295 |  |  |
| Distr1 | Pr2 | Ep2 | D1 | 118 | 186 | 1.58 | 257 | 2,234 | 163 | 36.07% | 34.53% |
|  |  |  | D2 | 186 | 220 | 1.18 | 456 | 4,237 | 385 | 63.93% | 65.47% |
|  |  | Total |  | 304 | 406 | 1.34 | 713 | 6,471 | 533 |  |  |

FIG. 14

| Episode | Segment | Min Watched | Demo | UA (from DP) | Imp (from DP) | Imp (from SC) | Duration_SC (calculated) | Scaled Imps | Scaled Duration |
|---|---|---|---|---|---|---|---|---|---|
| Ep1 | D_1_01010 | 2 | D1 | N/A | N/A | | | N/A | 16 |
| | | 2 | D2 | | | | | | 24 |
| | | 2 | Total | | | 20 | 40 | | 40 |
| Ep1 | V_2_00000 | N/A | D1 | N/A | N/A | | N/A | 13 | N/A |
| | | | D2 | | | | | 17 | |
| | | | Total | | | 30 | | 30 | |
| Ep1 | D_2_10000 | 1 | D1 | N/A | N/A | | | N/A | 12 |
| | | 1 | D2 | | | | | | 18 |
| | | 1 | Total | | | 30 | 30 | | 30 |
| Ep1 | D_2_01111 | 4 | D1 | N/A | N/A | | | N/A | 40 |
| | | 4 | D2 | | | | | | 60 |
| | | 4 | Total | | | 25 | 100 | | 100 |

FIG. 16

| Dist | Prog | Ep | Demo | UA (from DP, deduplicated across all segments) | Exps. (sum of Imps across View pings) | Freq | Adj & Scaled Exps. (after Imputation) | Adj & Scaled Duration (in mins) | Adj & Scaled UA | Popul. Base | Episode Length | AMA (formula method) | Reach |
|---|---|---|---|---|---|---|---|---|---|---|---|---|---|
| Distr1 | Pr1 | Ep1 | D1 | 116 | 141 | 1.22 | 142 | 1,322 | 117 | 500 | | 8.81 | 23.39% |
| | | | D2 | 96 | 129 | 1.34 | 198 | 1,967 | 147 | 600 | | 10.93 | 24.56% |
| | | | Total | 212 | 270 | 1.27 | 340 | 3,289 | 267 | 1,100 | 30 | 9.97 | 24.27% |
| Distr1 | Pr1 | Ep2 | D1 | 105 | 165 | 1.57 | 189 | 1,821 | 120 | 500 | | 11.03 | 24.06% |
| | | | D2 | 155 | 195 | 1.26 | 336 | 3,457 | 267 | 600 | | 17.46 | 44.51% |
| | | | Total | 260 | 360 | 1.38 | 525 | 5,278 | 379 | 1,100 | 33 | 14.54 | 34.47% |
| Distr1 | Pr2 | Ep1 | D1 | 96 | 119 | 1.24 | 147 | 1,421 | 119 | 500 | | 11.36 | 23.80% |
| | | | D2 | 113 | 130 | 1.15 | 242 | 2,332 | 211 | 600 | | 15.55 | 35.10% |
| | | | Total | 209 | 249 | 1.19 | 389 | 3,753 | 327 | 1,100 | 25 | 13.65 | 29.75% |
| Distr1 | Pr2 | Ep2 | D1 | 118 | 186 | 1.58 | 277 | 2,362 | 175 | 500 | | 15.75 | 35.06% |
| | | | D2 | 186 | 220 | 1.18 | 491 | 4,480 | 414 | 600 | | 24.89 | 69.08% |
| | | | Total | 304 | 407 | 1.34 | 768 | 6,843 | 574 | 1,100 | 30 | 20.74 | 52.18% |

FIG. 18

| Dist | Prog | Demo | UA (from DP, deduplicated across all episodes) | Raw DP Exps. | Freq | Adjusted & Scaled Exps. | Adjusted & Scaled Duration (in mins) | Adjusted & Scaled UA | Popul. Base | Prog Length | AMA | Reach |
|---|---|---|---|---|---|---|---|---|---|---|---|---|
| Distr1 | Pr1 | D1 | 133 | 306 | 2.3 | 331 | 3,143 | 144 | 500 | | 9.98 | 28.73% |
| | | D2 | 212 | 324 | 1.5 | 534 | 5,424 | 350 | 600 | | 14.35 | 58.30% |
| | | Total | 345 | 630 | 1.8 | 865 | 8,567 | 474 | 1,100 | 63 | 12.36 | 43.06% |
| Distr1 | Pr2 | D1 | 175 | 305 | 1.7 | 424 | 3,783 | 243 | 500 | | 13.76 | 48.65% |
| | | D2 | 190 | 350 | 1.8 | 733 | 6,812 | 398 | 600 | | 20.64 | 66.28% |
| | | Total | 365 | 655 | 1.8 | 1,157 | 10,595 | 645 | 1,100 | 55 | 17.51 | 58.59% |
| Threshold | 0.75 | | | | | | | | | | | |
| Cap | 0.98 | | | | | | | | | | | |

FIG. 20

| Dist | Demo | UA (from DP, dedup across all progs.) | Raw DP Exps. | Freq | Adj & Scaled Exps. | Adj & Scaled Duration (in mins) | Adj & Scaled UA | Popul. Base | Episode Length | AMA | Reach |
|---|---|---|---|---|---|---|---|---|---|---|---|
| Distr1 | D1 | 259 | 611 | 2.36 | 755 | 6,925 | 320 | 500 | | 11.74 | 64.05% |
| | D2 | 311 | 674 | 2.17 | 1,267 | 12,237 | 584 | 600 | | 17.28 | 97.37% |
| 2102 | Total | 570 | 1,285 | 2.26 | 2,022 | 19,162 | 897 | 1,100 | 118 | 14.76 | 81.53% |
| Threshold | | 0.75 | 2022 | | | | | | | | |
| Cap | | 0.98 | 2032 | | | | | | | | |

FIG. 21

METHODS AND APPARATUS TO GENERATE AUDIENCE MEASUREMENT DATA FROM POPULATION SAMPLE DATA HAVING INCOMPLETE DEMOGRAPHIC CLASSIFICATIONS

RELATED APPLICATION

This patent arises from a continuation of U.S. patent application Ser. No. 17/406,940 (Now U.S. Pat. 11,349,999) which was filed on Aug. 19, 2021, which is a continuation of U.S. patent application Ser. No. 16/900,485 (Now U.S. Pat. 11,102,357), which was filed on Jun. 12, 2020, which is a continuation of U.S. patent application Ser. No. 16/291,801 (Now U.S. Pat. No. 10,694,045), which was filed on Mar. 4, 2019, which is a continuation of U.S. patent application Ser. No. 16/003,720 (Now U.S. Pat. No. 10,237,419), which was filed on Jun. 8, 2018, which is a continuation of U.S. patent application Ser. No. 14/757,416 (Now U.S. Pat. No. 10,045,057), which was filed on Dec. 23, 2015. U.S. patent application Ser. No. 17/406,940, U.S. patent application Ser. No. 16/900,485, U.S. patent application Ser. No. 16/291,801, U.S. patent application Ser. No. 16/003,720 and U.S. patent application Ser. No. 14/575,416 are hereby incorporated herein by reference in their entireties. Priority to U.S. patent application Ser. No. 17/406,940, U.S. patent application Ser. No. 16/900,485, U.S. patent application Ser. No. 16/291,801, U.S. patent application Ser. No. 16/003,720 and U.S. patent application Ser. No. 14/757,416 is hereby claimed.

FIELD OF THE DISCLOSURE

This disclosure relates generally to audience measurement, and, more particularly, to methods and apparatus to generate audience measurement data from population sample data having incomplete demographic classifications.

BACKGROUND

Traditionally, audience measurement entities determine compositions of audiences exposed to media by monitoring registered panel members and extrapolating their behavior onto a larger population of interest. That is, an audience measurement entity enrolls people that consent to being monitored into a panel and collects relatively highly accurate demographic information from those panel members via, for example, in-person, telephonic, and/or online interviews. The audience measurement entity then monitors those panel members to determine media exposure information identifying media (e.g., television programs, radio programs, movies, streaming media, etc.) exposed to those panel members. By combining the media exposure information with the demographic information for the panel members, and by extrapolating the result to the larger population of interest, the audience measurement entity can determine detailed audience measurement information such as media ratings, audience composition, reach, etc. This audience measurement information can be used by advertisers to, for example, place advertisements with specific media to target audiences of specific demographic compositions.

More recent techniques employed by audience measurement entities monitor exposure to Internet accessible media or, more generally, online media. These techniques expand the available set of monitored individuals to a sample population that may or may not include registered panel members. In some such techniques, demographic information for these monitored individuals can be obtained from one or more database proprietors (e.g., social network sites, multi-service sites, online retailer sites, credit services, etc.) with which the individuals subscribe to receive one or more online services. However, the demographic information available from these database proprietor(s) may be self-reported and, thus, unreliable or less reliable than the demographic information typically obtained for panel members registered by an audience measurement entity.

BRIEF DESCRIPTION OF THE DRAWINGS

FIG. 6 illustrates an example demographic redistribution of database proprietor demographic data at a time segment level.

FIG. 8 illustrates an example demographic redistribution of database proprietor demographic data at an episode level.

FIG. 9 illustrates an example demographic redistribution of database proprietor demographic data at a program level.

FIG. 10 illustrates an example demographic redistribution of database proprietor demographic data at a distributor level.

FIGS. 12A-12B illustrate an example adjustment of database proprietor demographic data for demographic misattribution and database proprietor non-coverage at the time segment level.

FIG. 14 illustrates an example adjustment of database proprietor demographic data for demographic misattribution and database proprietor non-coverage at the episode level.

FIG. 16 illustrates an example of demographic data for impressions for which the database proprietor provided incomplete demographic classifications.

FIG. 18 illustrates an example of ratings information at an episode level.

FIG. 20 illustrates an example of audience ratings data at a program level.

FIG. 21 illustrates an example of audience ratings data at a distributor level.

The figures are not to scale. Wherever appropriate, the same reference numbers will be used throughout the drawing(s) and accompanying written description to refer to the same or like parts.

DETAILED DESCRIPTION

Figure 1:
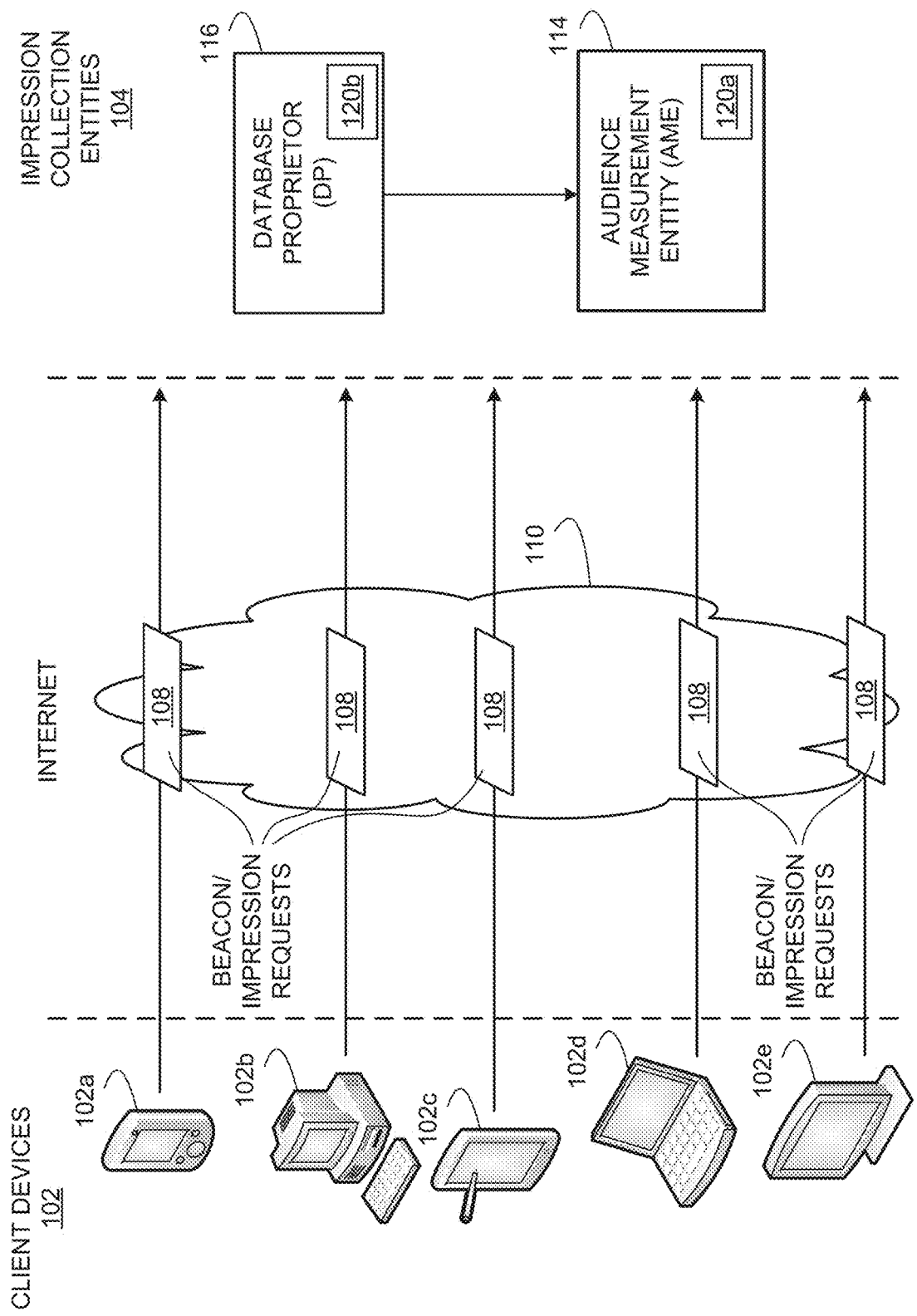
FIG. 1 illustrates example client devices that report audience and/or impressions for Internet-based media to impression collection entities to facilitate identifying numbers of impressions and sizes of audiences exposed to different Internet-based media.

In online audience measurement, collecting information about audiences and impressions from unknown viewers presents a risk of reporting biased demographic compositions in ratings information (e.g., average minute audience, exposures, duration, and unique audience). Examples disclosed herein reduce the risk of bias in the demographic compositions by correcting for sample bias and/or attribution error present in database proprietor data.

In disclosed examples, an online user visits a website to watch a video that has been provided with a set of instructions or information (e.g., via a software development kit (SDK) provided by an audience measurement entity such as The Nielsen Company). When the online user, who may or may not have a prior relationship with the audience measurement entity, visits the website, different types of messages are generated and sent by the online user's device via a communications network. One or more of the messages are sent to a database proprietor's server and one or more of the messages are sent to the audience measurement entity's servers.

The message(s) sent to the database proprietor's server include a cookie and/or other identifier that enable(s) the database proprietor to match the online user to demographic information. The database proprietor attributes the impression to a user account corresponding to the cookie value, and subsequently aggregates the impressions, sessions, and/or audience count based on the demographics associated with the user accounts. The message(s) sent to the audience measurement entity and/or the database proprietor enable the audience measurement entity and/or the database proprietor to measure the portions of the media (e.g., a video) presented at the online user's device.

Among the potential sources of bias in the demographic information provided by the database proprietor is coverage of the online user. For example, not everyone in a population has the database proprietor cookie that enables the database proprietor to match the impression to an online profile. For example, a user may not have an account with the database proprietor and/or the user may have an account with the database proprietor but has deleted the database proprietor cookie or otherwise does not have the database proprietor cookie set at a client device at the time of media exposure via the client device. As a result, the database proprietor is not be able to match the impressions to demographic information. A failure to match impressions results in a failure to report audience, exposures, or duration for those impressions and, thus, an underestimation of the audience count, exposure count and/or duration for the demographic group to which the online user belongs.

Another potential source of bias in the demographic information arises from misattribution, in which the online user's device is used by multiple users in a household. The other users may or may not have an account with database proprietor. For example, if a first user that logged into the database proprietor on the device at a first time is not the same user using the device at a second time during a media presentation, any impressions, sessions, audience, and/or duration logged based on the database proprietor cookie corresponding to the first user may be misattributed to an incorrect demographic group. As a result, misattribution may result in overestimation of the audience count and/or duration for the demographic group of the user corresponding to the cookie and underestimation of the audience count and/or duration for the demographic group of the actual user that was exposed to the media.

The example sources of bias described above arise in techniques for measuring online audiences for media in which exposure data is collected from unknown (e.g., anonymous) users and third-party demographic information is used to ascertain the demographic composition of the unknown users. While such techniques provide the benefit of more accurate measurements of larger audiences by including unknown or anonymous users, the use of message transmission from the client devices to the audience measurement entity and/or to the database proprietor as well as the use of cookie (or other identifier) matching at the database proprietor results in the inclusion of the above-described sources of bias in the demographic information obtained from the database proprietor.

Disclosed example methods improve accuracies of online audience measurements. Some disclosed example methods involve collecting, at an audience measurement entity, messages indicating impressions of a video delivered to devices via the Internet and receiving, at the audience measurement entity, first demographic information describing first numbers of impressions attributed to respective demographic groups by a database proprietor. In some examples, the messages identifying time segments of the video presented at the devices, the first numbers of impressions represent the time segments of the video, and the first numbers of impressions corresponding to the first impressions of the video. Some disclosed examples involve improving an accuracy of the first numbers of impressions by: detecting that a second number of impressions for a first one of the time segments of the video occurred based on the messages, detecting that no impressions for the first one of the time segments of the video were detected by the database proprietor, and determining respective percentages of exposures of the video that are attributable to corresponding ones of a plurality of demographic groups, the determining of the respective percentages being based on the first demographic information provided by the database proprietor for exposures of other time segments of the video. Some disclosed example methods involve attributing respective portions of the second number of impressions to the demographic groups based on the respective percentages to determine imputed numbers of impressions. Some disclosed example methods involve generating adjusted numbers of impressions based on the first numbers of impressions and the imputed numbers of impressions and determining ratings information for the time segments of the video using the adjusted numbers of impressions.

Some disclosed example methods further involve detecting that a first number of duration units for the first one of the time segments of the video occurred based on the messages, detecting that no duration units for the first one of the time segments of the video were detected by the database proprietor, and determining respective second percentages of duration units of the video that are attributable to corresponding ones of the demographic groups. In some examples, determining the respective second percentages is based on the first demographic information provided by the database proprietor for duration units of other time segments of the video. Some disclosed example methods further involve attributing respective portions of the first number of duration units to the demographic groups based on the second percentages to determine imputed numbers of duration units, and generating adjusted numbers of duration units based on the first numbers of duration units and the imputed numbers of duration units.

Some disclosed example methods further involve determining third numbers of impressions of the video that are attributable to the respective demographic groups by summing subsets of the first numbers of impressions that correspond to respective ones of the demographic groups. Some examples further involve determining numbers of audience members attributable to the respective demographic groups based on impression frequencies corresponding to the demographic groups and the video. Some examples further involve determining second ratings information for the video based on the third numbers of impressions and the numbers of audience members. In some example methods, the messages include a first message identifying a non-duration type of impression of the video at a first one of the devices and a second message identifying one of the time segments of the video that were presented at the first one of the devices.

Some example methods further involve determining a duration of a first one of the time segments presented at a first one of the devices based on first information transmitted in a first one of the messages, determining a fourth number of impressions the first time segment presented at the devices based on a number of the messages containing the first information, and determining a total duration of the first time segment presented at the devices based on the duration of the first time segment and the fourth number of impressions. The fourth number of impressions and the total duration of the first time segment corresponding to a first one of the demographic groups.

In some examples, the messages contain an identifier relating the first impressions to respective time segments of the video, a distributor of the video, a program distributed by the distributor and of which the video is a part, and an episode that belongs to the program and of which the video is at least a part. Some example methods further involve determining a proportion of the first impressions of a first one of the time segments that are attributed to a first one of the demographic groups by the database proprietor and identifying a first subset of the first impressions of the first one of the time segments that are not attributed to any of the demographic groups by the database proprietor. Some example methods further involve attributing a second subset of the first impressions of the first one of the time segments by applying the proportion to the first subset and combining the second subset of the first impressions with the impressions of the first one of the time segments that are attributed to the first one of the demographic groups by the database proprietor to determine redistributed impressions for the first one of the time segments. In some examples, determining the respective percentages of exposures of the video are based on the redistributed impressions.

In some disclosed example methods, generating the adjusted numbers of impressions includes adding ones of the first numbers of impressions to respective ones of the imputed numbers of impressions.

Disclosed example audience measurement apparatus improve an accuracy of online audience measurement, and include a first impressions collector, a second impressions collector, an exposure distribution data generator, a segment imputer and a ratings data generator. In some disclosed examples, the first impressions collector collects messages indicating impressions of a video delivered to devices via the Internet, the messages identifying time segments of the video presented at the devices. In some disclosed examples, the second impressions collector to receive first demographic information describing first numbers of impressions of the time segments of the video attributed to respective demographic groups by a database proprietor. In some examples, the first numbers of impressions represent the time segments of the video and the first numbers of impressions correspond to the first impressions of the video. In some disclosed examples, an exposure distribution data generator to determine respective percentages of exposures of the video that are attributable to corresponding ones of a plurality of demographic groups. In some examples, the exposure distribution data generator to determine the respective percentages based on the first demographic information provided by the database proprietor for exposures of the time segments of the video. In some examples, the segment imputer detects that a second number of impressions for a first one of the time segments of the video occurred based on the messages, detects that no impressions for the first one of the time segments of the video were detected by the database proprietor, and attributes respective portions of the second number of impressions to the demographic groups based on the respective percentages to determine imputed numbers of impressions. In some disclosed examples, the ratings data generator to generate adjusted numbers of impressions based on the first numbers of impressions and the imputed numbers of impressions and to determine ratings information for the time segments of the video using the adjusted numbers of impressions.

Some disclosed example apparatus further include a duration distribution data generator to determine respective second percentages of duration units of the video that are attributable to corresponding ones of the demographic groups. In some examples, the duration distribution data generator determines the respective second percentages based on the first demographic information provided by the database proprietor for duration units of other time segments of the video. In some examples, the apparatus further includes a duration imputer detects that a first number of duration units for the first one of the time segments of the video occurred based on the messages, detects that no duration units for the first one of the time segments of the video were detected by the database proprietor, attributes respective portions of the first number of duration units to the demographic groups based on the respective second percentages to determine imputed numbers of duration units, and generate adjusted numbers of duration units based on the first numbers of duration units and the imputed numbers of duration units.

Disclosed examples further include an exposure data generator and an audience adjuster. The exposure data generator to determine third numbers of impressions of the video that are attributable to the respective demographic groups by summing subsets of the first numbers of impressions that correspond to the respective demographic groups. The audience adjuster to determine numbers of audience members attributable to the respective demographic groups based on impression frequencies corresponding to the demographic groups and the video. In some examples, the ratings data generator to determine second ratings information for the video based on the third numbers of impressions and the numbers of audience members.

In some disclosed examples, the messages include a first message identifying a non-duration type of impression of the video at a first one of the devices and a second message identifying one of the time segments of the video that were presented at the first one of the devices. Some disclosed examples further include a segment calibrator to determine a duration of a first one of the time segments presented at a first one of the devices based on first information transmitted in a first one of the messages. Some disclosed examples further include an impressions adjuster to determine a fourth number of impressions the first time segment presented at the devices based on a number of the messages containing the first information. Some disclosed examples further include an impression duration data generator to determine a total duration of the first time segment presented at the devices based on the duration of the first time segment and the fourth number of impressions, the fourth number of impressions and the total duration of the first time segment corresponding to a first one of the demographic groups.

In some examples, the messages contain an identifier relating the first impressions to respective time segments of the video, a distributor of the video, a program distributed by the distributor and of which the video is a part, and an episode that belongs to the program and of which the video is at least a part.

Some disclosed examples further include a demographic distributor to determine a proportion of the first impressions of a first one of the time segments that are attributed to a first one of the demographic groups by the database proprietor, identify a first subset of the first impressions of the first one of the time segments that are not attributed to any of the demographic groups by the database proprietor, attribute a second subset of the first impressions of the first one of the time segments by applying the proportion to the first subset, and combines the second subset of the first impressions with the impressions of the first one of the time segments that are attributed to the first one of the demographic groups by the database proprietor to determine redistributed impressions for the first one of the time segments. In some examples, the segment imputer determines the respective percentages of exposures of the video based on the redistributed impressions.

Turning to the figures, FIG. 1 illustrates example client devices 102 (e.g., 102a, 102b, 102c, 102d, 102e) that report audience counts and/or impressions for online (e.g., Internet-based) media to impression collection entities 104 to facilitate determining numbers of impressions and sizes of audiences exposed to different online media. An "impression" generally refers to an instance of an individual's exposure to media (e.g., content, advertising, etc.). As used herein, the term "impression collection entity" refers to any entity that collects impression data, such as, for example, audience measurement entities and database proprietors that collect impression data. As used herein, exposures (visual and/or aural presentations) refer to qualified impressions, or impressions that have met at least a threshold of presentation (e.g., at least a threshold time of a video has been presented). Thus, an exposure includes an impression, but an impression may not necessarily be credited as an exposure. For example, a logged impression corresponding to ten seconds of media having been presented is not logged as an impression if an exposure is specified to require at least a threshold presentation duration of one minute. Duration refers to an amount of time of presentation of media, which may be credited to an impression. For example, an impression may correspond to a duration of 1 minute, 1 minute 30 seconds, 2 minutes, etc.

The client devices 102 of the illustrated example may be implemented by any device capable of accessing media over a network. For example, the client devices 102 may be a computer, a tablet, a mobile device, a smart television, or any other Internet-capable device or appliance. Examples disclosed herein may be used to collect impression information for any type of media. As used herein, "media" refers collectively and/or individually to content and/or advertisement(s). Media may include advertising and/or content delivered via web pages, streaming video, streaming audio, Internet protocol television (IPTV), movies, television, radio and/or any other vehicle for delivering media. In some examples, media includes user-generated media that is, for example, uploaded to media upload sites, such as YouTube, and subsequently downloaded and/or streamed by one or more other client devices for playback. Media may also include advertisements. Advertisements are typically distributed with content (e.g., programming). Traditionally, content is provided at little or no cost to the audience because it is subsidized by advertisers that pay to have their advertisements distributed with the content.

In the illustrated example, the client devices 102 employ web browsers and/or applications (e.g., apps) to access media. Some of the media includes instructions that cause the client devices 102 to report media monitoring information to one or more of the impression collection entities 104. That is, when a client device 102 of the illustrated example accesses media that is instantiated with (e.g., linked to, embedded with, etc.) one or more monitoring instructions, a web browser and/or application of the client device 102 executes the one or more instructions (e.g., monitoring instructions, sometimes referred to herein as beacon instruction(s)) in the media executes the beacon instruction(s) cause the executing client device 102 to send a beacon request or impression request 108 to one or more impression collection entities 104 via, for example, the Internet 110. The beacon request 108 of the illustrated example includes information about the access to the instantiated media at the corresponding client device 102 generating the beacon request. Such beacon requests allow monitoring entities, such as the impression collection entities 104, to collect impressions for different media accessed via the client devices 102. In this manner, the impression collection entities 104 can generate large impression quantities for different media (e.g., different content and/or advertisement campaigns). Example techniques for using beacon instructions and beacon requests to cause devices to collect impressions for different media accessed via client devices are further disclosed in U.S. Pat. No. 6,108,637 to Blumenau and U.S. Pat. No. 8,370,489 to Mainak, et al., which are incorporated herein by reference in their respective entireties.

The impression collection entities 104 of the illustrated example include an example audience measurement entity (AME) 114 and an example database proprietor (DP) 116. In the illustrated example, the AME 114 does not provide the media to the client devices 102 and is a trusted (e.g., neutral) third party (e.g., The Nielsen Company, LLC) for providing accurate media access statistics. In the illustrated example, the database proprietor 116 is one of many database proprietors that operate on the Internet to provide one or more services to. Such services may include, but are not limited to, email services, social networking services, news media services, cloud storage services, streaming music services, streaming video services, online shopping services, credit monitoring services, etc. Example database proprietors include social network sites (e.g., Facebook, Twitter, MySpace, etc.), multi-service sites (e.g., Yahoo!, Google, etc.), online shopping sites (e.g., Amazon.com, Buy.com, etc.), credit services (e.g., Experian), and/or any other type(s) of web service site(s) that maintain user registration records. In examples disclosed herein, the database proprietor 116 maintains user account records corresponding to users registered for Internet-based services provided by the database proprietors. That is, in exchange for the provision of services, subscribers register with the database proprietor 116. As part of this registration, the subscriber may provide detailed demographic information to the database proprietor 116. The demographic information may include, for example, gender, age, ethnicity, income, home location, education level, occupation, etc. In the illustrated example of FIG. 1, the database proprietor 116 sets a device/user identifier (e.g., an identifier described below in connection with FIG. 2) on a subscriber's client device 102 that enables the database proprietor 116 to identify the subscriber in subsequent interactions.

In the illustrated example, when the database proprietor 116 receives a beacon/impression request 108 from a client device 102, the database proprietor 116 requests the client device 102 to provide the device/user identifier that the database proprietor 116 had previously set for the client device 102. The database proprietor 116 uses the device/user identifier corresponding to the client device 102 to identify demographic information in its user account records corresponding to the subscriber of the client device 102. In this manner, the database proprietor 116 can generate "demographic impressions" by associating demographic information with an impression for the media accessed at the client device 102. Thus, as used herein, a "demographic impression" is defined to be an impression that is associated with one or more characteristic(s) (e.g., a demographic characteristic) of the person(s) exposed to the media in the impression. Through the use of demographic impressions, which associate monitored (e.g., logged) media impressions with demographic information, it is possible to measure media exposure and, by extension, infer media consumption behaviors across different demographic classifications (e.g., groups) of a sample population of individuals.

In the illustrated example, the AME 114 establishes a panel of users who have agreed to provide their demographic information and to have their Internet browsing activities monitored. When an individual joins the AME panel, the person provides detailed information concerning the person's identity and demographics (e.g., gender, age, ethnicity, income, home location, occupation, etc.) to the AME 114. The AME 114 sets a device/user identifier (e.g., an identifier described below in connection with FIG. 2) on the person's client device 102 that enables the AME 114 to identify the panelist.

In the illustrated example, when the AME 114 receives a beacon request 108 from a client device 102, the AME 114 requests the client device 102 to provide the AME 114 with the device/user identifier the AME 114 previously set for the client device 102. The AME 114 uses the device/user identifier corresponding to the client device 102 to identify demographic information in its user AME panelist records corresponding to the panelist of the client device 102. In this manner, the AME 114 can generate demographic impressions by associating demographic information with an audience for the media accessed at the client device 102 as identified in the corresponding beacon request.

In the illustrated example, the database proprietor 116 reports demographic impression data to the AME 114. To preserve the anonymity of its subscribers, the demographic impression data may be anonymous demographic impression data and/or aggregated demographic impression data. In the case of anonymous demographic impression data, the database proprietor 116 reports user-level demographic impression data (e.g., which is resolvable to individual subscribers), but with any personally identifiable information (PII) removed from or obfuscated (e.g., scrambled, hashed, encrypted, etc.) in the reported demographic impression data. For example, anonymous demographic impression data, if reported by the database proprietor 116 to the AME 114, may include respective demographic impression data for each device 102 from which a beacon request 108 was received, but with any personal identification information removed from or obfuscated in the reported demographic impression data. In the case of aggregated demographic impression data, individuals are grouped into different demographic classifications, and aggregate demographic data (e.g., which is not resolvable to individual subscribers) for the respective demographic classifications is reported to the AME 114. In some examples, the aggregated data is aggregated demographic impression data. In other examples, the database proprietor is not provided with impression data that is not resolvable to a particular media name (but may instead be given a code or the like that the AME 114 can map to the code) and the reported aggregated demographic data may thus not be mapped to impressions or may be mapped to the code(s) associated with the impressions.

Aggregate demographic data, if reported by the database proprietor 116 to the AME 114, may include first demographic data aggregated for devices 102 associated with demographic information belonging to a first demographic classification (e.g., a first age group, such as a group which includes ages less than 18 years old), second demographic data for devices 102 associated with demographic information belonging to a second demographic classification (e.g., a second age group, such as a group which includes ages from 18 years old to 34 years old), etc.

As mentioned above, demographic information available for subscribers of the database proprietor 116 may be unreliable, or less reliable than the demographic information obtained for panel members registered by the AME 114. There are numerous social, psychological and/or online safety reasons why subscribers of the database proprietor 116 may inaccurately represent or even misrepresent their demographic information, such as age, gender, etc. Accordingly, one or more of the AME 114 and/or the database proprietor 116 determine sets of classification probabilities for respective individuals in the sample population for which demographic data is collected. A given set of classification probabilities represents likelihoods that a given individual in a sample population belongs to respective ones of a set of possible demographic classifications. For example, the set of classification probabilities determined for a given individual in a sample population may include a first probability that the individual belongs to a first one of possible demographic classifications (e.g., a first age classification, such as a first age group), a second probability that the individual belongs to a second one of the possible demographic classifications (e.g., a second age classification, such as a second age group), etc. In some examples, the AME 114 and/or the database proprietor 116 determine the sets of classification probabilities for individuals of a sample population by combining, with models, decision trees, etc., the individuals' demographic information with other available behavioral data that can be associated with the individuals to estimate, for each individual, the probabilities that the individual belongs to different possible demographic classifications in a set of possible demographic classifications. Example techniques for reporting demographic data from the database proprietor 116 to the AME 114, and for determining sets of classification probabilities representing likelihoods that individuals of a sample population belong to respective possible demographic classifications in a set of possible demographic classifications, are further disclosed in U.S. Patent Publication No. 2012/0072469 (Perez et al.) and U.S. patent application Ser. No. 14/604,394 (Sullivan et al.), which are incorporated herein by reference in their respective entireties.

In the illustrated example, one or both of the AME 114 and the database proprietor 116 include example audience data generators to determine ratings data from population sample data having incomplete demographic classifications in accordance with the teachings of this disclosure. For example, the AME 114 may include an example audience data generator 120a and/or the database proprietor 116 may include an example audience data generator 120b. As disclosed in further detail below, the audience data generator(s) 120a and/or 120b of the illustrated example process sets of classification probabilities determined by the AME 114 and/or the database proprietor 116 for monitored individuals of a sample population (e.g., corresponding to a population of individuals associated with the devices 102 from which beacon requests 108 were received) to estimate parameters characterizing population attributes (also referred to herein as population attribute parameters) associated with the set of possible demographic classifications.

In some examples, such as when the audience data generator 120b is implemented at the database proprietor 116, the sets of classification probabilities processed by the audience data generator 120b to estimate the population attribute parameters include personal identification information which permits the sets of classification probabilities to be associated with specific individuals. Associating the classification probabilities enables the audience data generator 120b to maintain consistent classifications for individuals over time, and the audience data generator 120b may scrub the PII from the impression information prior to reporting impressions based on the classification probabilities. In some examples, such as when the audience data generator 120a is implemented at the AME 114, the sets of classification probabilities processed by the audience data generator 120a to estimate the population attribute parameters are included in reported, anonymous demographic data and, thus, do not include PII. However, the sets of classification probabilities can still be associated with respective, but unknown, individuals using, for example, anonymous identifiers (e.g., hashed identifiers, scrambled identifiers, encrypted identifiers, etc.) included in the anonymous demographic data.

In some examples, such as when the audience data generator 120a is implemented at the AME 114, the sets of classification probabilities processed by the audience data generator 120a to estimate the population attribute parameters are included in reported, aggregate demographic impression data and, thus, do not include personal identification and are not associated with respective individuals but, instead, are associated with respective aggregated groups of individuals. For example, the sets of classification probabilities included in the aggregate demographic impression data may include a first set of classification probabilities representing likelihoods that a first aggregated group of individuals belongs to respective possible demographic classifications in a set of possible demographic classifications, a second set of classification probabilities representing likelihoods that a second aggregated group of individuals belongs to the respective possible demographic classifications in the set of possible demographic classifications, etc.

Using the estimated population attribute parameters, the audience data generator(s) 120a and/or 120b of the illustrated example determine ratings data for media, as disclosed in further detail below. For example, the audience data generator(s) 120a and/or 120b may process the estimated population attribute parameters to further estimate numbers of individuals across different demographic classifications who were exposed to given media, numbers of media impressions across different demographic classifications for the given media, accuracy metrics for the estimate number of individuals and/or numbers of media impressions, etc.

Figure 2:
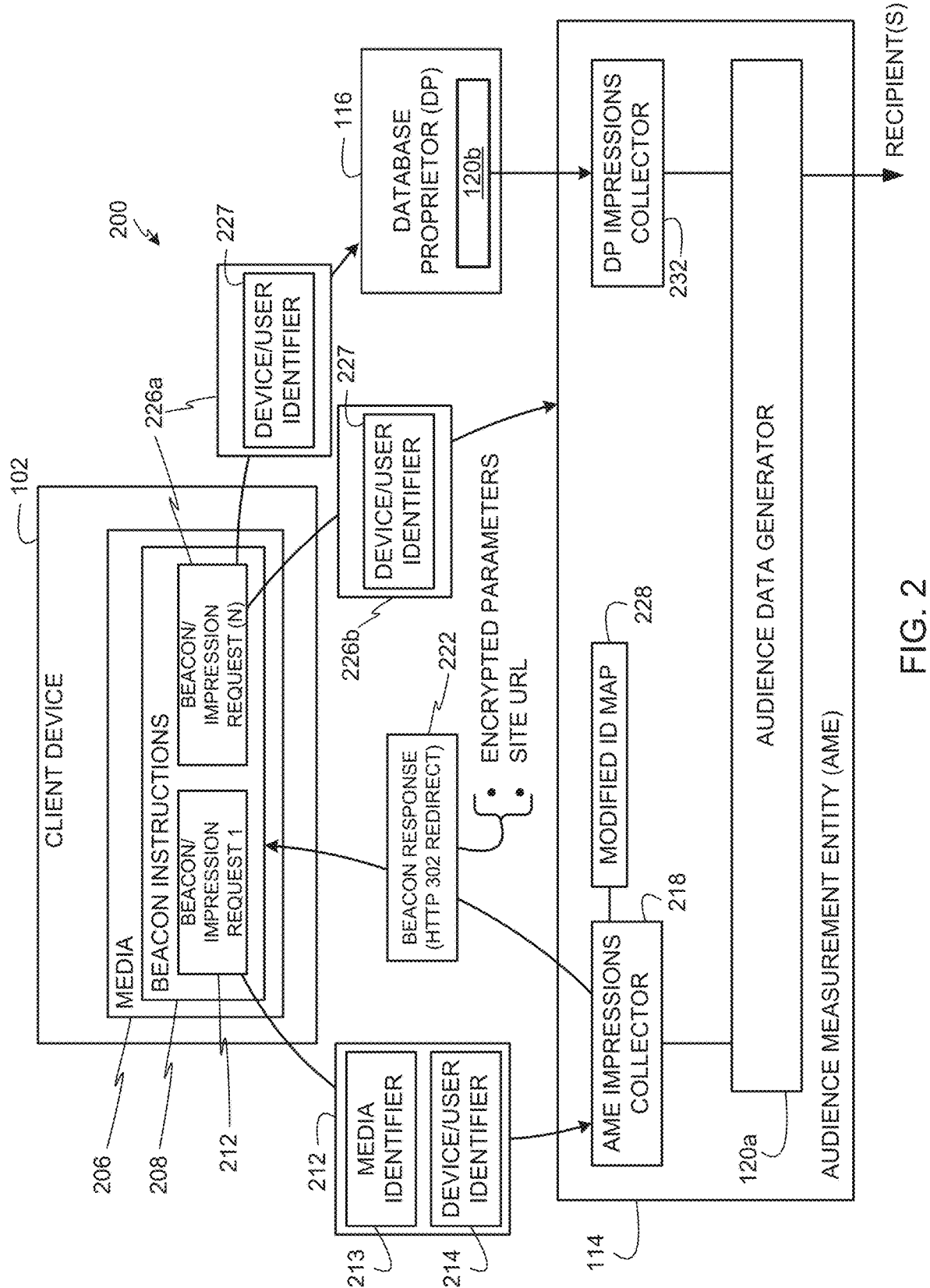
FIG. 2 is an example communication flow diagram illustrating an example manner in which an example audience measurement entity and an example database proprietor can collect impressions and demographic information associated with a client device, and can further determine ratings data from population sample data having incomplete demographic classifications in accordance with the teachings of this disclosure.

FIG. 2 is an example communication flow diagram 200 illustrating an example manner in which the AME 114 and the database proprietor 116 can cooperate to collect demographic impressions based on client devices 102 reporting impressions to the AME 114 and/or the database proprietor 116. FIG. 2 also shows the example audience data generators 120a and 120b, which are able to determine ratings data from population sample data having unreliable demographic classifications in accordance with the teachings of this disclosure. The example chain of events shown in FIG. 2 occurs when a client device 102 accesses media for which the client device 102 reports an impression to the AME 114 and/or the database proprietor 116. In some examples, the client device 102 reports impressions for accessed media based on instructions (e.g., beacon instructions) embedded in the media that instruct the client device 102 (e.g., that instruct a web browser or an app executing on the client device 102) to send beacon/impression requests (e.g., the beacon/impression requests 108 of FIG. 1) to the AME 114 and/or the database proprietor 116. In such examples, the media associated with the beacon instructions is referred to as tagged media. The beacon instructions are machine executable instructions (e.g., code, a script, etc.) which may be contained in the media (e.g., in the HTML, of a web page) and/or referenced by the media (e.g., identified by a link in the media that causes the client to request the instructions).

Although the above examples operate based on monitoring instructions associated with media (e.g., a web page, a media file, etc.), in other examples, the client device 102 reports impressions for accessed media based on instructions associated with (e.g., embedded in) apps or web browsers that execute on the client device 102 to send beacon/impression requests (e.g., the beacon/impression requests 108 of FIG. 1) to the AME 114 and/or the database proprietor 116 for media accessed via those apps or web browsers. In such examples, the media itself need not be tagged media. In some examples, the beacon/impression requests (e.g., the beacon/impression requests 108 of FIG. 1) include device/user identifiers (e.g., AME IDs and/or DP IDs) as described further below to allow the corresponding AME 114 and/or the corresponding database proprietor 116 to associate demographic information with resulting logged impressions.

In the illustrated example, the client device 102 accesses tagged media 206 that is tagged with beacon instructions 208. The beacon instructions 208 cause the client device 102 to send a beacon/impression request 212 to an AME impressions collector 218 when the client device 102 accesses the media 206. For example, a web browser and/or app of the client device 102 executes the beacon instructions 208 in the media 206 which instruct the browser and/or app to generate and send the beacon/impression request 212. In the illustrated example, the client device 102 sends the beacon/impression request 212 using an HTTP (hypertext transfer protocol) request addressed to the URL (uniform resource locator) of the AME impressions collector 218 at, for example, a first Internet domain of the AME 114. The beacon/impression request 212 of the illustrated example includes a media identifier 213 identifying the media 206 (e.g., an identifier that can be used to identify content, an advertisement, and/or any other media). In some examples, the beacon/impression request 212 also includes a site identifier (e.g., a URL) of the website that served the media 206 to the client device 102 and/or a host website ID (e.g., www.acme.com) of the website that displays or presents the media 206. In the illustrated example, the beacon/impression request 212 includes a device/user identifier 214. In the illustrated example, the device/user identifier 214 that the client device 102 provides to the AME impressions collector 218 in the beacon impression request 212 is an AME ID because it corresponds to an identifier that the AME 114 uses to identify a panelist corresponding to the client device 102. In other examples, the client device 102 may not send the device/user identifier 214 until the client device 102 receives a request for the same from a server of the AME 114 in response to, for example, the AME impressions collector 218 receiving the beacon/impression request 212.

In some examples, the device/user identifier 214 may be a device identifier (e.g., an international mobile equipment identity (IMEI), a mobile equipment identifier (MEID), a media access control (MAC) address, etc.), a web browser unique identifier (e.g., a cookie), a user identifier (e.g., a user name, a login ID, etc.), an Adobe Flash® client identifier, identification information stored in an HTML5 datastore (where HTML, is an abbreviation for hypertext markup language), and/or any other identifier that the AME 114 stores in association with demographic information about users of the client devices 102. In this manner, when the AME 114 receives the device/user identifier 214, the AME 114 can obtain demographic information corresponding to a user of the client device 102 based on the device/user identifier 214 that the AME 114 receives from the client device 102. In some examples, the device/user identifier 214 may be encrypted (e.g., hashed) at the client device 102 so that only an intended final recipient of the device/user identifier 214 can decrypt the hashed identifier 214. For example, if the device/user identifier 214 is a cookie that is set in the client device 102 by the AME 114, the device/user identifier 214 can be hashed so that only the AME 114 can decrypt the device/user identifier 214. If the device/user identifier 214 is an IMEI number, the client device 102 can hash the device/user identifier 214 so that only a wireless carrier (e.g., the database proprietor 116) can decrypt the hashed identifier 214 to recover the IMEI for use in accessing demographic information corresponding to the user of the client device 102. By hashing the device/user identifier 214, an intermediate party (e.g., an intermediate server or entity on the Internet) receiving the beacon request cannot directly identify a user of the client device 102.

In response to receiving the beacon/impression request 212, the AME impressions collector 218 logs an impression for the media 206 by storing the media identifier 213 contained in the beacon/impression request 212. In the illustrated example of FIG. 2, the AME impressions collector 218 also uses the device/user identifier 214 in the beacon/impression request 212 to identify AME panelist demographic information corresponding to a panelist of the client device 102. That is, the device/user identifier 214 matches a user ID of a panelist member (e.g., a panelist corresponding to a panelist profile maintained and/or stored by the AME 114). In this manner, the AME impressions collector 218 can associate the logged impression with demographic information of a panelist corresponding to the client device 102. In some examples, the AME impressions collector 218 determines (e.g., in accordance with the examples disclosed in U.S. Patent Publication No. 2012/0072469 to Perez et al. and/or U.S. patent application Ser. No. 14/604,394) a set of classification probabilities for the panelist to include in the demographic information associated with the logged impression. As described above and in further detail below, the set of classification probabilities represent likelihoods that the panelist belongs to respective ones of a set of possible demographic classifications (e.g., such as likelihoods that the panelist belongs to respective ones of a set of possible age groupings, etc.).

In some examples, the beacon request 212 is an impression message, or I beacon, which is a non-durational message that is transmitted by the client device 102 when the media 206 is loaded. In some examples, the beacon/impression request 212 may not include the device/user identifier 214 (e.g., if the user of the client device 102 is not an AME panelist). In such examples, the AME impressions collector 218 logs impressions regardless of whether the client device 102 provides the device/user identifier 214 in the beacon/impression request 212 (or in response to a request for the identifier 214). When the client device 102 does not provide the device/user identifier 214, the AME impressions collector 218 can still benefit from logging an impression for the media 206 even though it does not have corresponding demographics. For example, the AME 114 may still use the logged impression to generate a total impressions count and/or a frequency of impressions (e.g., a rate of impressions such as impressions per hour) for the media 206. Additionally or alternatively, the AME 114 may obtain demographics information from the database proprietor 116 for the logged impression if the client device 102 corresponds to a subscriber of the database proprietor 116.

In the illustrated example of FIG. 2, to compare or supplement panelist demographics (e.g., for accuracy or completeness) of the AME 114 with demographics from one or more database proprietors (e.g., the database proprietor 116), the AME impressions collector 218 returns a beacon response message 222 (e.g., a first beacon response) to the client device 102 including an HTTP "302 Found" re-direct message and a URL of a participating database proprietor 116 at, for example, a second Internet domain different than the Internet domain of the AME 114. In the illustrated example, the HTTP "302 Found" re-direct message in the beacon response 222 instructs the client device 102 to send a second beacon request 226a to the database proprietor 116. In other examples, instead of using an HTTP "302 Found" re-direct message, redirects may be implemented using, for example, an iframe source instruction (e.g., <iframe src= " ">) or any other instruction that can instruct a client device to send a subsequent beacon request (e.g., the second beacon request 226a) to a participating database proprietor 116. In the illustrated example, the AME impressions collector 218 determines the database proprietor 116 specified in the beacon response 222 using a rule and/or any other suitable type of selection criteria or process. In some examples, the AME impressions collector 218 determines a particular database proprietor to which to redirect a beacon request based on, for example, empirical data indicative of which database proprietor is most likely to have demographic data for a user corresponding to the device/user identifier 214. In some examples, the beacon instructions 208 include a pre-defined URL of one or more database proprietors to which the client device 102 should send follow up beacon requests 226a. In other examples, the same database proprietor is always identified in the first redirect message (e.g., the beacon response 222).

In the illustrated example of FIG. 2, the beacon/impression request 226a may include a device/user identifier 227 that is a DP ID because it is used by the database proprietor 116 to identify a subscriber of the client device 102 when logging an impression. In some instances (e.g., in which the database proprietor 116 has not yet set a DP ID in the client device 102), the beacon/impression request 226a does not include the device/user identifier 227. In some examples, the DP ID is not sent until the database proprietor 116 requests the same (e.g., in response to the beacon/impression request 226a). In some examples, the device/user identifier 227 is a device identifier (e.g., an IMEI), an MEID, a MAC address, etc.), a web browser unique identifier (e.g., a cookie), a user identifier (e.g., a user name, a login ID, etc.), an Adobe Flash® client identifier, identification information stored in an HTML5 datastore, and/or any other identifier that the database proprietor 116 stores in association with demographic information about subscribers corresponding to the client devices 102. In some examples, the device/user identifier 227 may be encrypted (e.g., hashed) at the client device 102 so that only an intended final recipient of the device/user identifier 227 can decrypt the hashed identifier 227. For example, if the device/user identifier 227 is a cookie that is set in the client device 102 by the database proprietor 116, the device/user identifier 227 can be hashed so that only the database proprietor 116 can decrypt the device/user identifier 227. If the device/user identifier 227 is an IMEI number, the client device 102 can hash the device/user identifier 227 so that only a wireless carrier (e.g., the database proprietor 116) can decrypt the hashed identifier 227 to recover the IMEI for use in accessing demographic information corresponding to the user of the client device 102. By hashing the device/user identifier 227, an intermediate party (e.g., an intermediate server or entity on the Internet) receiving the beacon request cannot directly identify a user of the client device 102. For example, if the intended final recipient of the device/user identifier 227 is the database proprietor 116, the AME 114 cannot recover identifier information when the device/user identifier 227 is hashed by the client device 102 for decrypting only by the intended database proprietor 116.

In the example of FIG. 2, the beacon instructions 208 cause the client device 102 to transmit multiple second beacon requests 226a, 226b to the database proprietor 116 and to the AME 114. The example second beacon requests 226a, 226b may take the form of "exposure," or non-duration, messages (e.g., referred to herein as V beacons or V pings) and/or duration messages (e.g., referred to herein as D beacons or D pings).

In the example of FIG. 2, V beacons are beacon requests 226a, 226b that are transmitted by the client device 102 when a sufficient duration of the media 206 has been presented at the client device 102 to qualify the presentation as an exposure of the media (e.g., a "qualified impression" or view). For example, a sufficient duration is achieved when a duration for which the media 206 has been presented satisfies a presentation duration threshold. In some examples, when the sufficient duration of the media 206 has been presented (e.g., a qualified exposure of the media 206 has occurred), the example beacon instructions 208 cause the client device 102 to transmit a V beacon to the AME impressions collector 218 and/or to the database proprietor 116, and does not transmit additional V beacons for the same presentation of the media 206. If the sufficient duration is not presented, the impression is not qualified, and the V beacon is not transmitted (e.g., the impression is not counted by the audience data generator 120 as an "exposure"). The duration of the media that is sufficient to qualify the presentation may depend on the media 206 and/or based on empirical observations about a duration of presentation that correlates to, for example, memory of the media 206 by a viewer or listener. Exposures of the media 206 may be calculated based on collecting V beacons and determining demographic groups to which the V beacons are attributable, as described in more detail below.

In the example of FIG. 2, D beacons are beacon requests 226a, 226b that contain duration information that identify portions of the media 206 that has been presented at the client device 102. For example, the D beacons may use the format "D_s_abcde," where s denotes a time segment of the media 206 (e.g., an episode of a program distributed by a distributor) being presented at the client device 102. The s term can vary between 1 and n, with n being the last segment of the media 206. In the D beacon format D_s_abcde, the terms a, b, c, d, and e refer to respective ones of $1^{st}$, $2^{nd}$, $3^{rd}$, $4^{th}$, and $5^{th}$ sub-segments (e.g., minutes) of a segment. A value 0 in any of the terms a, b, c, d, e indicates that the corresponding sub-segment (e.g., the corresponding minute) was not presented and the value 1 indicates that the corresponding sub-segment (e.g., the corresponding minute) was presented. Thus, a D beacon of D_2_01010 indicates that, of a second time segment of the media 206 (of n time segments making up the media 206), the $2^{nd}$ and $4^{th}$ sub-segments were presented while the $1^{st}$, $3^{rd}$, and $5^{th}$ sub-segments were not presented.

In the example of FIG. 2, the client device 102 sends the D beacons at the conclusion of designated time segments (e.g., after the $5^{th}$ minute of a time segment is presented) and/or at designated time intervals during presentation of the media (e.g., every z minutes, where z sub-segments are represented per D beacon). As used herein, a "time segment"

may refer to the larger segments represented by one D beacon (e.g., super-segments) and/or to a sub-segment (e.g., a minute) that is a component of the larger segment.

When the database proprietor 116 receives the device/user identifier 227, the database proprietor 116 can obtain demographic information corresponding to a user of the client device 102 based on the device/user identifier 227 that the database proprietor 116 receives from the client device 102. In some examples, the database proprietor 116 determines (e.g., in accordance with the examples disclosed in U.S. Patent Publication No. 2012/0072469 to Perez et al. and/or U.S. patent application Ser. No. 14/604,394) a set of classification probabilities associated with the user of the client device 102 to include in the demographic information associated with this user. As described above and in further detail below, the set of classification probabilities represent likelihoods that the user belongs to respective ones of a set of possible demographic classifications (e.g., likelihoods that the panelist belongs to respective ones of a set of possible age groupings, etc.).

Although only a single database proprietor 116 is shown in FIGS. 1 and 2, the impression reporting/collection process of FIGS. 1 and 2 may be implemented using multiple database proprietors. In some such examples, the beacon instructions 208 cause the client device 102 to send beacon/impression requests 226a to numerous database proprietors. For example, the beacon instructions 208 may cause the client device 102 to send the beacon/impression requests 226a to the numerous database proprietors in parallel or in daisy chain fashion. In some such examples, the beacon instructions 208 cause the client device 102 to stop sending beacon/impression requests 226a to database proprietors once a database proprietor has recognized the client device 102. In other examples, the beacon instructions 208 cause the client device 102 to send beacon/impression requests 226a to database proprietors so that multiple database proprietors can recognize the client device 102 and log a corresponding impression. Thus, in some examples, multiple database proprietors are provided the opportunity to log impressions and provide corresponding demographics information if the user of the client device 102 is a subscriber of services of those database proprietors.

In some examples, prior to sending the beacon response 222 to the client device 102, the AME impressions collector 218 replaces site IDs (e.g., URLs) of media provider(s) that served the media 206 with modified site IDs (e.g., substitute site IDs) which are discernable only by the AME 114 to identify the media provider(s). In some examples, the AME impressions collector 218 may also replace a host website ID (e.g., www.acme.com) with a modified host site ID (e.g., a substitute host site ID) which is discernable only by the AME 114 as corresponding to the host website via which the media 206 is presented. In some examples, the AME impressions collector 218 also replaces the media identifier 213 with a modified media identifier 213 corresponding to the media 206. In this way, the media provider of the media 206, the host website that presents the media 206, and/or the media identifier 213 are obscured from the database proprietor 116, but the database proprietor 116 can still log impressions based on the modified values (e.g., if such modified values are included in the beacon request 226a), which can later be deciphered by the AME 114 after the AME 114 receives logged impressions from the database proprietor 116. In some examples, the AME impressions collector 218 does not send site IDs, host site IDS, the media identifier 213 or modified versions thereof in the beacon response 222. In such examples, the client device 102 provides the original, non-modified versions of the media identifier 213, site IDs, host IDs, etc. to the database proprietor 116.

In the illustrated example, the AME impression collector 218 maintains a modified ID mapping table 228 that maps original site IDs with modified (or substitute) site IDs, original host site IDs with modified host site IDs, and/or maps modified media identifiers to the media identifiers such as the media identifier 213 to obfuscate or hide such information from database proprietors such as the database proprietor 116. Also in the illustrated example, the AME impressions collector 218 encrypts all of the information received in the beacon/impression request 212 and the modified information to prevent any intercepting parties from decoding the information. The AME impressions collector 218 of the illustrated example sends the encrypted information in the beacon response 222 to the client device 102 so that the client device 102 can send the encrypted information to the database proprietor 116 in the beacon/impression request 226. In the illustrated example, the AME impressions collector 218 uses an encryption that can be decrypted by the database proprietor 116 site specified in the HTTP "302 Found" re-direct message.

Periodically or aperiodically, the impression data collected by the database proprietor 116 is provided to a DP impressions collector 232 of the AME 114 as, for example, batch data. In some examples, the impression data collected from the database proprietor 116 by the DP impressions collector 232 is demographic impression data, which includes sets of classification probabilities for individuals of a sample population associated with client devices 102 from which beacon requests 226a were received. In some examples, the sets of classification probabilities included in the demographic impression data collected by the DP impressions collector 232 correspond to respective ones of the individuals in the sample population, and may include personal identification capable of identifying the individuals, or may include obfuscated identification information to preserve the anonymity of individuals who are subscribers of the database proprietor but not panelists of the AME 114. In some examples, the sets of classification probabilities included in the demographic impression data collected by the DP impressions collector 232 correspond to aggregated groups of individuals, which also preserves the anonymity of individuals who are subscribers of the database proprietor.

Additional examples that may be used to implement the beacon instruction processes of FIG. 2 are disclosed in U.S. Pat. No. 8,370,489 to Mainak et al. In addition, other examples that may be used to implement such beacon instructions are disclosed in U.S. Pat. No. 6,108,637 to Blumenau.

In the example of FIG. 2, the AME 114 includes the example audience data generator 120a of FIG. 1 to determine ratings data using the sets of classification probabilities determined by the AME impressions collector 218 and/or obtained by the DP impressions collector 232. Additionally or alternatively, in the example of FIG. 2, the database proprietor 116 includes the example audience data generator 120b of FIG. 1 to determine media ratings data using the sets of classification probabilities determined by the database proprietor 116. A block diagram of an example audience data generator 120, which may be used to implement one or both of the example audience data generators 120a and/or 120b, is illustrated in FIG. 3.

Figure 3:
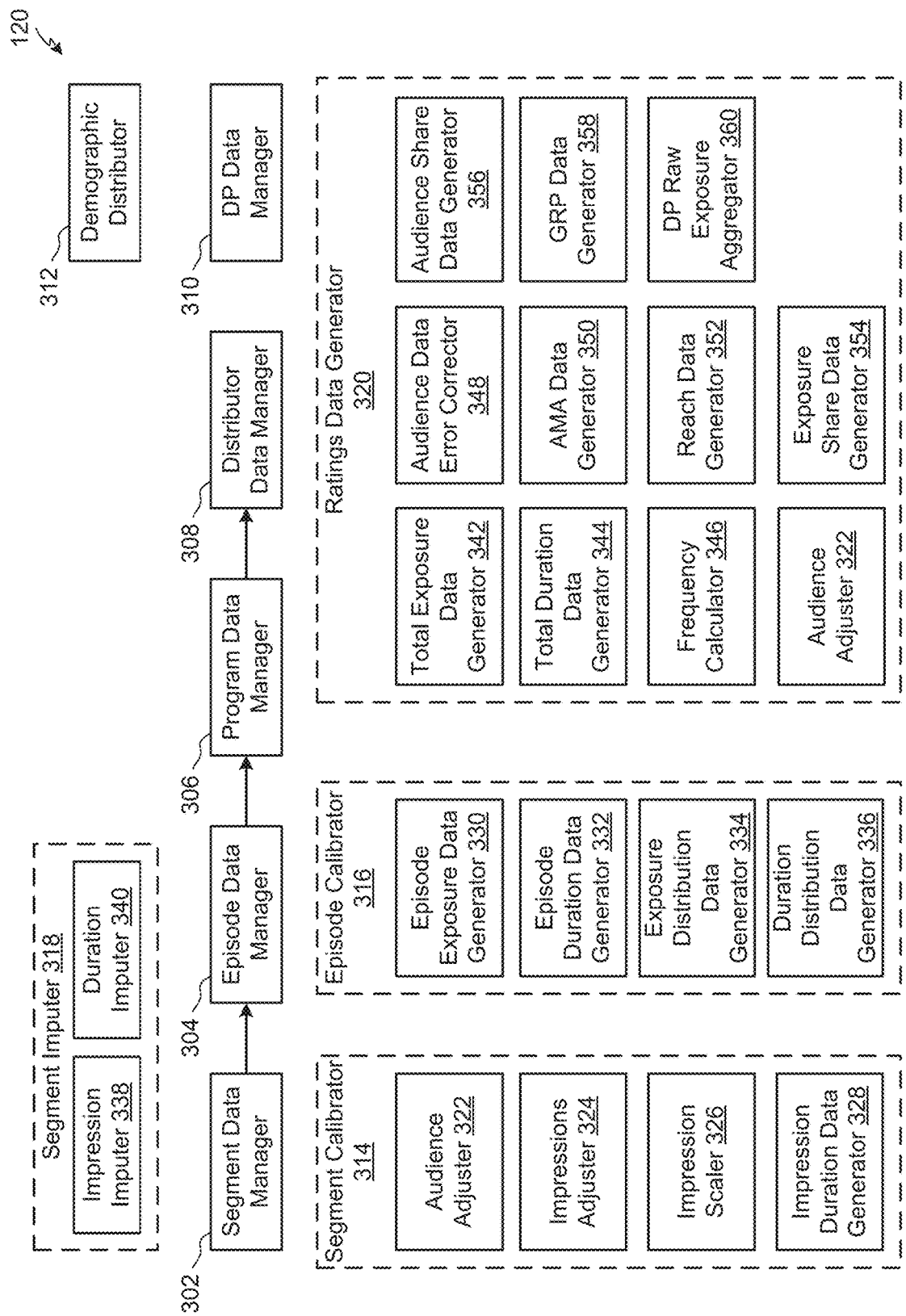
FIG. 3 is a block diagram of an example implementation of the audience data generator of FIG. 2.

The example audience data generator 120 of FIG. 3 receives impression information from the AME impressions collector 218. Example impression information includes the impression requests 212 and/or the beacon requests 226b. The AME impressions collector 218 collects and tracks the requests 212, 226b, as well as the devices 102 from which the requests 212, 226b are received.

The example audience data generator 120 further receives demographic information corresponding to impressions received by the DP 116. In some examples, the impressions received at the DP 116 correspond at least in part to the requests 212, 226b received at the AME impressions collector 218. The example DP 116 attempts to determine demographic information for the impressions (e.g., the beacon requests 226a), and provides numbers of impressions and/or numbers of audience members to the AME 114.

In the example of FIG. 3, the audience data generator 120 receives aggregated data files containing aggregated numbers of impressions and aggregated counts of unique audience members organized by the groups (e.g., levels of detail): Distributor×Corrected Age×Gender (e.g., distributor-level aggregation by age and gender, such as "Distributor 1, Male, ages 18-24" and "Distributor 1, Male, ages 25-30"); Distributor×Program×Corrected Age×Gender (e.g., program-level aggregation by age and gender, such as "Distributor 1, Program 1, Male, ages 18-24" and "Distributor 1, Program 2, Male, ages 18-24"); Distributor×Program×ContentID×Corrected Age×Gender (e.g., episode-level aggregation by age and gender, such as "Distributor 1, Program 1, Episode 1, Male, ages 18-24" and "Distributor 1, Program 1, Episode 2, Male, ages 18-24"); and Distributor×Program×ContentID×SegmentCode×corrected age×gender (e.g., time segment-level aggregation by age and gender, such as "Distributor 1, Program 1, Episode 1, Minute 1 (or Minutes 1-5), Male, ages 18-24" and "Distributor 1, Program 1, Episode 1, Minute 5 (or Minutes 6-10), Male, ages 18-24," where segment includes the type of beacon request (e.g., a V beacon or a D beacon) that was sent by the client device 102).

The example audience data generator 120 includes an example segment data manager 302, an episode data manager 304, a program data manager 306, and a distributor data manager 308. The example segment data manager 302, the example episode data manager 304, the example program data manager 306, and the example distributor data manager 308 each manage the aggregated demographic information received from the DP 116 and/or from the AME impressions collector 218 for the respective data levels.

The example audience data generator 120 of FIG. 3 further includes an example DP data manager 310. The example DP data manager 310 collects, stores, and provides the demographic information (e.g., raw impression and/or audience data per demographic group and/or data level) obtained from the DP 116. While the segment data manager 302, the episode data manager 304, the program data manager 306, and the distributor data manager 308 manage the correction and/or calibration of demographic information obtained from the DP 116 at the respective levels, the example DP data manager 310 manage the raw demographic information obtained from the DP 116 for use in the correction and/or calibration of the demographic information.

The example audience data generator 120 also includes an example demographic distributor 312, an example segment calibrator 314, an example episode calibrator 316, an example segment imputer 318, and an example ratings data generator 320. The example segment data manager 302, the example episode data manager 304, the example program data manager 306, and/or the example distributor data manager 308 may communicate with or notify the demographic distributor 312, the segment calibrator 314, the episode calibrator 316, the segment imputer 318, and/or the ratings data generator 320 to correct and/or calibrate the DP demographic information and/or to generate ratings information for online media.

The example demographic distributor 312 of FIG. 3 may receive communications, notifications, requests, signals, etc. from the segment data manager 302, the episode data manager 304, the program data manager 306, and/or the distributor data manager 308 to distribute impressions and/or audience members into demographic groups (e.g., demographic groups defined by the AME 114 and/or another entity, demographic groups corresponding to an audience measurement system such as television ratings, etc.). For example, all or a portion of impression information received from the DP 116 may have incomplete demographic information (e.g., undetermined age and/or gender information). As described in more detail below, the example demographic distributor 312 determines a distribution of impressions and/or audience members by the DP 116 into the demographic groups, and then distributes any impressions and/or audience members for which the demographic group is unknown into the demographic groups based on the determined distribution. Example implementations of the demographic distributor 312 are described below in connection with FIGS. 5-10.

The example segment calibrator 314 of FIG. 3 calibrates the time segment-level demographic information (e.g., at the request of the segment data manager 302). For example, calibration includes adjusting the impressions and/or unique audience count based on a misattribution and/or non-coverage adjustment factor, scaling the impressions and/or unique audience count based on a number of impressions and/or unique audience members observed at a monitored web site (e.g., a web site census count), and/or adjusts durations presented by the demographic groups for each of the time segments. To this end, the segment calibrator 314 includes an example audience adjuster 322, an example impressions adjuster 324, an example impressions scaler 326, and an example impression duration data generator 328.

The example audience adjuster 322 adjusts a unique audience count for each combination of time segment and demographic group based on an adjustment factor. In the example of FIG. 3, the adjustment factor(s) are determined for the distributor corresponding to the time segment(s). An example method of generating the adjustment factor is described in U.S. Patent Publication No. 2015/0193816 (Toupet et al.) The entirety of U.S. Patent Publication No. 2015/0193816 is incorporated herein by reference.

The example impressions adjuster 324 of FIG. 3 adjusts an impressions count for each combination of time segment and demographic group based on the adjusted audience calculated by the audience adjuster 322.

The example impressions scaler 326 calculates a scaling factor to be applied to the adjusted impressions, and applies the scaling factor to scale the impressions for the combinations of time segments and demographic groups. The example impression duration data generator 328 calculates an adjusted and scaled duration for the combinations of time segments and demographic groups based on the scaled impressions. Example implementations of the segment calibrator 314, the audience adjuster 322, the impressions adjuster 324, the impression scaler 326, and the impression duration data generator 328 are described below in connection with FIGS. 11 and 12.

The example episode calibrator 316 of FIG. 3 calibrates episode exposures and/or unique audience counts for the demographic groups using the calibrated time segment-level data generated by the segment calibrator 314 and based on the redistributed unique audience determined by the demographic distributor 312 at the episode level. The example episode calibrator 316 includes an example episode exposure data generator 330, an example episode duration data generator 332, an example exposure distribution data generator 334, and an example duration distribution data generator 336.

The example episode exposure data generator 330 of FIG. 3 calculates a number of exposures for each combination of episode and demographic group. For example, the episode exposure data generator 330 calculates the number of exposures for an episode by a demographic group based on a number of adjusted and scaled impressions (e.g., from the segment calibrator) of that episode by the demographic group. In the example of FIG. 3, the episode exposure data generator 330 calculates the exposures using impressions of V segments (e.g., durationless requests indicating that playback of the video started).

The example episode duration data generator 332 calculates a duration presented for each combination of episode and demographic group. The example exposure distribution data generator 334 determines a ratio of exposures for each combination of demographic group and episode to the total exposures for the episode. Thus, the exposure distribution data generator 334 determines a proportion of the exposures for an episode for each of the demographic groups. The example duration distribution data generator 336 determines a ratio of exposure duration for each combination of demographic group and episode to the total exposure duration for the episode. Example implementations of the example episode calibrator 316, the example episode exposure data generator 330, the example episode duration data generator 332, the example exposure distribution data generator 334, and the example duration distribution data generator 336 are described below in connection with FIGS. 13 and 14.

The example segment imputer 318 imputes demographic information to time segments for which the AME impressions collector 218 identifies impression but for which the DP 116 does not identify any impressions. For example, the segment imputer 318 may identify a mismatch between exposures identified by the AME 114 and exposures identified by the DP 116. The example segment imputer 318 includes an impression imputer 338 and a duration imputer 340.

The example impression imputer 338 identifies a non-durational segment (e.g., a V ping) that has impressions identified by the AME 114 but does not have impressions identified by the DP 116 for one or more demographic groups. When the impression imputer 338 identifies such a non-durational segment, the impression imputer 338 obtains a distribution of exposures for the episode corresponding to the identified segment for the demographic groups based on the DP demographic information (e.g., from the DP data manager 310). The impression imputer 338 uses the obtained distribution of exposures and a census-based number of impressions for the segment to estimate a quantity of exposures of the segment that are attributable to the demographic group.

The example duration imputer 340 identifies a durational segment (e.g., a D ping) that has impressions identified by the AME 114 but does not have impressions identified by the DP 116 for one or more demographic groups. When the duration imputer 340 identifies such a durational segment, the duration imputer 340 obtains a distribution of exposures for the episode corresponding to the identified segment for the demographic groups based on the DP demographic information (e.g., from the DP data manager 310). The duration imputer 340 uses the obtained distribution of exposures and a census-based number of impressions for the segment to estimate a duration of the segment that is attributable to the demographic group. Example implementations of the example segment imputer 318, the example impression imputer 338, and the example duration imputer 340 are described below in connection with FIGS. 15 and 16.

The example ratings data generator 320 generates ratings information for media of interest for the demographic groups using the corrected and adjusted impression and/or audience information. For example, the ratings data generator 320 may determine numbers of exposures, duration, frequency, unique audience, average minute audience (AMA), audience reach, exposure share, audience share, and/or gross rating points (GRPs) for the one or more demographic groups at the episode level, the program level, and/or the distributor level.

The example ratings data generator 320 includes an example total exposure data generator 342, an example total duration data generator 344, an example frequency calculator 346, an example audience data error corrector 348, an example AMA data generator 350, an example reach data generator 352, an example exposure share data generator 354, an example audience share data generator 356, an example GRP data generator 358, and an example DP raw exposure aggregator 360. The example ratings data generator 320 of FIG. 3 also includes and/or accesses the audience adjuster 322.

The example total exposure data generator 342 determines an adjusted and scaled number of exposures for a demographic group for an episode, program, or distributor. The example total duration data generator 344 determines an adjusted and scaled duration for a demographic group for an episode, program, or distributor.

The example frequency calculator 346 calculates an impression frequency per audience member, also referred to herein as a frequency. In some examples, the segment calibrator 314 and/or the episode calibrator 316 include and/or access the frequency calculator 346 to calculate a frequency.

The example audience adjuster 322 calculates a unique audience count based on the exposures (determined by the total exposure data generator 342) and the frequency (determined by the frequency calculator 346).

The example audience data error corrector 348 identifies and, where applicable, corrects errors in the unique audience counts. For example, if the unique audience is greater than the number of exposures (e.g., fewer than 1 exposure per identified audience member), the audience data error corrector 348 corrects the unique audience count (e.g., by setting the unique audience count to be equal to or less than the number of exposures) and the frequency (e.g., by calculating the frequency based on the error-corrected unique audience count).

The example AMA data generator 350 determines an average minute audience for the demographic groups for an episode, a program, and/or a distributor. The example reach data generator 352 determines an audience reach for the demographic groups for an episode, a program, and/or a distributor. The example exposure share data generator 354 determines an exposure share for the demographic groups for an episode, a program, and/or a distributor. The example audience share data generator 356 determines an audience share for the demographic groups for an episode, a program, and/or a distributor. The example GRP data generator 358 determines the GRP for the demographic groups for an episode, a program, and/or a distributor.

The example DP raw exposure aggregator 360 aggregates program level raw exposures based on episode level ratings data and/or a redistributed program level unique audience count, and/or aggregates distributor level raw exposures based on program level ratings data and/or a redistributed distributor level unique audience count. Example implementations of the example ratings data generator 320, the example total exposure data generator 342, the example total duration data generator 344, the example frequency calculator 346, the example audience data error corrector 348, the example AMA data generator 350, the example reach data generator 352, the example exposure share data generator 354, the example audience share data generator 356, the example GRP data generator 358, the example DP raw exposure aggregator 360, and/or the example audience adjuster 322 are described below with reference to FIGS. 17A-17B, 18, 19A-19B, 20, and 21.

Figure 4:
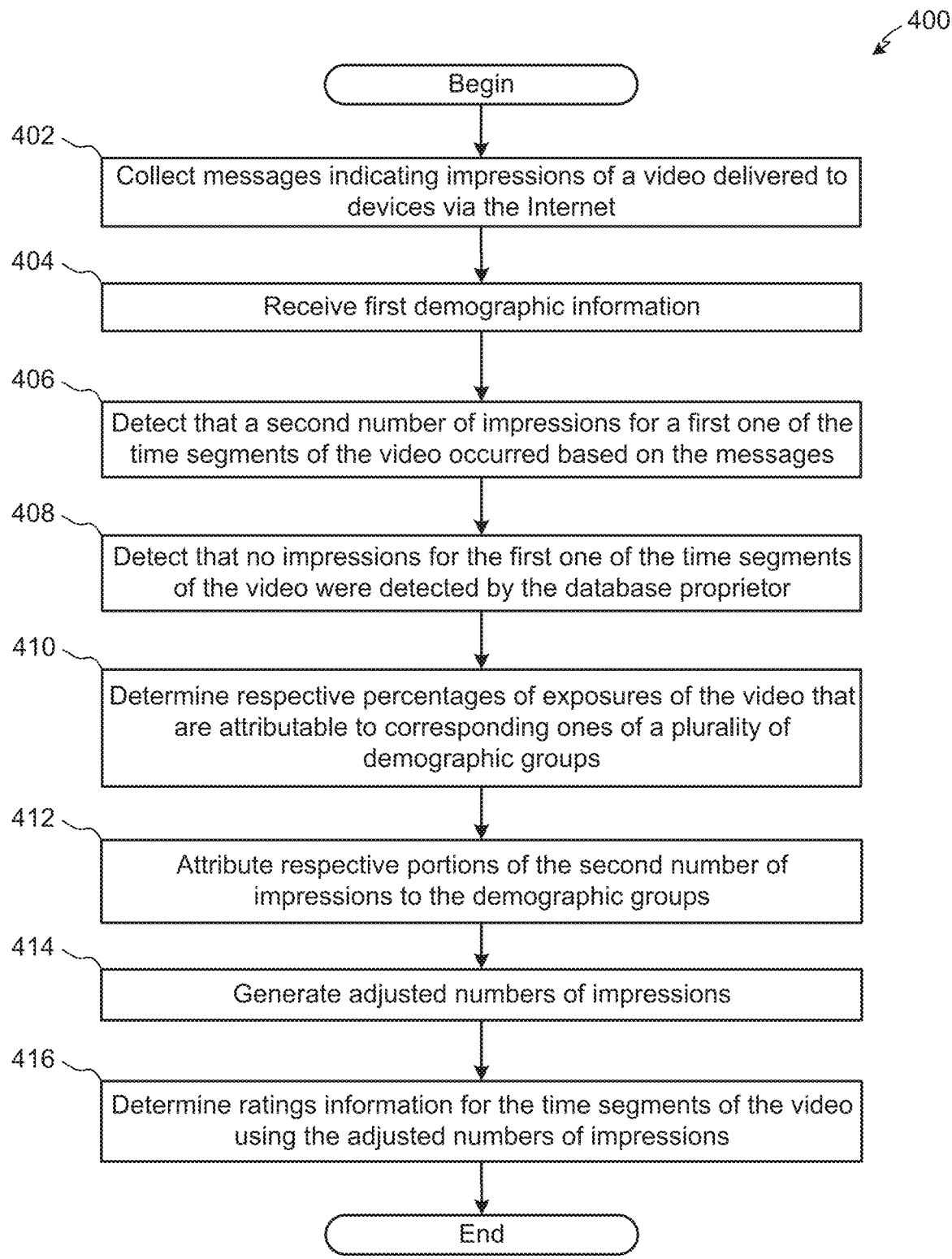
FIG. 4 is a flowchart representative of example machine readable instructions which may be executed to implement the audience data generator of FIGS. 1-3 to determine ratings data from population sample data having incomplete demographic classifications.

While an example manner of implementing the audience data generator of FIG. 3 is illustrated in FIG. 4, one or more of the elements, processes and/or devices illustrated in FIG. 4 may be combined, divided, re-arranged, omitted, eliminated and/or implemented in any other way. Further, the example segment data manager 302, the example episode data manager 304, the example program data manager 306, the example distributor data manager 308 may call on the demographic distributor 312, the segment calibrator 314, the episode calibrator 316, the segment imputer 318, and/or the ratings data generator 320, the audience adjuster 322, the impressions adjuster 324, the impression scaler 326, and the impression duration data generator 328, the example episode exposure data generator 330, the example episode duration data generator 332, the example exposure distribution data generator 334, and the example duration distribution data generator 336, the example impression imputer 338, and the example duration imputer 340, the example total exposure data generator 342, the example total duration data generator 344, the example frequency calculator 346, the example audience data error corrector 348, the example AMA data generator 350, the example reach data generator 352, the example exposure share data generator 354, the example audience share data generator 356, the example GRP data generator 358, the example DP raw exposure aggregator 360 and/or, more generally, the example audience data generator 120 of FIGS. 1, 2, and/or 3 may be implemented by hardware, software, firmware and/or any combination of hardware, software and/or firmware. Thus, for example, any of the example segment data manager 302, the example episode data manager 304, the example program data manager 306, the example distributor data manager 308 may call on the demographic distributor 312, the segment calibrator 314, the episode calibrator 316, the segment imputer 318, and/or the ratings data generator 320, the audience adjuster 322, the impressions adjuster 324, the impression scaler 326, and the impression duration data generator 328, the example episode exposure data generator 330, the example episode duration data generator 332, the example exposure distribution data generator 334, and the example duration distribution data generator 336, the example impression imputer 338, and the example duration imputer 340, the example total exposure data generator 342, the example total duration data generator 344, the example frequency calculator 346, the example audience data error corrector 348, the example AMA data generator 350, the example reach data generator 352, the example exposure share data generator 354, the example audience share data generator 356, the example GRP data generator 358, the example DP raw exposure aggregator 360 and/or, more generally, the example audience data generator 120 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example segment data manager 302, the example episode data manager 304, the example program data manager 306, the example distributor data manager 308 may call on the demographic distributor 312, the segment calibrator 314, the episode calibrator 316, the segment imputer 318, and/or the ratings data generator 320, the audience adjuster 322, the impressions adjuster 324, the impression scaler 326, and the impression duration data generator 328, the example episode exposure data generator 330, the example episode duration data generator 332, the example exposure distribution data generator 334, and the example duration distribution data generator 336, the example impression imputer 338, and the example duration imputer 340, the example total exposure data generator 342, the example total duration data generator 344, the example frequency calculator 346, the example audience data error corrector 348, the example AMA data generator 350, the example reach data generator 352, the example exposure share data generator 354, the example audience share data generator 356, the example GRP data generator 358, the example DP raw exposure aggregator 360 and/or, more generally, the example audience data generator 120 is/are hereby expressly defined to include a tangible computer readable storage device or storage disk such as a memory, a digital versatile disk (DVD), a compact disk (CD), a Blu-ray disk, etc. storing the software and/or firmware. Further still, the example audience data generator 120 of FIGS. 1, 2, and/or 3 may include one or more elements, processes and/or devices in addition to, or instead of, those illustrated in FIG. 3, and/or may include more than one of any or all of the illustrated elements, processes and devices.

Flowcharts representative of example machine readable instructions for implementing the audience data generator 120 of FIGS. 1, 2, and/or 3 are shown in FIGS. 4, 5, 7, 11, 13, 15, 17A-17B, and 19A-19B. In this example, the machine readable instructions comprise program(s) for execution by a processor such as the processor 2212 shown in the example processor platform 2200 discussed below in connection with FIG. 22. The program(s) may be embodied in software stored on a tangible computer readable storage medium such as a CD-ROM, a floppy disk, a hard drive, a digital versatile disk (DVD), a Blu-ray disk, or a memory associated with the processor 2212, but the entire program(s) and/or parts thereof could alternatively be executed by a device other than the processor 2212 and/or embodied in firmware or dedicated hardware. Further, although the example program(s) are described with reference to the flowcharts illustrated in FIGS. 4, 5, 7, 11, 13, 15, 17A-17B, and 19A-19B, many other methods of implementing the example audience data generator 120 may alternatively be used. For example, the order of execution of the blocks may be changed, and/or some of the blocks described may be changed, eliminated, or combined.

As mentioned above, the example processes of FIGS. 4, 5, 7, 11, 13, 15, 17A-17B, and 19A-19B may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and transmission media. As used herein, "tangible computer readable storage medium" and "tangible machine readable storage medium" are used interchangeably. Additionally or alternatively, the example processes of FIGS. 4, 5, 7, 11, 13, 15, 17A-17B, and 19A-19B may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and transmission media. As used herein, when the phrase "at least" is used as the transition term in a preamble of a claim, it is open-ended in the same manner as the term "comprising" is open ended.

FIG. 4 is a flowchart representative of example machine readable instructions 400 which may be executed to implement the audience data generator 120 of FIGS. 1-3 to determine ratings data from population sample data having incomplete demographic classifications.

The example AME impressions collector 218 collects messages (e.g., the beacon requests 212, 226a, 226b) indicating impressions of a video delivered to devices (e.g., the client device 102) via the Internet (block 402). The messages identify time segments of the video presented at the devices.

The example DP impressions collector 232 receive first demographic information (block 404). For example, the first demographic information may describe first numbers of impressions of time segments of the video attributed to respective demographic groups by the database proprietor 116. The first numbers of the impressions correspond to the impressions of the video at the devices 102.

The example audience data generator 120 of FIGS. 1, 2, and 3 (e.g., via the segment imputer 318) detects that a second number of impressions for one of the time segments of the video occurred based on the messages (block 406). The example segment imputer 318 also detects that no impressions for the one of the time segments of the video were detected by the DP 116 (block 408).

The example audience data generator 120 (e.g., via the exposure distribution data generator 334 and/or the demographic distributor 312) determines respective percentages of exposures of the video that are attributable to corresponding ones of multiple demographic groups (block 410). The example demographic distributor 312 may determine the respective percentages based on the demographic information provided by the DP 116 for exposures of other time segments of the video.

The example audience data generator 120 (e.g., via the segment imputer 318 of FIG. 3) attributes respective portions of the second number of impressions to corresponding demographic groups (block 412). For example, the audience data generator 120 may attribution the portions of the second number of impressions based on the percentages to determine imputed numbers of impressions.

The example audience data generator 120 (e.g., via the ratings data generator 320) generates adjusted numbers of impressions (block 414). For example, the adjusted numbers of impressions may be based on the first numbers of impressions and the imputed numbers of impressions. The example audience data generator 120 (e.g., via the ratings data generator 320) determines ratings information for the time segments of the video using the adjusted numbers of impressions (block 416).

The example instructions 400 of FIG. 4 may then end. More detailed examples of implementing the instructions 400 of FIG. 4 are described below with reference to FIGS. 5-21.

Gender Redistribution at the Segment Level

Figure 5:
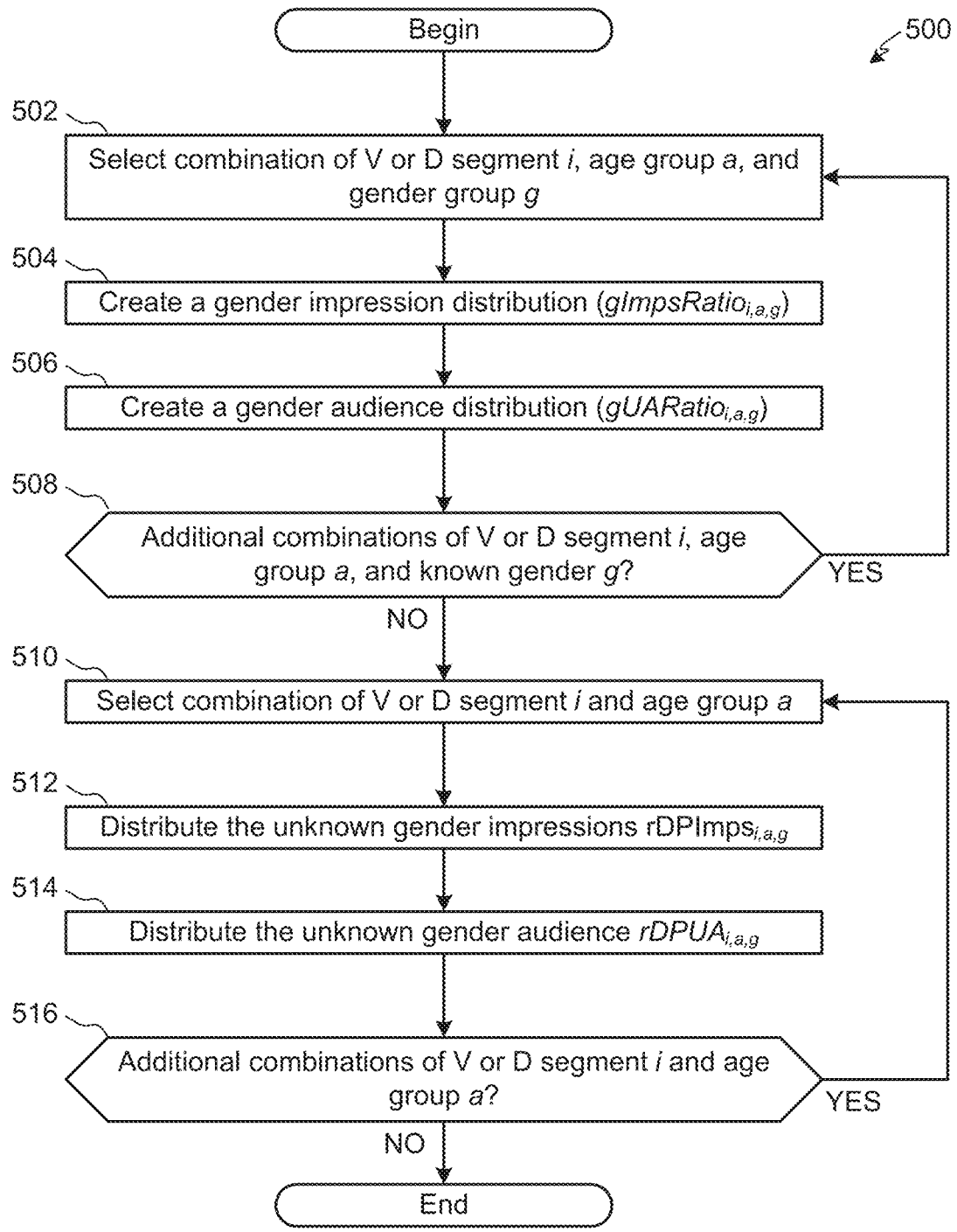
FIG. 5 is a flowchart representative of example machine readable instructions which may be executed to implement the audience data generator of FIGS. 1-3 to perform demographic redistribution of database proprietor demographic data at a time segment level.

FIG. 5 is a flowchart representative of example machine readable instructions 500 which may be executed to implement the audience data generator 120 of FIGS. 1-3 to perform demographic redistribution of DP demographic data at a time segment level. The example instructions 500 are described below with respect to a redistribution of a gender group, but may be modified to redistribute DP demographic data according to any demographic quality. FIG. 6 illustrates an example demographic redistribution of database proprietor demographic data 600 at a time segment level. The example instructions 500 of FIG. 5 are described below with reference to the example demographic distributor 312 of FIG. 3 and/or the data 600 of FIG. 6.

The example demographic distributor 312 receives as input post-Decision-Tree (DT) time segment-level demographic data from the DP 116 of FIGS. 1 and/or 2 (e.g., via the DP data manager 310 of FIG. 3). As shown in FIG. 6, the demographic data may include V segments 602 (e.g., non-durational segments corresponding to V requests sent by the client device 102 upon playback of a video) and/or D segments 604 (e.g., durational segments corresponding to D requests sent by the client device 102 to provide information regarding playback of the video).

In the example data 600, each of the segments 602, 604 corresponds to a distributor 606, a program 608, and an episode 610. The DP 116 provides aggregated impression and audience information for the segments 602, 604, including unique audience counts 612 and impression counts 614 for each of the demographic groups 616 (e.g., male, age 12+ and female, age 12+). The example DP 116 also provides the unique audience counts 612 and the impression counts 614 for an unknown demographic group, which corresponds to unique audience members 612 and impressions 614 that the DP 116 counted based on the pings or requests, but for which the DP was unable to identify the demographic group 616.

In the example instructions 500, the example demographic distributor 312 of FIG. 3 selects a combination of a V segment or a D segment i, an age group a, and a gender group g (block 502). In this example, the gender groups "male" and "female" are referred to by indices g=1 and 2, and an unknown gender group is referred to using the index g=0.

The example demographic distributor 312 calculates a gender impression distribution (e.g., $gImpsRatio_{i,a,g}$) (block 504). For example, the gender impression distribution $gImpsRatio_{i,a,g}$ may be a ratio of the impressions 614 for the selected segment i, age group a, and gender group g (e.g., $Imps_{i,a,g}$) and total impressions across all of the gender groups (e.g., for g=1 and g=2) for the selected age group a & the selected segment i. For example, the demographic distributor 312 determines a gender impression distribution 618 of 53.7% for the male demographic group for the segment 602 (e.g., 110/(110+95) impressions 614) and 46.3% for the female demographic group for the segment 602 (e.g., 95/(110+95) impressions 614) in the example of FIG. 6. Equation 1 below may be used to implement block 504.

$$gImpsRatio_{i,a,g} = Imps_{i,a,g} \bigg/ \sum_{g=1}^{g} (Imps_{i,a,g}), \text{ where } g = 1 \ \& \ 2 \quad \text{(Equation 1)}$$

The example demographic distributor 312 also creates a gender audience distribution (e.g., gUARatio$_{i,a,g}$) (block 506). For example, the gender audience distribution gUARatio$_{i,a,g}$ may be a ratio of the unique audience count 612 for the selected segment i, age group a, and gender group g (e.g., UA$_{i,a,g}$) and total unique audience count across all of the gender groups (e.g., for g=1 and g=2) for the selected age group a & the selected segment i. For example, the demographic distributor 312 determines an audience distribution 620 of 54.1% for the male demographic group for the segment 602 (e.g., 100/(100+85)) and 45.9% for the female demographic group for the segment 602 (e.g., 85/(100+85)) in the example of FIG. 6. Equation 2 below may be used to implement block 506.

$$gUARatio_{i,a,g} = UA_{i,a,g} \bigg/ \sum_{g=1}^{g} (UA_{i,a,g}), \text{ where } g = 1 \ \& \ 2 \quad \text{(Equation 2)}$$

The example demographic distributor 312 determines whether there are additional combinations of segments i, age groups a, and known gender g (block 508). If there are additional combinations (e.g., combinations for which the distributions of the impressions and/or unique audience counts are to be created) (block 508), control returns to block 502.

When there are no more combinations of segments i, age groups a, and known gender g (block 508), the example demographic distributor 312 selects a combination of a V segment or a D segment i and an age group a (block 510).

The demographic distributor 312 distributes the unknown gender impressions (e.g., rDPImps$_{i,a,g}$) (block 512). For example, the demographic distributor 312 may distribute the unknown gender impressions rDPImps$_{i,a,g}$ by applying the gender impression distribution 618 to the impressions 614 with unknown gender (Imps$_{i,a,0}$) for the selected segment i & age group a. For example, the demographic distributor 312 determines 126 redistributed impressions 622 of FIG. 6 for the male demographic group (e.g., 110+0.537*30=126) and 109 redistributed impressions 622 for the female demographic group (e.g., 95+0.463*30=109) by applying (e.g., multiplying) the respective gender impression distribution 618 to the unknown gender impressions 614. As shown in FIG. 6, the total DP impressions 614 are equal to the total redistributed impressions 622. Equation 3 below may be used to implement block 512.

$$rDPImps_{i,a,g} = Imps_{i,a,g} + (Imps_{i,a,0} * gImpsRatio_{i,a,g}) \quad \text{(Equation 3)}$$

The demographic distributor 312 distributes the unknown gender audience rDPUA$_{i,a,g}$ (block 514). For example, the demographic distributor 312 may distribute the unknown gender audience rDPUA$_{i,a,g}$ by applying the gender audience distribution gUARatio$_{i,a,g}$ to the UA with unknown gender (UA$_{i,a,0}$) for the selected segment i & age group a. For example, the demographic distributor 312 determines 111 redistributed audience members 624 of FIG. 6 for the male demographic group (e.g., 100+0.541*20=111) and 94 redistributed audience members 624 for the female demographic group (e.g., 85+0.459*20=94) by applying (e.g., multiplying) the respective gender UA distribution 620 to the unknown gender UA 612. As shown in FIG. 6, the total DP unique audience 612 are equal to the total redistributed unique audience 624. Equation 4 below may be used to implement block 514.

$$rDPUA_{i,a,g} = UA_{i,a,g} + (UA_{i,a,0} * gUARatio_{i,a,g}) \quad \text{(Equation 4)}$$

The example demographic distributor 312 determines whether there are additional combinations of segments i and age groups a (block 516). If there are additional combinations (e.g., combinations for which the unknown impressions and/or unique audience counts are to be distributed) (block 516), control returns to block 510. When there are no more combinations (block 516), the example instructions 500 end.

Gender Redistribution at the Episode/Program/Distributor Level(s)

Figure 7:
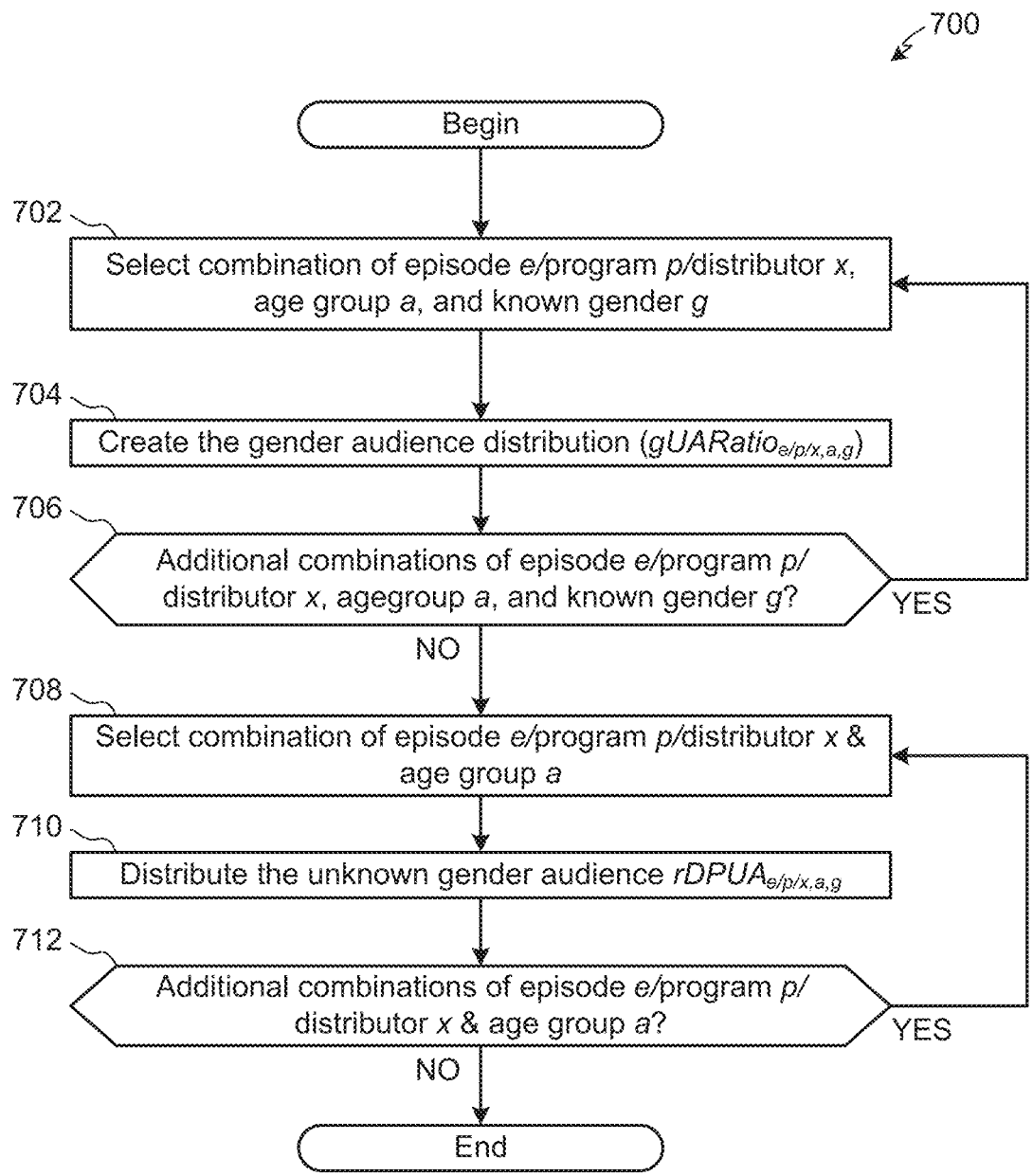
FIG. 7 is a flowchart representative of example machine readable instructions which may be executed to implement the audience data generator of FIGS. 1-3 to perform demographic redistribution of database proprietor demographic data at an episode level.

FIG. 7 is a flowchart representative of example machine readable instructions 700 which may be executed to implement the audience data generator 120 of FIGS. 1-3 to perform demographic redistribution of database proprietor demographic data at an episode level, a program level, or a distributor level. The example demographic distributor 312 of FIG. 3 may perform the instructions 700 of FIG. 7 to distribute impressions and/or unique audience members for which the DP 116 is unable to determine a gender at the episode level, a program level, or a distributor level. The example instructions 700 are described below with respect to a redistribution of a gender group, but may be modified to redistribute DP demographic data according to any demographic quality.

FIG. 8 illustrates an example demographic redistribution of database proprietor demographic data 800 at an episode level. FIG. 9 illustrates an example demographic redistribution of database proprietor demographic data 900 at a program level. FIG. 10 illustrates an example demographic redistribution of database proprietor demographic data 1000 at a distributor level.

The example demographic distributor 312 receives as input post-Decision-Tree (DT) episode-level demographic data from the DP 116 of FIGS. 1 and/or 2 (e.g., via the DP data manager 310 of FIG. 3). As shown in FIG. 8, the episode-level demographic data 800 includes episode-level unique audience counts 802, which correspond to a distributor 804, a program 806, and an episode 808. The DP 116 aggregates and de-duplicates the unique audience counts for all time segments included in the identified episode 808. The example unique audience counts 802 are attributed to demographic groups 810 (e.g., male, age 12+ and female, age 12+) by the DP 116. The example DP 116 also provides the unique audience counts 802 for an unknown demographic group, which corresponds to unique audience members 810 that the DP 116 counted based on the pings or requests, but for which the DP 116 was unable to identify the demographic group 810.

Similarly, the example demographic distributor 312 receives as input post-Decision-Tree (DT) program-level demographic data and distributor-level demographic data from the DP 116 of FIGS. 1 and/or 2 (e.g., via the DP data manager 310 of FIG. 3). As shown in FIG. 9, the program-level demographic data 900 includes program-level unique audience counts 902, which correspond to a distributor 904 and a program 906. The example unique audience counts 902 are attributed to demographic groups 908 (e.g., male, age 12+ and female, age 12+) by the DP 116. As shown in FIG. 10, the distributor-level demographic data 1000 includes distributor-level unique audience counts 1002, which correspond to a distributor 1004. The example unique audience counts 1002 are attributed to demographic groups 1006 (e.g., male, age 12+ and female, age 12+) by the DP 116.

Because the demographic distributor 312 may execute similar instructions to perform distribution at any of the episode level, the program level, or the distributor level, the example instructions 700 of FIG. 7 are described below using the episode level, the program level, and the distributor level in the alternative (e.g., episode/program/distributor).

In the example instructions 700 of FIG. 7, the example demographic distributor 312 of FIG. 3 selects a combination of an episode e/program p/distributor x, an age group a, and a gender group g (block 702). In this example, the gender groups "male" and "female" are referred to by indices g=1 and 2, and an unknown gender group is referred to using the index g=0.

The example demographic distributor 312 creates a gender audience distribution (e.g., gUARatio$_{e/p/x,a,g}$) (block 704). For example, the gender audience distribution gUARatio$_{e/p/x,a,g}$ may be a ratio of the unique audience count 802, 902, 1002 for the selected episode e/program p/distributor x, age group a, and gender group g (e.g., UA$_{e/p/x,a,g}$) and total unique audience count across all of the gender groups (e.g., for g=1 and g=2) for the selected age group a & the selected segment i. In the example of FIG. 8, the demographic distributor 312 determines an audience distribution 812 of 54.7% for the male demographic group for the selected episode (e.g., 105/(105+87)) and 45.3% for the female demographic group for the selected episode (e.g., 87/(105+87)). In the example of FIG. 9, the demographic distributor 312 determines an audience distribution 910 of 38.5% for the male demographic group D1 for the selected episode (e.g., 125/(125+200)) and 61.5% for the female demographic group D2 for the selected episode (e.g., 200/(200+125)). In the example of FIG. 10, the demographic distributor 312 determines an audience distribution 1008 of 45.5% for the male demographic group D1 for the selected episode (e.g., 250/(250+300)) and 54.5% for the female demographic group D2 for the selected episode (e.g., 300/(250+300)). Equation 5 below may be used to implement block 704.

$$gUARatio_{e/p/x,a,g} = UA_{e/p/x,a,g} \Big/ \sum\nolimits_{g=1}^{g} (UA_{e/p/x,a,g}), \quad \text{(Equation 5)}$$

where g = 1 & 2

The example demographic distributor 312 determines whether there are additional combinations of episode e/program p/distributor x, age groups a, and known gender g (block 706). If there are additional combinations (e.g., combinations for which the distributions of the unique audience counts are to be created) (block 706), control returns to block 702.

When there are no more combinations of episode e/program p/distributor x, age groups a, and known gender g (block 706), the example demographic distributor 312 selects a combination of an episode e/program p/distributor x and an age group a (block 708).

The demographic distributor 312 distributes the unknown gender audience (e.g., rDPUA$_{e/p/x,a,g}$) (block 710). For example, the demographic distributor 312 may distribute the unknown gender audience rDPUA$_{e/p/x,a,g}$ by applying the gender audience distribution gUARatio$_{e/p/x,a,g}$ 812, 910, 1008 to the UA 802, 902, 1002 for which the gender is unknown (UA$_{e/p/x,a,0}$) for the selected episode e/program p/distributor x and age group a. In the example of FIG. 8, the demographic distributor 312 determines 116 redistributed unique audience members 814 for the male demographic group (e.g., 105+0.547*20=116) and 96 redistributed unique audience members 814 for the female demographic group (e.g., 87+0.453*20=96) by applying (e.g., multiplying) the respective gender unique audience distribution 812 to the unknown gender unique audience 802. As shown in FIG. 8, the total DP unique audience 802 are equal to the total redistributed unique audience 814. In the example of FIG. 9, the demographic distributor 312 determines 133 redistributed unique audience members 912 for the male demographic group (e.g., 125+0.385*20=116) and 212 redistributed unique audience members 912 for the female demographic group (e.g., 200+0.615*20=212) by applying (e.g., multiplying) the respective gender unique audience distribution 910 to the unknown gender unique audience 902. As shown in FIG. 9, the total DP unique audience 902 are equal to the total redistributed unique audience 912. In the example of FIG. 10, the demographic distributor 312 determines 259 redistributed unique audience members 1010 for the male demographic group (e.g., 250+0.455*20=259) and 311 redistributed unique audience members 1010 for the female demographic group (e.g., 300+0.545*20=311) by applying (e.g., multiplying) the respective gender unique audience distribution 1008 to the unknown gender unique audience 1002. As shown in FIG. 10, the total DP unique audience 1002 are equal to the total redistributed unique audience 1010. Equation 6 below may be used to implement block 710.

$$rDPUA_{e,a,g} = UA_{e,a,g} + (UA_{e,a,0} * gUARatio_{e,a,g}) \quad \text{(Equation 6)}$$

The example demographic distributor 312 determines whether there are additional combinations of episode e/program p/distributor x and age groups a (block 712). If there are additional combinations (e.g., combinations for which the distributions of the unique audience counts are to be created) (block 712), control returns to block 708. When there are no more combinations of episode e/program p/distributor x and age groups a (block 712), the example instructions 700 of FIG. 7 end.

Calibration at the Segment level

Figure 11:
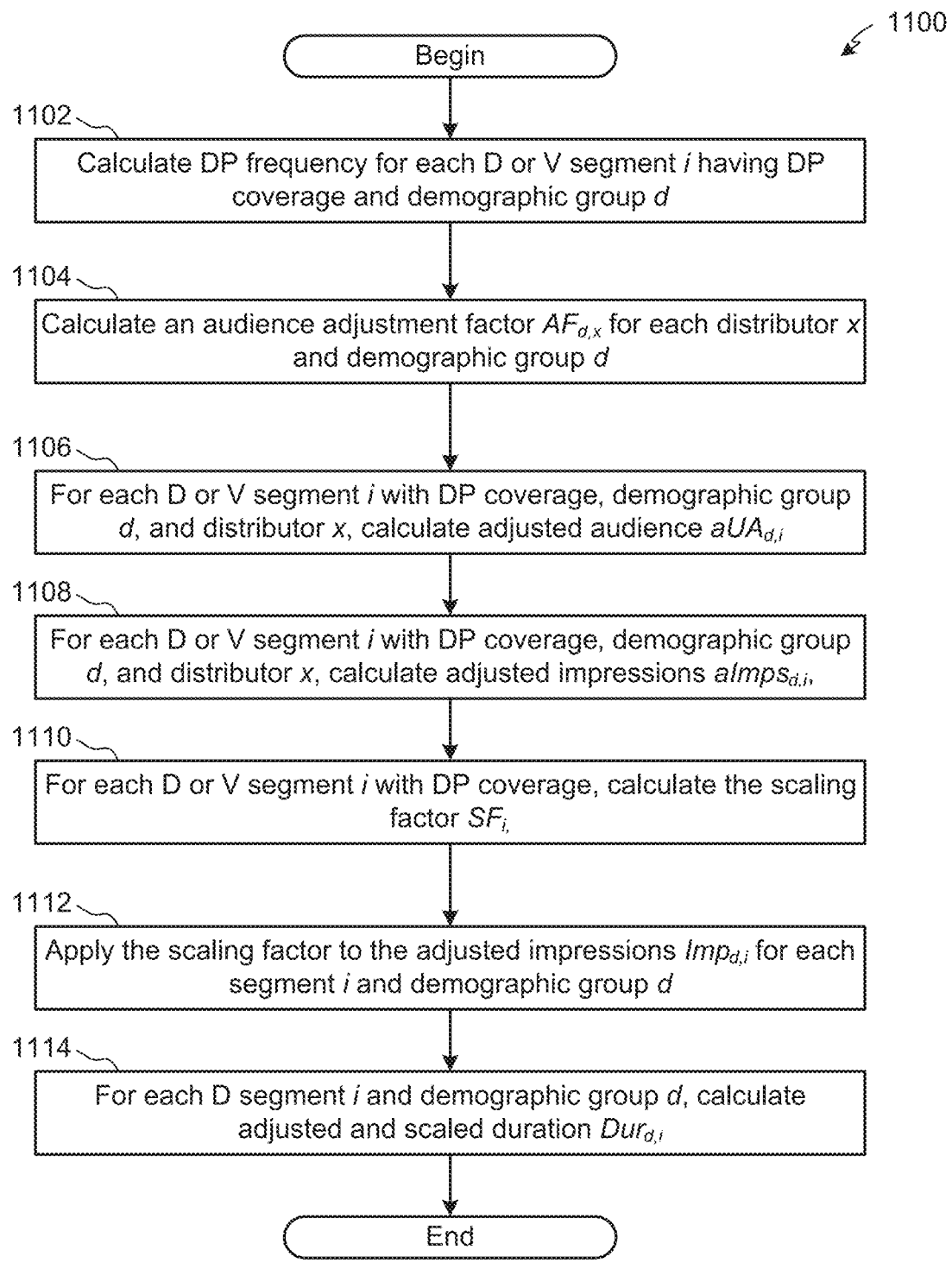
FIG. 11 is a flowchart representative of example machine readable instructions which may be executed to implement the audience data generator of FIGS. 1-3 to adjust database proprietor demographic data for demographic misattribution and database proprietor non-coverage at the time segment level.

FIG. 11 is a flowchart representative of example machine readable instructions 1100 which may be executed to implement the audience data generator 120 of FIGS. 1-3 to adjust database proprietor demographic data for demographic misattribution and database proprietor non-coverage at the time segment level. FIGS. 12A-12B illustrate example data according to an example adjustment of database proprietor demographic data for demographic misattribution and database proprietor non-coverage at the time segment level. The example instructions 1100 are described below with reference to the example segment calibrator 314 of FIG. 3 and the example data 1200 of FIGS. 12A-12B.

By executing the example instructions, the segment calibrator 314 performs data calibration at the lowest (e.g., most granular) level of data provided by the DP 116. The example data 1200 is organized by different time segments 1202, 1204, 1206, 1208, 1210, 1212, which correspond to respective episodes 1214 (e.g., episode 1, episode 2, etc.), programs 1216 (e.g., program 1, program 2, etc.), and distributors 1218 (e.g., distributor 1, distributor 2, etc.). For each of the example segments 1202-1212 of FIG. 12A, the data 1200 includes unique audience counts 1220 and impression counts 1222 for each of the monitored demographic groups. In the data 1200 of FIGS. 12A-12B, the unique audience counts 1220 and the impression counts 1222 have been redistributed to account for missing demographic information (e.g., missing gender) as described above with reference to FIGS. 5 and 6.

In the example data 1200 of FIGS. 12A-12B, each D segment 1204, 1206, 1208, 1210, 1212 has the format D_s_abcde, where s denotes the segment of the episode being watched, and s can vary between 1 and n, with n being the last segment of the episode. In the segment format D_s_abcde, the terms a, b, c, d, and e refer to the $1^{st}$, $2^{nd}$, $3^{rd}$, $4^{th}$, and $5^{th}$ minutes of the given segment, respectively, where the value 0 indicates that the minute was not watched and the value 1 indicates that the minute was watched. The example segment calibrator 314 calculates an number of minutes watched 1226 for each of the example D segments 1204-1212, as the sum of the 1's in the last 5 digits of the D segment code.

The example segment calibrator 314 calculates (e.g., requests the frequency calculator 346 to calculate) a DP frequency 1224 ($Freq_{d,i}$) for each D or V segment i having DP coverage (e.g., segments 1204, 1206, 1208, 1210, 1212) and demographic group d (block 1102). For example, the DP frequency 1224 may be a ratio of a) DP impressions 1222 ($rDPImps_{d,i}$) for the demographic group d and segment i and b) DP UA 1220 ($rDPUA_{d,e}$) for the demographic group d and an episode e 1214 corresponding to the segment. In the example of FIGS. 12A-12B, the frequency calculator 346 calculates a DP frequency 1224 for the demographic groups D1 and D2 for the segment 1204 as 1.14 (e.g., 126/111=1.14) and 1.16 (e.g., 109/94=1.16), respectively. Equation 7 below may be used to implement block 1102.

$$Freq_{d,i} = rDPImps_{d,i}/rDPUA_{d,e} \quad \text{(Equation 7)}$$

The example audience adjuster 322 calculates an audience adjustment factor $AF_{d,x}$ for each demographic group d and distributor x (e.g., the distributors 1218 corresponding to the segments 1202-1212) (block 1104). In the example of FIGS. 12A-12B, UA adjustment factors 1228 are provided based on the distributor 1218 corresponding to the segments 1202-1212. The example distributor 1 of FIG. 12A has a UA adjustment factor 1228 of 0.60 for demographic group D1 and a UA adjustment factor 1228 of 0.40 for demographic group D2.

For each D or V segment i with DP coverage, demographic group d, and distributor x, the example audience adjuster 322 calculates an adjusted audience $aUA_{d,i}$ (block 1106). For example, the adjusted audience $aUA_{d,i}$ may be the ratio of raw DP unique audience $rDPUA_{d,i}$ and the distributor-level audience adjustment factor $AF_{d,x}$. In the example of FIGS. 12A-12B, the audience adjuster 322 calculates adjusted UA 1230 for the segment 1204 of 185 for demographic group D1 (e.g., 185=111/0.60) and 236 for demographic group D2 (e.g., 236=94/0.40). Equation 8 below may be used to implement block 1106.

$$aUA_{d,i} = rDPUA_{d,i}/AF_{d,x} \quad \text{(Equation 8)}$$

For each D or V segment i with DP coverage, demographic group d, and distributor x, the example impressions adjuster 324 calculates adjusted impressions $aImps_{d,i}$ (block 1108). For example, the adjusted impressions $aImps_{d,i}$ may be a product of the adjusted unique audience $aUA_{d,i}$ and the DP frequency $Freq_{d,i}$. For the example segment 1204 of FIGS. 12A-12B, the impressions adjuster 324 calculates adjusted impressions 1232 segment 1204 of 210 for the demographic group D1 (e.g., 210=185*1.14) and 273 for the demographic group D2 (e.g., 273=236*1.16). Equation 9 below may be used to implement block 1108.

$$aImps_{d,i} = aUA_{d,i} * Freq_{d,i} \quad \text{(Equation 9)}$$

Let the site census impressions for each V or D-segment i be denoted as $SCimp_i$. For each D or V segment i with DP coverage, the example impression scaler 326 calculates the scaling factor $SF_i$. (block 1110). In some examples, the scaling factor $SF_i$ may be the ratio of $SCimp_i$ and the sum of adjusted impressions $aImps_{d,i}$ across all of the demographic groups d for that segment i. In the example of FIGS. 12A-12B, the impression scaler 326 determines an impression scaling factor 1234 for the segment 1204 as the ratio of the site census impressions 1236 to the total adjusted impressions 1232. In the example of FIGS. 12A-12B, the impression scaling factor 1234 for the segment 1204 is 0.54 (e.g., 0.54=260/483). Equation 10 below may be used to implement block 1110. In Equation 10 below, the term D is the number of demographic segments.

$$SF_i = SCimps_i / \sum_{d=1}^{D} (aImps_{d,i}) \quad \text{(Equation 10)}$$

The example impressions scaler 326 applies the scaling factor $SF_i$ to the adjusted impressions $aImps_{d,i}$ for each segment i and demographic group d (block 1112). For example, the impressions scaler 326 may determine a final segment level adjusted and scaled impressions $Imp_{d,i}$ by applying the scaling factor $SF_i$ to the adjusted impressions $aImps_{d,i}$. In the example of FIGS. 12A-12B, the impressions scaler 326 determines adjusted and scaled impressions 1238 for the segment 1204 by multiplying the scaling factor 1234 and the adjusted impressions 1232. For the segment 1204, the adjusted and scaled impressions 1238 for the demographic group D1 is 113 (e.g., 113=210*0.54) and the adjusted and scaled impressions 1238 for the demographic group D2 is 147 (e.g., 147=273*0.54). Equation 11 below may be used to implement block 1112.

$$Imp_{d,i} = SF_i * aImps_{d,i} \quad \text{(Equation 11)}$$

The example impression duration data generator 328 of FIG. 3 calculates, for each D segment i and demographic group d, an adjusted and scaled duration (block 1114). For example, the adjusted and scaled duration may be determined by multiplying the adjusted and scaled impressions $Imps_{d,i}$ by the corresponding minutes watched $m_i$ for that segment i. For the example segment 1206 of FIGS. 12A-12B, there are 4 minutes watched 1226 per impression. The example impression duration data generator 328 calculates an adjusted and scaled duration 1240 for the segment 1208 as 272 for the demographic group D1 (e.g., 272=68*4) and 260 for the demographic group D1 (e.g., 260=65*4). Equation 12 below may be used to implement block 1114.

$$Dur_{d,i} = m_i * Imps_{d,i} \quad \text{(Equation 12)}$$

The example instructions 1100 of FIG. 11 then end.

Calibration at the Episode Level

Figure 13:
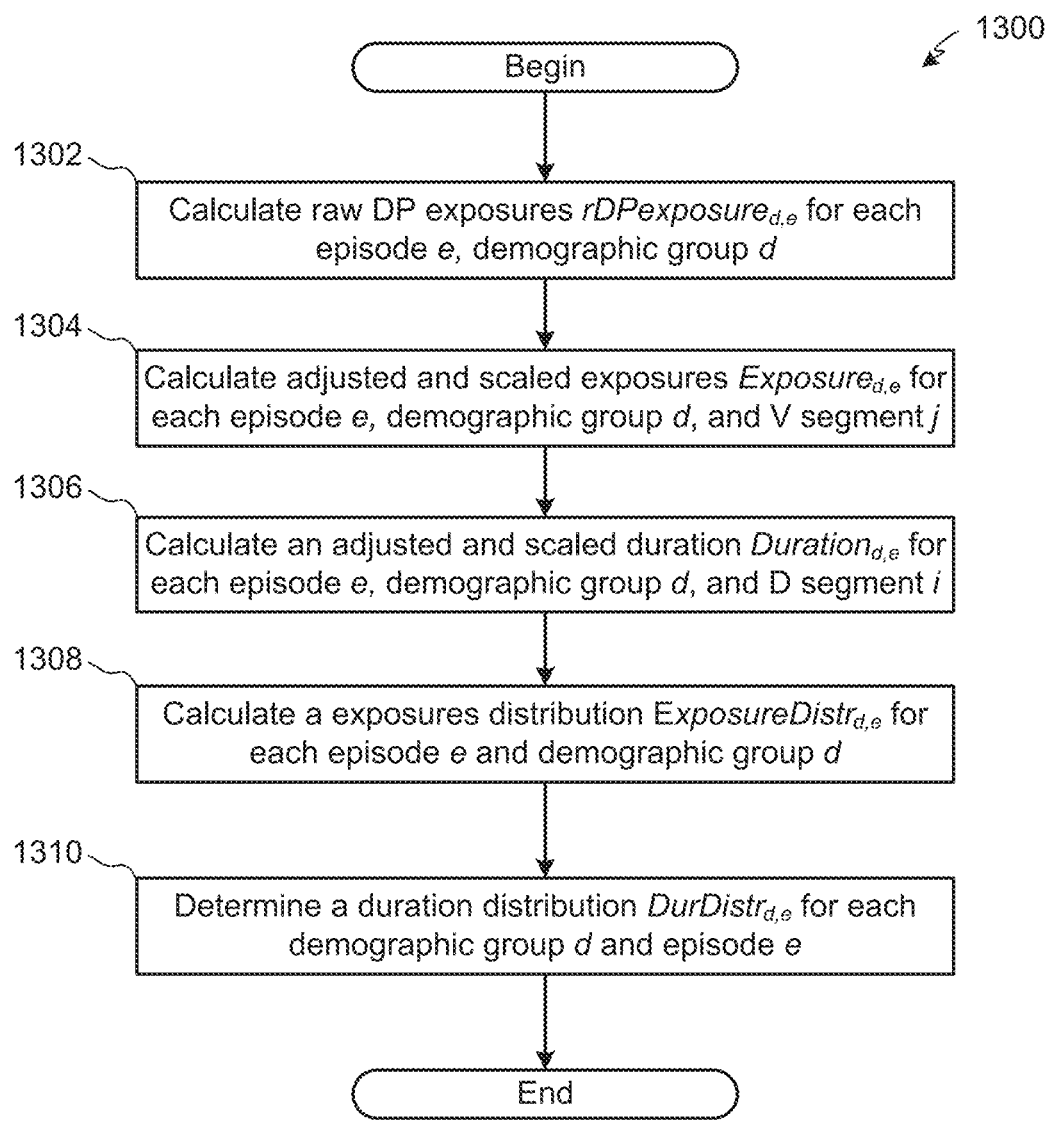
FIG. 13 is a flowchart representative of example machine readable instructions which may be executed to implement the audience data generator of FIGS. 1-3 to adjust database proprietor demographic data for demographic misattribution and database proprietor non-coverage at the episode level.

FIG. 13 is a flowchart representative of example machine readable instructions 1300 which may be executed to implement the audience data generator of FIGS. 1-3 to adjust database proprietor demographic data for demographic misattribution and database proprietor non-coverage at the episode level. FIG. 14 illustrates an example adjustment of database proprietor demographic data 1400 for demographic misattribution and database proprietor non-coverage at the episode level. The example instructions 1300 of FIG. 13 and the example database proprietor demographic data 1400 of FIG. 14 are based on calibrated segment level data calculated as described above in FIGS. 11 and 12, and based on redistributed database proprietor demographic data calculated as described above in FIGS. 7 and 8.

The example data 1400 is organized by different episodes 1402, 1404, 1406, 1408, which correspond to respective programs 1410 (e.g., program 1, program 2, etc.), and distributors 1412 (e.g., distributor 1, distributor 2, etc.). For each of the example episodes 1402-1408 of FIG. 14, the data 1400 of FIG. 14 includes unique audience counts 1414 and exposure counts 1416 for each of the monitored demographic groups 1418.

The example episode exposure data generator 330 of FIG. 3 calculates raw DP exposures (e.g., $rDPexposure_{d,e}$) for each episode e, demographic group d (block 1302). The raw DP exposures $rDPexposure_{d,e}$ may be a sum of the impressions of the V segments $rDPimp_{d,e,j}$ in the episode e. For example, the episode exposure data generator 330 calculates the exposures 1416 for each of the episodes 1402-1408 by summing the impressions of the V segments for the respective episodes 1402-1408 (e.g., the raw DP impressions 1222 for the V segment 1202 of FIGS. 12A-12B and additional V segments for the episode 1402). Equation 13 below may be used to implement block 1302. In example Equation 13, where k denotes the total number of V segments for the episode e.

$$rDPexposure_{d,e} = \sum\nolimits_{j=1}^{k} (rDPimp_{d,e,j}) \quad \text{(Equation 13)}$$

The example episode exposure data generator 330 calculates adjusted and scaled exposures $Exposure_{d,e}$ for each episode e, demographic group d, and V segment j (block 1304). The adjusted and scaled exposures $Exposure_{d,e}$ may be the sum of the adjusted and scaled impressions $Imp_{d,i}$ of the V segments j from the time-segment level data. For example, the episode exposure data generator 330 calculates adjusted and scaled exposures 1420 for the episode 1402 by adding the adjusted and scaled impressions 1238 of FIGS. 12A-12B for the V segment 1202 and additional V segments for the episode 1402. Equation 14 below may be used to implement block 1304.

$$Exposure_{d,e} = \sum\nolimits_{j=1}^{k} (Imp_{d,e,j}) \quad \text{(Equation 14)}$$

The example episode duration data generator 332 calculates an adjusted and scaled duration $Duration_{d,e}$ for each episode e, demographic group d, and D segment i (block 1306). The adjusted and scaled duration $Duration_{d,e}$ may be the sum of adjusted and scaled duration $Dur_{d,e,i}$ from the calibrated time segment-level data. In the example of FIG. 14, the episode duration data generator 332 calculates an adjusted and scaled duration 1422 for the episode 1402 by summing the adjusted and scaled durations 1240 of FIGS. 12A-12B for the D segments 1204, 1206, 1208, 1212 of FIGS. 12A-12B, and for other D segments for the episode 1402. Equation 15 below may be used to implement block 1306.

$$Duration_{d,e} = \sum\nolimits_{i=1}^{l} (Dur_{d,e,i}) \quad \text{(Equation 15)}$$

The example exposure distribution data generator 334 calculates an exposures distribution $ExposureDistr_{d,e}$ for each episode e and demographic group d (block 1308). For example, the exposures distribution $ExposureDistr_{d,e}$ may be a ratio of exposures of the episode e by the demographic group $dExposure_{d,e}$ and the total exposures at the episode level $Exposure_e$ (e.g., the sum of $Exposure_{d,e}$ across all demos for that episode). In the example of FIG. 14, the exposure distribution data generator 334 determines an exposures distribution ratio 1424 for the episode 1402 based on the adjusted and scaled exposures 1420 to be 41.85% for the demographic group D1 (e.g., 41.85%=130/(130+180)) and 58.15% for the demographic group D2 (e.g., 58.15%=180/(130+180)). Equation 16 below may be used to implement block 1308.

$$ExposureDistr_{d,e} = Exposure_{d,e}/Exposure_e \quad \text{(Equation 16)}$$

The example duration distribution data generator 336 determine a duration distribution $DurDistr_{d,e}$ for each demographic group d and episode e (block 1310). The example duration distribution $DurDistr_{d,e}$ may be the ratio of the duration for the demographic group d and the episode e $Dur_{d,e}$ and the total duration $Dur_e$ for the episode e (e.g., the sum of $Dur_{d,e}$ across all demographic groups d for that episode e). In the example of FIG. 14, the duration distribution data generator 336 determines a duration distribution ratio 1426 for the episode 1402 based on the adjusted and scaled duration 1422 to be 40.19% for the demographic group D1 (e.g., 40.19%=1254/(1254+1865)) and 59.81% for the demographic group D2 (e.g., 59.81%=1865/(1254+1865)). Equation 17 below may be used to implement block 1310.

$$DurDistr_{d,e} = Dur_{d,e}/Dur_e \quad \text{(Equation 17)}$$

The example instructions 1300 of FIG. 13 then end.

Segment Level Imputation of Exposures and Duration without DP Coverage

Figure 15:
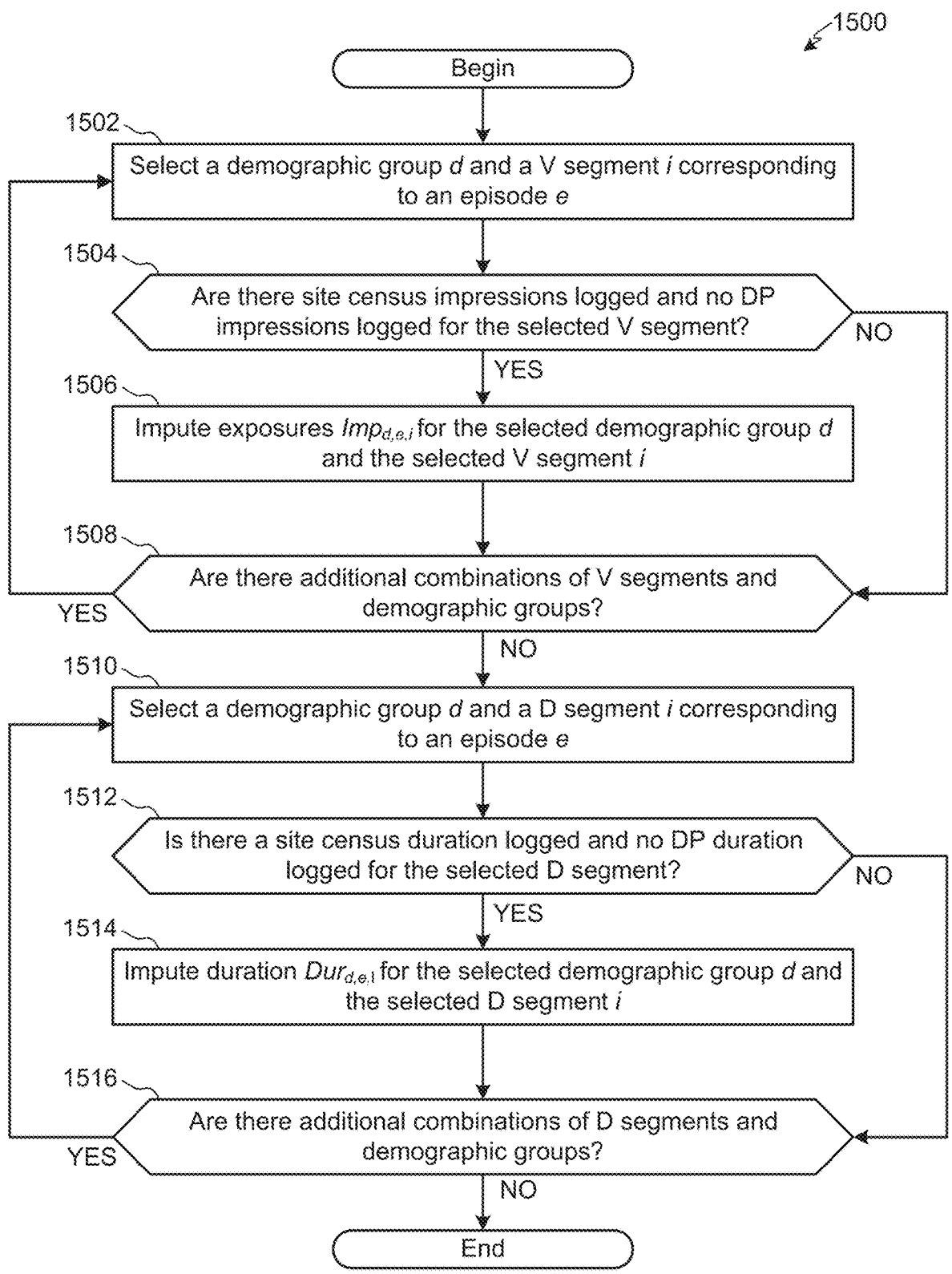
FIG. 15 is a flowchart representative of example machine readable instructions which may be executed to implement the audience data generator of FIGS. 1-3 to generate demographic data for impressions for which the database proprietor provided incomplete demographic classifications.

FIG. 15 is a flowchart representative of example machine readable instructions 1500 which may be executed to implement the audience data generator 120 of FIGS. 1-3 to generate demographic data for impressions for which the database proprietor provided incomplete demographic classifications. FIG. 16 illustrates an example generation of demographic data 1600 for impressions for which the DP 116 provided incomplete demographic classifications. The example instructions 1500 may be executed by the example segment imputer 318 of FIG. 3 to estimate impressions for D and/or V segments 1602, 1604, 1606, 1608 that do not have DP impressions but have one or more site census impressions. The example segment imputer 318 imputes the impressions using distributions of exposures and/or duration for the demographic groups at the episode level.

The example impression imputer 338 of FIG. 3 selects a demographic group d and a V segment i corresponding to an episode e (block 1502). The impression imputer 338 determines whether there are site census impressions logged and no DP impressions logged for the selected V segment (block 1504). The example segments 1602-1608 of FIG. 16 have been identified by the impression imputer 338 as segments 1602-1608 for which DP impressions 1610 have not been received (e.g., the DP 116 did not recognize any impressions for the segment 1602-1608), but one or more impressions have been received from the site census. The example segments 1602-1608 correspond to an episode 1614. The example impression imputer 338 and the duration imputer 340 impute the SC impressions 1612 and an SC duration 1616.

When there are site census impressions logged and no DP impressions logged for the selected V segment (block 1504), the impression imputer 338 imputes exposures $Imp_{d,e,i}$ for the selected demographic group d and the selected V segment i (block 1506). For example, the impression imputer 338 may apply the exposures distribution $ExposureDistr_{d,e}$ for the selected demographic group d and the selected episode e to the site census impressions $SCimp_{e,i}$ for the selected segment i of the selected episode. In the example of FIG. 16, the impression imputer 338 computes scaled impressions 1618 for the V segment 1604 by applying the exposure distribution ratio 1424 of FIG. 14 to the SC impressions 1612 for monitored demographic groups 1620. The example impression imputer 338 determines the scaled impressions 1618 for the segment 1604 as 13 for the demographic group D1 (e.g., 13=30*41.85%) and 17 for the demographic group D2 (e.g., 17=30*58.15%). Equation 18 below may be used to implement block 1506.

$$Imp_{d,e,i} = ExposureDistr_{d,e} * SCimp_{e,i} \qquad \text{(Equation 18)}$$

After imputing the impressions (block 1506), or when is not a mismatch between site census impressions logged and no DP impressions logged for the selected V segment (block 1504), the example impression imputer 338 determine whether there are additional combinations of V segments and demographic groups (block 1508). If there are more combinations of V segments and demographic groups (block 1508), control returns to block 1502.

When there are no more combinations of V segments and demographic groups (block 1508), the example duration imputer 340 selects a demographic group d and a D segment i corresponding to an episode e (block 1510). The example duration imputer 340 determines whether there is a site census duration logged and no DP duration logged for the selected D segment (block 1512).

If there is a site census duration logged and no DP duration logged for the selected D segment (block 1512), the example duration imputer 340 imputes a duration $Dur_{d,e,i}$ for the selected demographic group d and the selected D segment i (block 1514). For example, the duration imputer 340 may apply the duration distribution $DurDistr_{d,e}$ for the selected demographic group d and the selected episode e to the site census duration $SCdur_{e,i}$ for the selected segment i of the selected episode e In the example of FIG. 16, the duration imputer 340 computes scaled duration 1622 for the D segment 1602 by applying the duration distribution ratio 1426 of FIG. 14 to the SC duration 1616 for monitored demographic groups 1620. The example impression imputer 338 determines the scaled duration 1622 for the segment 1602 as 16 for the demographic group D1 (e.g., 16=40*40.19%) and 17 for the demographic group D2 (e.g., 24=40*59.81%). Equation 18 below may be used to implement block 1514.

$$Dur_{d,e,i} = DurDistr_{d,e} * SCdur_{e,i} \qquad \text{(Equation 18)}$$

The duration imputer 340 determine whether there are additional combinations of D segments and demographic groups (block 1516). If there are additional combinations of D segments and demographic groups (block 1516), control returns to block 1510. When there are no more combinations of D segments and demographic groups (block 1516), the example instructions 1500 then end.

Calculation & Reporting of Audience Ratings Data at the Episode Level

Figure 17A:
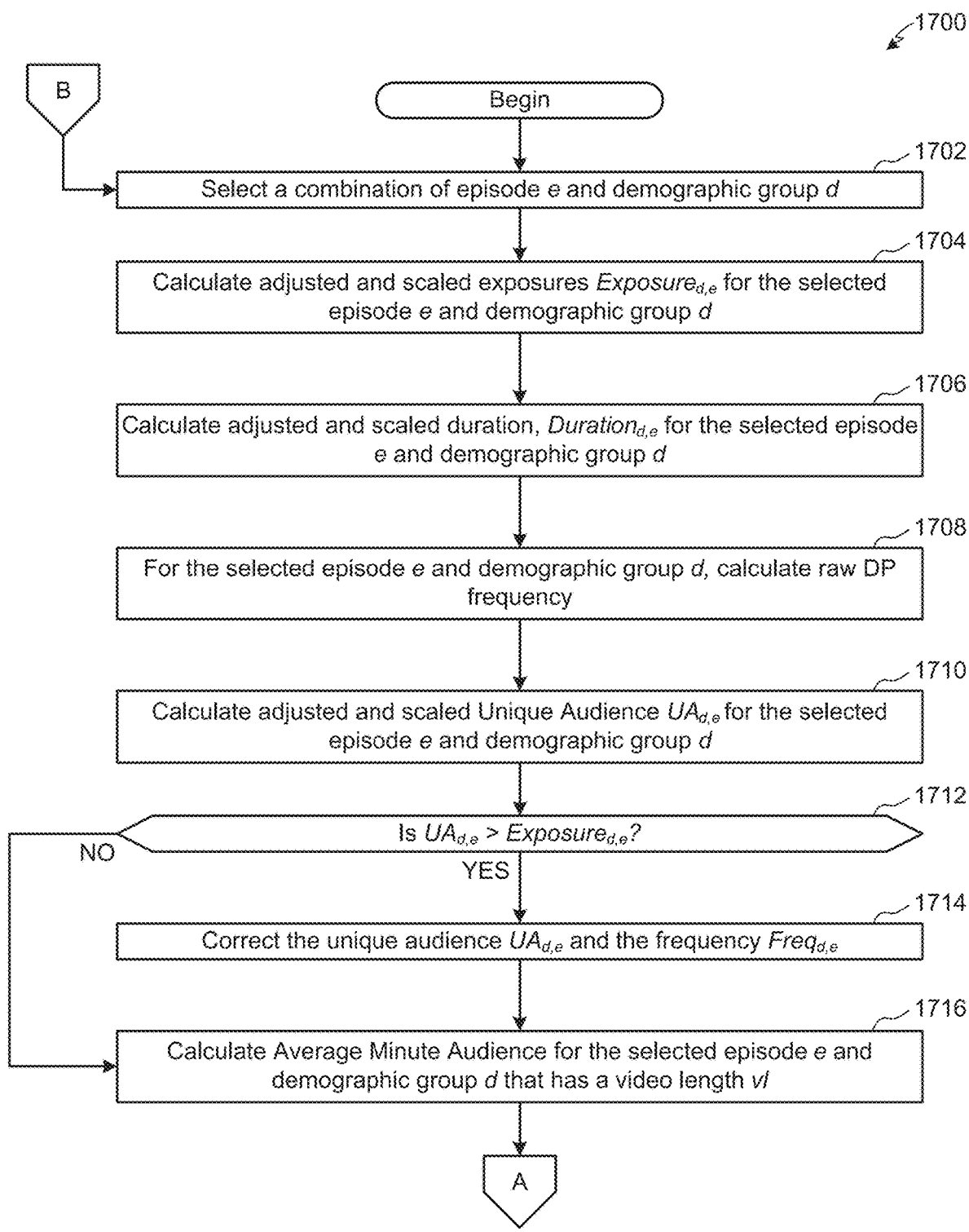
FIGS. 17A-17B show a flowchart representative of example machine readable instructions which may be executed to implement the audience data generator of FIGS. 1-3 to calculate ratings information at an episode level.
Figure 17B:
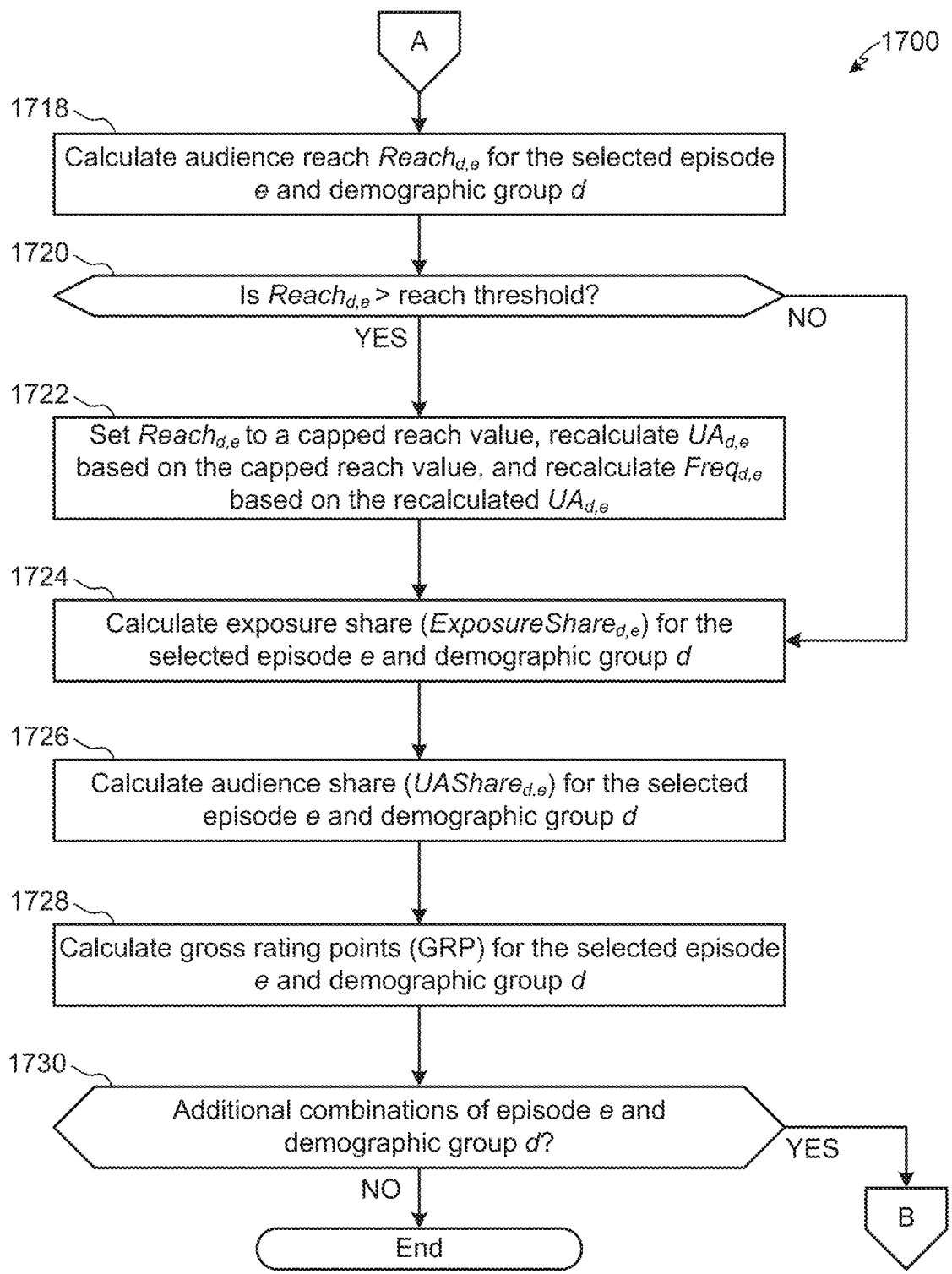

FIGS. 17A-17B show a flowchart representative of example machine readable instructions 1700 which may be executed to implement the audience data generator of FIGS. 1-3 to calculate ratings information at an episode level. The example instructions 1700 of FIGS. 17A-17B may be executed by the example ratings data generator 320 to calculate the adjusted and scaled audience ratings data at the episode level based on the adjusted and scaled segment level data (e.g., generated by the segment calibrator 314 by executing the instructions 1100 of FIG. 11) and imputed segment level data (e.g., generated by the segment imputer 318 by executing the instructions 1500 of FIG. 15).

FIG. 18 illustrates data 1800 showing an example generation of ratings information at an episode level. The example data 1800 of FIG. 18 includes example episodes 1802, 1804, 1806 for monitored demographic groups 1808 and programs 1810 and distributors 1812.

The example ratings data generator 320 of FIG. 3 selects a combination of episode e and demographic group d (block 1702). The selected episode e further corresponds to a program 1810 and distributor 1812.

The example total exposure data generator 342 calculates adjusted and scaled exposures $Exposure_{d,e}$ for the selected episode e and demographic group d (block 1704). For example, the adjusted and scaled exposures $Exposure_{d,e}$ may be the sum of adjusted and scaled impressions $Imp_{d,e,i}$ for the V segments i in the selected episode e, including estimated impressions for the V segments without DP impressions. In the example of FIG. 18, the total exposure data generator 342 calculates adjusted and scaled exposures 1814 for the episode 1802 by summing the impressions corresponding to the V segment 1202 of FIGS. 12A-12B and other V segments of the episode 1802. The example number of exposures adjusted and scaled exposures 1814 for the episode 1802 is 141 for the demographic group D1 and 192 for the demographic group D2. Equation 19 below may be used to implement block 1704. In Equation 19 below, k denotes the total number of V segments for the selected episode e.

$$Exposure_{d,e} = \sum_{i=1}^{k}(Imp_{d,e,i}) \qquad \text{(Equation 19)}$$

The example total duration data generator 344 calculates adjusted and scaled duration $Duration_{d,e}$ for the selected episode e and demographic group d (block 1706). For example, the adjusted and scaled duration $Duration_{d,e}$ may be the sum of adjusted and scaled duration $Dur_{d,e,i}$ for the D segments i in the selected episode e, including estimated duration for the D segments without DP duration. In the example of FIG. 18, the total duration data generator 344 calculates duration 1816 for the episode 1802 by summing the durations corresponding to the D segments 1204, 1206, 1208, and 1212 of FIGS. 12A-12B and other D segments of the episode 1802. The example total duration 1816 for the episode 1802 is 1322 for the demographic group D1 and 1967 for the demographic group D2. Equation 20 below may be used to implement block 1706. In Equation 20 below, k denotes the total number of D segments for the selected episode e.

$$Duration_{d,e} = \sum_{i=1}^{k}(Dur_{d,e,i}) \qquad \text{(Equation 20)}$$

The example frequency calculator 346 calculates calculate raw DP frequency for the selected episode e and demographic group d (block 1708). The example raw DP frequency may be the ratio of raw DP exposures $DPExposure_{d,e}$ and raw DP UA $rDPUA_{d,e}$. In the example of FIG. 18, the frequency calculator 346 calculates a frequency 1818 for the episodes 1802-1806 based on DP exposures 1820 and a raw DP UA 1822 (e.g., the example UA calculated as described above with reference to FIGS. 7 and 8). The frequency 1818 for the example episode 1802 is 1.22 for the demographic group D1 (e.g., 1.22=141/116) and 1.34 for the demographic group D2 (e.g., 1.34=129/96). Equation 21 below may be used to implement block 1708.

$$Freq_{d,e} = DPExposure_{d,e}/rDPUA_{d,e} \qquad \text{(Equation 21)}$$

The example audience adjuster 322 calculates adjusted and scaled unique audience $UA_{d,e}$ for the selected episode e and demographic group d (block 1710). For example, the adjusted and scaled unique audience $UA_{d,e}$ may be the ratio of the exposures $Exposure_{d,e}$ (e.g., from block 1704) and the frequency $Freq_{d,e}$ (e.g., from block 1708). In the example of FIG. 18, the audience adjuster 322 calculates adjusted and scaled UA 1824 for the episode 1802 as 117 for the demographic group D1 (e.g., 117=142/1.22) and 147 for the demographic group D2 (e.g., 147=198/1.34). Equation 22 below may be used to implement block 1710.

$$UA_{d,e} = Exposure_{d,e}/Freq_{d,e} \qquad \text{(Equation 22)}$$

The example audience data error corrector 348 determines whether the calculated UA $UA_{d,e}$ for the selected episode e and demographic group d is greater than the calculated exposures $Exposure_{d,e}$ for the selected episode e and demographic group d (block 1712). In the example of FIG. 18, the audience data error corrector 348 may determine whether the adjusted and scaled UA 1824 for an episode 1802 and demographic group D1 (e.g., 117) is more than the adjusted and scaled exposures 1814 (e.g., 142). If the calculated UA $UA_{d,e}$ is greater than the calculated exposures $Exposure_{d,e}$ (block 1712), the audience data error corrector 348 corrects the UA $UA_{d,e}$ and the exposures $Exposure_{d,e}$ for the selected episode e and demographic group d (block 1714). For example, the audience data error corrector 348 sets the UA $UA_{d,e}$ to be equal to the exposures $Exposure_{d,e}$ and sets the frequency based on the updated UA $UA_{d,e}$ (e.g., equal to 1).

After correcting the UA and frequency (block 1714), or if the calculated UA $UA_{d,e}$ is greater than the calculated exposures $Exposure_{d,e}$ for the selected episode e and demographic group d (block 1712), the example AMA data generator 350 calculates an average minute audience $AMA_{d,e}$ for the selected episode e and demographic group d that has a video length (duration) vl (block 1716). For example, the AMA data generator 350 calculates an AMA 1826 for the episode 1802 and the demographic group D1 based on the adjusted and scaled duration 1816, a population base 1828 of the demographic group D1, and an episode length 1830 of the episode. The example AMA 1826 is 8.81 for the example episode 1802 and the demographic group D1 (e.g., 8.81=(1322/(500*30))*100). Equation 23 below may be used to implement block 1716. In Equation 23, the base population $PopBase_d$ may be determined from a survey, a census estimate, and/or a third party source.

$$AMA_{d,e} = (Dur_{d,e}/(PopBase_d * vl_e)) \times 100 \qquad \text{(Equation 23)}$$

Turning to FIG. 17B, the example reach data generator 352 calculates audience reach $Reach_{d,e}$ for the selected episode e and demographic group d (block 1718). For example, the audience reach $Reach_{d,e}$ may be based on the unique audience $UA_{d,e}$ and a base population $PopBase_d$ for the demographic group d. In the example of FIG. 18, the example reach data generator 352 calculates a reach 1832 as 23.39% for the episode 1802 and the demographic group D1 based on the adjusted and scaled UA 1824 and the population base 1828 (e.g., 23.39%=117/500). Equation 24 below may be used to implement block 1718.

$$Reach_{d,e} = (UA_{d,e}/PopBase_d) \times 100 \qquad \text{(Equation 24)}$$

The example reach data generator 352 determines whether the calculated reach $Reach_{d,e}$ for the selected episode e and demographic group d exceeds a reach threshold (block 1720). The reach threshold may be, for example, a predetermined or dynamically calculated cap value. If the calculated reach $Reach_{d,e}$ exceeds the reach threshold (block 1720), the example reach data generator 352 sets the reach $Reach_{d,e}$ to a capped value, recalculates the unique audience $UA_{d,e}$ based on the capped reach value, and recalculates the frequency $Freq_{d,e}$ based on the recalculated unique audience (block 1722). In the example of FIG. 17, the reach data generator 352 determines the capped reach value by applying an upper bound exponential function.

For the purposes of illustration, an example reach threshold is 0.75, and an example capped reach value is 0.98. The example reach data generator 352 calculates the capped reach value using example Equation 25 below, recalculates the unique audience $UA_{d,e}$ based on the capped reach value using example Equation 26 below, and recalculates the frequency $Freq_{d,e}$ based on the recalculated unique audience using example Equation 27 below.

$$Reach_{d,e} = \text{Threshold} + (Reachcap - \text{Threshold}) * \qquad \text{(Equation 25)}$$
$$\left(1 - e^{(-(Reachd,e-Threshold)/(Reachcap-Threshold))}\right)$$

$$UA_{d,e} = Reach_{d,e} * PopBase_d \qquad \text{(Equation 26)}$$

$$Freq_{d,e} = Exposure_{d,e}/UA_{d,e} \qquad \text{(Equation 27)}$$

After recalculating the reach, the unique audience, and the frequency (block 1722), or if the reach is equal to or less than the threshold (block 1720), the example exposure share data generator 354 of FIG. 3 calculates exposure share (ExposureShare$_{d,e}$) for the selected episode e and demographic group d (block 1724). Equation 28 below may be used to implement block 1724. In Equation 28 below, D refers to the total number of the demographic groups d for which data is obtained for the selected episode e.

$$ExposureShare_{d,e} = \left(Exposures_{d,e} \Big/ \sum_{d=1}^{D}(Views_{d,e})\right) \times 100 \qquad \text{(Equation 28)}$$

The example audience share data generator 356 of FIG. 3 calculates audience share (UAShare$_{d,e}$) for the selected episode e and demographic group d (block 1726). Equation 29 below may be used to implement block 1726. In Equation 29 below, D refers to the total number of the demographic groups d for which data is obtained for the selected episode e.

$$UAShare_{d,e} = \left(UA_{d,e} \Big/ \sum_{d=1}^{D}(UA_{d,e})\right) \times 100 \qquad \text{(Equation 29)}$$

The example GRP data generator 358 calculates gross rating points (GRP) for the selected episode e and demographic group d (block 1728). Equation 30 below may be used to implement block 1728.

$$GRP_{d,e} = Freq_{d,e} \times Reach_{d,e} \qquad \text{(Equation 30)}$$

The example ratings data generator 320 determines whether there are additional combinations of episodes e and demographic groups d (block 1730). If there are additional combinations of episodes e and demographic groups d (block 1730), control returns to block 1702 to select another combination. When there are no more combinations of episodes e and demographic groups d (block 1730), the example instructions 1700 end.

Figure 19A:
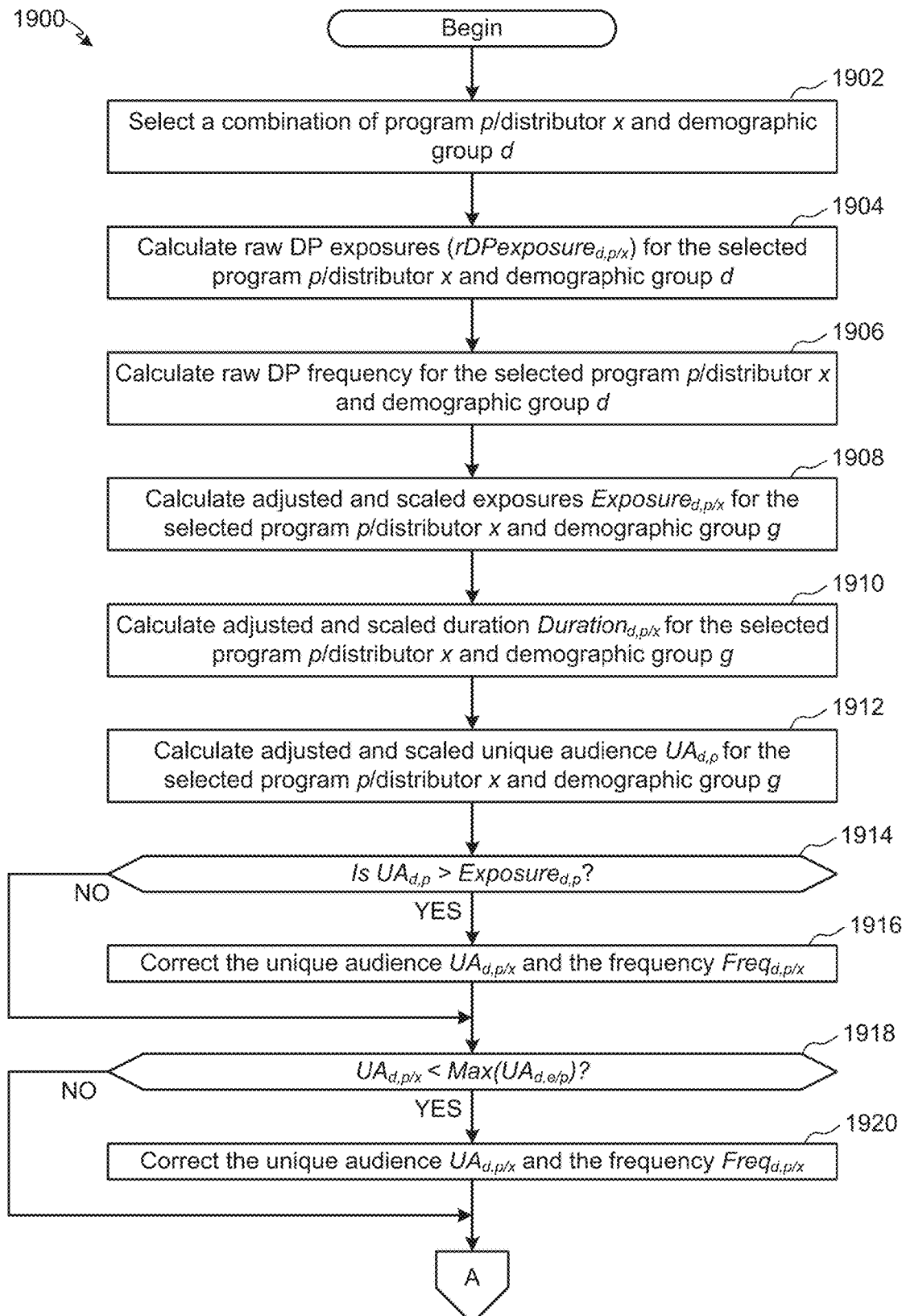
FIGS. 19A-19B show a flowchart representative of example machine readable instructions which may be executed to implement the audience data generator of FIGS. 1-3 to calculate ratings information at a program level and/or distributor level.
Figure 19B:
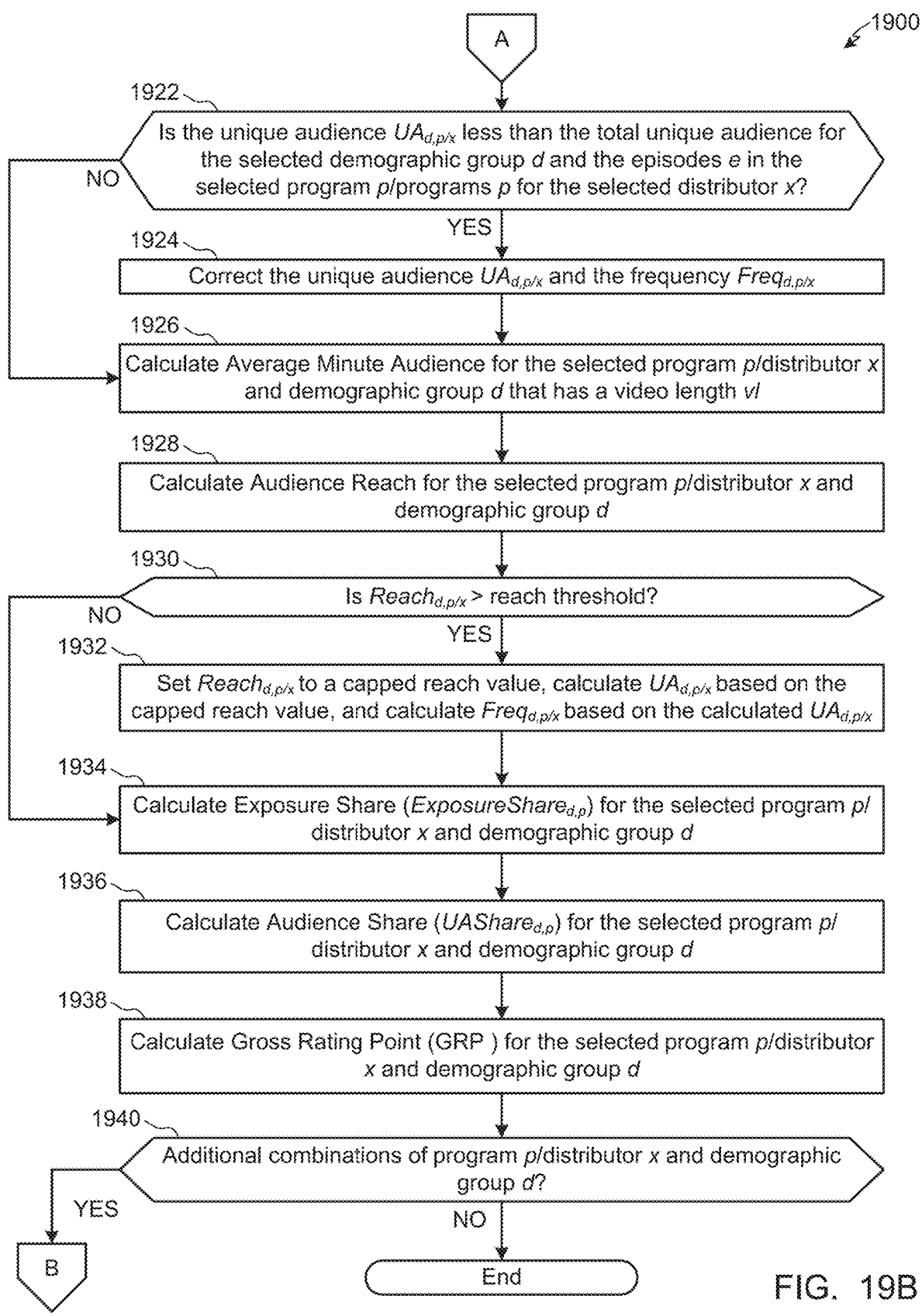

Calculation & Reporting of Audience Ratings Data at the Program/Distributor Levels FIGS. 19A-19B show a flowchart representative of example machine readable instructions 1900 which may be executed to implement the audience data generator of FIGS. 1-3 to calculate and/or report audience ratings data at a program level and/or at a distributor level. FIG. 20 illustrates an example generation of audience ratings data 2000 at a program level. The example data 2000 of FIG. 20 includes example programs 2002, 2004 for monitored demographic groups 2006 and distributors 2008. FIG. 21 illustrates an example generation of audience ratings data 2100 at a distributor level. The example data 2100 of FIG. 21 includes an example distributor 2102 for monitored demographic groups 2104.

The example ratings data generator 320 of FIG. 3 selects a combination of program p/distributor x and demographic group d (block 1902).

The example DP raw exposure aggregator 360 calculates raw DP exposures (rDPexposure$_{d,p/x}$) for the selected program p/distributor x and demographic group d (block 1904). For example, the DP raw exposure aggregator 360 may calculate the program level raw exposures rDPexposure$_{d,p/x}$ as the sum of rDPexposure$_{d,p/x,e/p}$ from the calibrated episode level data generated by executing the instructions 1700 of FIGS. 17A-17B. In the example of FIG. 20, the DP raw exposure aggregator 360 calculates raw DP exposures 2010 as a sum of exposures of the episodes in the respective programs 2002, 2004, per demographic group 2006. In the example of FIG. 21, the DP raw exposure aggregator 360 calculates raw DP exposures 2106 as a sum of exposures of the programs of the distributor 2102, per demographic group 2104. Equation 31 below may be used to implement block 1904. In Equation 31 below, E denotes the total number of episodes for program p, or P denotes the total number of programs for distributor x.

$$rDPExposure_{d,e} = \sum_{k=1}^{E/P}\left(rDPExposure_{d,p/x,e/p}\right) \qquad \text{(Equation 31)}$$

The example frequency calculator 346 calculates raw DP frequency for the selected program p/distributor x and demographic group d (block 1906). For example, the raw DP frequency may be the ratio of raw DP exposures rDPExposure$_{d,p/x}$ and raw DP unique audience rDPUA$_{d,p/x}$. Equation 32 below may be used to implement block 1906. In the example of FIG. 20, the example frequency calculator 346 determines a frequency 2012 based on the exposures 2010 and a raw DP UA 2014 (e.g., determined as described above with reference to the examples of FIGS. 7 and 9). The example frequency calculator 346 determine the frequency 2012 for the program 2002 as 2.3 for the demographic group D1 (e.g., 2.3=306/133) and 1.5 for the demographic group D2 (e.g., 1.5=324/212). In the example of FIG. 21, the example frequency calculator 346 determines a frequency 2108 based on the exposures 2106 and a raw DP UA 2110 (e.g., determined as described above with reference to the examples of FIGS. 7 and 10). The example frequency calculator 346 determine the frequency 2108 for the distributor 2102 as 2.36 for the demographic group D1 (e.g., 2.36=611/259) and 2.17 for the demographic group D2 (e.g., 2.17=674/311). The example DP unique audience is obtained from the unique audience rDPUA$_{d,p/x}$ from the redistributed program/distribution level generated by executing the instructions 700 of FIG. 7. Equation 32 below may be used to implement block 1906.

$$Freq_{d,p} = rDPExposure_{d,p/x}/rDPUA_{d,p/x} \qquad \text{(Equation 32)}$$

The example total exposure data generator 342 calculates adjusted and scaled exposures $Exposure_{d,p/x}$ for the selected program p/distributor x and demographic group g (block 1908). The example adjusted and scaled exposures $Exposure_{d,p/x}$ may be the sum of adjusted and scaled exposures for all episodes e in that program p or programs p by that distributor x. The total exposure data generator 342 calculates adjusted and scaled exposures 2016 of FIG. 20 based on the adjusted and scaled exposures for the episodes corresponding to the respective programs 2002, 2004 (e.g., based on the adjusted and scaled exposures 1814 of FIG. 18) and/or adjusted and scaled exposures 2112 of FIG. 21 based on the adjusted and scaled exposures 2016 of the programs for the distributor 2102. Equation 33 below may be used to implement block 1908. In Equation 33 below, E denotes the total number of episodes for program p, or P denotes the total number of programs for distributor x.

$$Exposure_{d,p/x} = \sum_{e=1}^{E/P} (Exposure_{d,p/x,e/p})  \quad \text{(Equation 33)}$$

The example total duration data generator 344 calculates adjusted and scaled duration $Duration_{d,p/x}$ for the selected program p/distributor x and demographic group g (block 1910). The example adjusted and scaled duration $Duration_{d,p/x}$ may be the sum of adjusted and scaled duration for all episodes e in that program p or programs p by that distributor x. The total duration data generator 344 calculates adjusted and scaled duration 2018 of FIG. 20 based on the adjusted and scaled duration for the episodes corresponding to the respective programs 2002, 2004 (e.g., based on the adjusted and scaled durations 1816 of FIG. 18) and/or adjusted and scaled duration 2114 of FIG. 21 based on the adjusted and scaled durations 2018 of the programs for the distributor 2102. Equation 34 below may be used to implement block 1910. In Equation 34 below, E denotes the total number of episodes for program p, or P denotes the total number of programs for distributor x.

$$Duration_{d,p/x} = \sum_{e=1}^{E/P} (Dur_{d,p/x,e/p})  \quad \text{(Equation 34)}$$

The example audience adjuster 322 adjusted and scaled unique audience $UA_{d,p}$ for the selected program p/distributor x and demographic group g (block 1912). For example, the adjusted and scaled unique audience $UA_{d,p}$ may be the ratio of $Exposure_{d,p/x}$ and $Freq_{d,p/x}$. In the example of FIG. 20, the audience adjuster 322 calculates adjusted and scaled UA 2020 using the adjusted and scaled exposures 2016 and the frequency 2012. For example, the audience adjuster 322 calculates the adjusted and scaled UA 2020 for the program 2002 to be 144 for the demographic group D1 (e.g., 144=331/2.3) and 350 for the demographic group D2 (e.g., 534/1.5). In the example of FIG. 21, the audience adjuster 322 calculates adjusted and scaled UA 2116 using the adjusted and scaled exposures 2112 and the frequency 2108. For example, the audience adjuster 322 calculates the adjusted and scaled UA 2116 for the distributor 2102 to be 320 for the demographic group D1 (e.g., 320=755/2.36) and 584 for the demographic group D2 (e.g., 584=1267/2.17). Equation 35 below may be used to implement block 1912.

$$UA_{d,p/x} = Exposure_{d,p/x}/Freq_{d,p/x}  \quad \text{(Equation 35)}$$

The example audience data error corrector 348 determines whether the calculated UA $UA_{d,p/x}$ for the selected program p/distributor x and demographic group dis greater than the calculated exposures $Exposure_{d,p/x}$ for the selected program p/distributor x and demographic group d (block 1914). If the calculated UA $UA_{d,p/x}$ is greater than the calculated exposures $Exposure_{d,p/x}$ (block 1914), the audience data error corrector 348 corrects the UA $UA_{d,p/x}$ and the exposures $Exposure_{d,p/x}$ for the selected program p/distributor x and demographic group d (block 1916). For example, the audience data error corrector 348 sets the UA $UA_{d,e}$ to be equal to the exposures $Exposure_{d,p/x}$ and sets the frequency based on the updated UA $UA_{d,p/x}$ (e.g., equal to 1).

After correcting the UA and frequency (block 1916), or if the calculated UA $UA_{d,p/x}$ is greater than the calculated exposures $Exposure_{d,p/x}$ for the selected program p/distributor x and demographic group d (block 1914), the example audience data error corrector 348 determines whether the unique audience for the selected program p/distributor x and demographic group dis less than a threshold (e.g., highest, maximum) unique audience $Max(UA_{d,e/p})$ across the selected demographic group d and the episodes e of the selected program p/programs p of the selected distributor x (block 1918). In the examples of FIGS. 20 and 21, the audience data error corrector 348 uses a threshold 2022 of 0.75.

If the unique audience for the selected program p/distributor x and demographic group dis less than the threshold (block 1918), the example audience data error corrector 348 corrects the unique audience $UA_{d,p/x}$ and the frequency $Freq_{d,p/x}$ (block 1920). For example, the audience data error corrector 348 sets the unique audience for the selected program p/distributor x and demographic group d to the threshold (e.g., highest, maximum) unique audience $Max(UA_{d,e/p})$, and sets the frequency based on the corrected unique audience and the exposures. Equations 36 and 37 below may be used to implement block 1920.

$$UA_{d,p/x} = Max(UA_{d,e/p})  \quad \text{(Equation 36)}$$

$$Freq_{d,p/x} = Exposure_{d,p/x}/UA_{d,p/x}  \quad \text{(Equation 37)}$$

Turning to FIG. 19B, After correcting the unique audience $UA_{d,p/x}$ based on the audience threshold (block 1920), or if the unique audience $UA_{d,p/x}$ is less than the audience threshold (block 1918), the example audience data error corrector 348 determines whether the unique audience $UA_{d,p/x}$ is less than the total unique audience for the selected demographic group d and the episodes e in the selected program p/programs p for the selected distributor x (block 1922). Equation 38 below may be used to implement the test of block 1922. In Equation 38, E denotes the total number of episodes for program p, or P denotes the total number of programs for distributor x.

$$UA_{d,p/x} < \sum_{e/p=1}^{E,P} (UA_{d,e/p})  \quad \text{(Equation 38)}$$

If the unique audience $UA_{d,p/x}$ is less than the total unique audience for the selected demographic group d and the episodes e in the selected program p/programs p for the selected distributor x (block 1922), the example audience data error corrector 348 corrects the unique audience and the frequency (block 1924). For example, the audience data error corrector 348 sets the unique audience to equal the total unique audience for the selected demographic group d and the episodes e in the selected program p/programs p for the selected distributor x and sets the frequency based on the corrected unique audience and the exposures. Equations 39 and 40 below may be used to implement block 1924. In Equation 38, E denotes the total number of episodes for program p, or P denotes the total number of programs for distributor x.

$$UA_{d,p/x} = \sum_{e/p=1}^{E,P} (UA_{d,e/p}) \quad \text{(Equation 39)}$$

$$Freq_{d,p} = Exposure_{d,p}/UA_{d,p} \quad \text{(Equation 40)}$$

After correcting the unique audience and frequency (block 1924), or if the unique audience $UA_{d,p/x}$ is equal to or greater than the total unique audience (block 1922), the example calculates an average minute audience $AMA_{d,e}$ for the selected episode e and demographic group d that has a video length vl (block 1926). For example, in FIG. 20 the AMA data generator 350 calculates an AMA 2024 for the program 2002 and the demographic group D1 based on the adjusted and scaled duration 2018, a population base 2026 of the demographic group D1, and an program length 2028 of the program 2002 (e.g., a total length of the episodes in the program 2002). The example AMA 2024 for the example program 2002 is 9.98 for the demographic group D1 (e.g., 9.98=(3143/(500*63))*100) and 14.35 for the demographic group D2 (e.g., 14.35=(5424/(600*63))*100). In the example of FIG. 21, the AMA data generator 350 calculates an AMA 2118 for the distributor 2102 and the demographic group D1 based on the adjusted and scaled duration 2114, a population base 2120 of the demographic group D1, and a total episode length 2122 for the distributor 2102 (e.g., a total length of the episodes for the distributor 2102). The example AMA 2118 for the example distributor 2102 is 11.74 for the demographic group D1 (e.g., 11.74=(6925/(500*118))*100) and 17.28 for the demographic group D2 (e.g., 17.28=(12237/(600*118))*100). Equation 41 below may be used to implement block 1926. In Equation 41, E denotes the total number of episodes for program p, or P denotes the total number of programs for distributor x.

$$AMA_{d,p} = \left(Dur_{d,p}/\left(PopBase_d \times \sum_{e=1}^{E/P}(vl_e)\right)\right) \times 100 \quad \text{(Equation 41)}$$

The example reach data generator 352 calculates audience reach $Reach_{d,p/x}$ for the selected demographic group d and the episodes e in the selected program p/programs p for the selected distributor x (block 1928). For example, the reach data generator 352 may calculate audience reach $Reach_{d,p/x}$ based on the unique audience $UA_{d,p/x}$ and a base population $PopBase_d$ for the demographic group d. The base population $PopBase_d$ may be determined from a survey, a census estimate, and/or a third party source. In the example of FIG. 20, the example reach data generator 352 calculates a reach 2030 as 28.73% for the program 2002 and the demographic group D1 based on the adjusted and scaled UA 2020 and the population base 2026 (e.g., 28.73%=144/500) and 58.30% for the program 2002 and the demographic group D2 (e.g., 58.30%=350/600). In the example of FIG. 21, the example reach data generator 352 calculates a reach 2124 as 64.05% for the distributor 2102 and the demographic group D1 based on the adjusted and scaled UA 2116 and the popula-tion base 2120 (e.g., 64.05%=320/500) and 97.37% for the distributor 2102 and the demographic group D2 (e.g., 97.37%=584/600). Equation 42 below may be used to implement block 1928.

$$Reach_{d,p/x} = (UA_{d,p/x}/PopBase_d) \times 100 \quad \text{(Equation 42)}$$

The example reach data generator 352 determines whether the calculated reach $Reach_{d,p/x}$ for the selected demographic group d and the episodes e in the selected program p/programs p for the selected distributor x exceeds a reach threshold (block 1930). The reach threshold may be, for example, a predetermined or dynamically calculated cap value. In the examples of FIGS. 20 and 21, the reach data generator 352 uses a reach cap 2032 of 0.98. If the calculated reach $Reach_{d,p/x}$ exceeds the reach threshold (block 1920), the example reach data generator 352 sets the reach $Reach_{d,p/x}$ to a capped value, recalculates the unique audience $UA_{d,p/x}$ based on the capped reach value, and recalculates the frequency $Freq_{d,p/x}$ based on the recalculated unique audience (block 1932). In the example of FIG. 19, the reach data generator 352 determines the capped reach value by applying an upper bound exponential function.

The example reach data generator 352 calculates the capped reach value (e.g., the reach 2030) using example Equation 43 below, recalculates the unique audience $UA_{d,e}$ (e.g., the adjusted and scaled UA 2020) based on the capped reach value using example Equation 44 below, and recalculates the frequency $Freq_{d,e}$ (e.g., the frequency 2012) based on the recalculated unique audience using example Equation 45 below.

$$Reach_{d,p/x} = \text{Threshold} + (\text{Reachcap} - \text{Threshold}) * \quad \text{(Equation 43)}$$
$$\left(1 - e^{(-(Reachd,p/x - Threshold)/(Reachcap - Threshold))}\right)$$

$$UA_{d,p/x} = Reach_{d,p/x} * PopBase_d \quad \text{(Equation 44)}$$

$$Freq_{d,p/x} = Exposure_{d,p/x}/UA_{dp/x} \quad \text{(Equation 45)}$$

After recalculating the reach, the unique audience, and the frequency (block 1932), or if the reach is equal to or less than the threshold (block 1930), the example exposure share data generator 354 of FIG. 3 calculates exposure share ($ExposureShare_{d,p/x}$) for the selected demographic group d and the episodes e in the selected program p/programs p for the selected distributor x (block 1934). Equation 46 below may be used to implement block 1934. In Equation 46 below, D refers to the total number of the demographic groups d for which data is obtained for the selected episode e.

$$ExposureShare_{d,p/x} = \quad \text{(Equation 46)}$$
$$\left(Exposures_{d,p/x} \Big/ \sum_{d=1}^{D} (Views_{d,p/x})\right) \times 100$$

The example audience share data generator 356 of FIG. 3 calculates audience share ($UAShare_{d,p/x}$) for the selected demographic group d and the episodes e in the selected program p/programs p for the selected distributor x (block 1936). Equation 47 below may be used to implement block 1936. In Equation 47 below, D refers to the total number of the demographic groups d for which data is obtained for the selected program p or distributor x.

$$UAShare_{d,p/x} = \left(UA_{d,p/x} \Big/ \sum_{d=1}^{D} (UA_{d,p/x})\right) \times 100 \quad \text{(Equation 47)}$$

The example GRP data generator 358 calculates gross rating points (GRP) for the selected demographic group d and the episodes e in the selected program p/programs p for the selected distributor x (block 1938). Equation 30 below may be used to implement block 1938.

$$GRP_{d,e} = Freq_{d,e} \times Reach_{d,e} \quad \text{(Equation 48)}$$

The example ratings data generator 320 determines whether there are additional combinations of programs p/distributors x and demographic groups d (block 1940). If there are additional combinations of programs p/distributors x and demographic groups d (block 1940), control returns to block 1902 to select another combination. When there are no more combinations of programs p/distributors x and demographic groups d (block 1940), the example instructions 1900 end.

Figure 22:
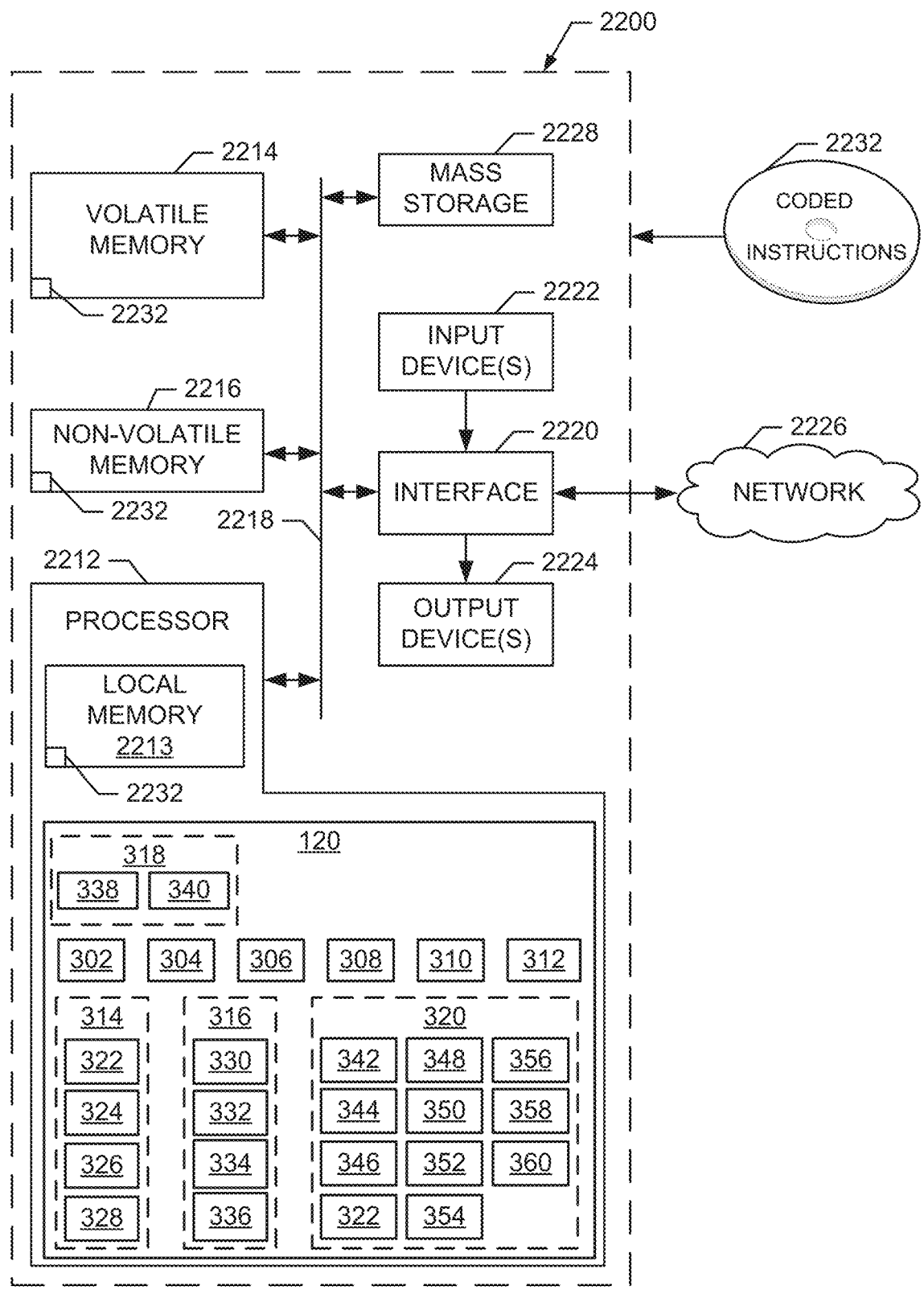
FIG. 22 is a block diagram of an example processor platform capable of executing the instructions of FIGS. 4, 5, 7, 11, 13, 15, 17A-17B, and 19A-19B to implement the audience data generator of FIGS. 1, 2, and/or 3.

FIG. 22 is a block diagram of an example processor platform 2200 capable of executing the instructions of FIGS. 4, 5, 7, 11, 13, 15, 17A-17B, and 19A-19B to implement the audience data generator 120 of FIGS. 1, 2, and/or 3. The processor platform 2200 can be, for example, a server, a personal computer, or any other type of computing device.

The processor platform 2200 of the illustrated example includes a processor 2212. The processor 2212 of the illustrated example is hardware. For example, the processor 2212 can be implemented by one or more integrated circuits, logic circuits, microprocessors or controllers from any desired family or manufacturer.

The example processor 2212 of FIG. 22 may implement the example segment data manager 302, the example episode data manager 304, the example program data manager 306, the example distributor data manager 308 may call on the demographic distributor 312, the segment calibrator 314, the episode calibrator 316, the segment imputer 318, and/or the ratings data generator 320, the audience adjuster 322, the impressions adjuster 324, the impression scaler 326, and the impression duration data generator 328, the example episode exposure data generator 330, the example episode duration data generator 332, the example exposure distribution data generator 334, and the example duration distribution data generator 336, the example impression imputer 338, and the example duration imputer 340, the example total exposure data generator 342, the example total duration data generator 344, the example frequency calculator 346, the example audience data error corrector 348, the example AMA data generator 350, the example reach data generator 352, the example exposure share data generator 354, the example audience share data generator 356, the example GRP data generator 358, the example DP raw exposure aggregator 360 and/or, more generally, the example audience data generator 120.

The processor 2212 of the illustrated example includes a local memory 2213 (e.g., a cache). The processor 2212 of the illustrated example is in communication with a main memory including a volatile memory 2214 and a non-volatile memory 2216 via a bus 2218. The volatile memory 2214 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 2216 may be implemented by flash memory and/or any other desired type of memory device. Access to the main memory 2214, 2216 is controlled by a memory controller.

The processor platform 2200 of the illustrated example also includes an interface circuit 2220. The interface circuit 2220 may be implemented by any type of interface standard, such as an Ethernet interface, a universal serial bus (USB), and/or a PCI express interface.

In the illustrated example, one or more input devices 2222 are connected to the interface circuit 2220. The input device(s) 2222 permit(s) a user to enter data and commands into the processor 2212. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 2224 are also connected to the interface circuit 2220 of the illustrated example. The output devices 2224 can be implemented, for example, by display devices (e.g., a light emitting diode (LED), an organic light emitting diode (OLED), a liquid crystal display, a cathode ray tube display (CRT), a touchscreen, a tactile output device, a light emitting diode (LED), a printer and/or speakers). The interface circuit 2220 of the illustrated example, thus, typically includes a graphics driver card, a graphics driver chip or a graphics driver processor.

The interface circuit 2220 of the illustrated example also includes a communication device such as a transmitter, a receiver, a transceiver, a modem and/or network interface card to facilitate exchange of data with external machines (e.g., computing devices of any kind) via a network 2226 (e.g., an Ethernet connection, a digital subscriber line (DSL), a telephone line, coaxial cable, a cellular telephone system, etc.).

The processor platform 2200 of the illustrated example also includes one or more mass storage devices 2228 for storing software and/or data. Examples of such mass storage devices 2228 include floppy disk drives, hard drive disks, compact disk drives, Blu-ray disk drives, RAID systems, and digital versatile disk (DVD) drives.

The coded instructions 2232 of FIGS. 4, 5, 7, 11, 13, 15, 17A-17B, and 19A-19B may be stored in the mass storage device 2228, in the volatile memory 2214, in the non-volatile memory 2216, and/or on a removable tangible computer readable storage medium such as a CD or DVD.

From the foregoing, it will be appreciated that the above disclosed methods, apparatus and articles of manufacture provide a solution to the problem of inaccuracies due to techniques used in online audience measurement. Benefits to online audience measurement, which is an inherently network-based technology, obtained from disclosed example methods, apparatus, and articles of manufacture include a reduction in required network communications that would be necessary to attribute to demographic groups those impressions that are not identifiable by one or more database proprietors. For example, disclosed examples avoid transmitting queries to secondary database proprietors and/or reduce processing and network resources used by the mobile devices as part of the online audience measurement techniques. At the same time, the improved accuracy of ratings information that can be generated using disclosed examples permits a more efficient and more beneficial distribution of advertising resources to viewers of online media by providing rapid and, more importantly, accurate online audience measurement that enables advertisers to change distributions of advertising resources in response to audience measurement information.

Disclosed examples also improve the accuracy of audience measurement for Internet-delivered media such as streaming videos by correcting for measurement errors arising from problems inherent to computer networks. For example, beacon requests and/or other messages described herein can be dropped or otherwise not delivered to the intended destination (e.g., audience measurement entity, a database proprietor, etc.), which in at least some instances can lead to non-negligible measurement bias. Disclosed examples improve the accuracy of audience measurement by correcting for errors arising from transmitting and receiving beacon requests and/or other messages over a public network such as the Internet by, for example, imputing impressions and/or duration to demographic groups when there is a mismatch between impressions observed by an audience measurement entity and impressions observed by a database proprietor.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A computing system comprising:
   at least one processor;
   and
   a non-transitory computer-readable medium having stored therein instructions that, upon execution by the at least one processor, cause the computing system to:
   access first network communications received via a first server associated with an audience measurement entity, the first network communications including first beacon request messages, the first beacon request messages indicating first impressions corresponding to media accessed on devices, the first beacon request messages identifying time segments of the media presented at the devices, the time segments corresponding to site census impression counts;
   cause the first server to send second network communications to the devices, the second network communications including first re-direct response messages redirecting the devices to a database proprietor; and
   in response to not receiving demographic information corresponding to the time segments of the media, for ones of demographic groups, calculate demographic impression counts based on exposure distribution ratios and the site census impression counts.

2. The computing system of claim 1, wherein the instructions, upon execution by the at least one processor, further cause the computing system to calculate the demographic impression counts based on ones of the exposure distribution ratios corresponding to ratios of exposures of the media that are attributable to corresponding ones of the demographic groups.

3. The computing system of claim 2, wherein the instructions, upon execution by the at least one processor, further cause the computing system to determine the exposure distribution ratios based on proportions of exposures attributable to ones of the demographic groups for exposures of the media for which the database proprietor has access to demographic information.

4. The computing system of claim 1, wherein the instructions, upon execution by the at least one processor, further cause the computing system to calculate a product of the exposure distribution ratios and the site census impression counts to determine the demographic impression counts.

5. The computing system of claim 1, wherein the instructions, upon execution by the at least one processor, further cause the computing system to calculate demographic durations for ones of the demographic groups based on duration distribution ratios and site census durations.

6. The computing system of claim 5, wherein instructions, upon execution by the at least one processor, further cause the computing system to calculate the demographic durations based on ones of the duration distribution ratios corresponding to ratios of durations of the media that are attributable to corresponding ones of the demographic groups.

7. The computing system of claim 6, wherein the instructions, upon execution by the at least one processor, further cause the computing system to determine the duration distribution ratios based on proportions of durations attributable to ones of the demographic groups for durations of exposures to the media for which the database proprietor has access to demographic information.

8. At least one non-transitory computer readable storage medium comprising instructions that, upon execution, cause at least one processor to:
   access first network communications received via a first server associated with an audience measurement entity, the first network communications including first beacon request messages, the first beacon request messages indicating first impressions corresponding to media accessed on devices, the first beacon request messages identifying time segments of the media presented at the devices, the time segments corresponding to site census impression counts or site census durations;
   cause the first server to send second network communications to the devices, the second network communications including first re-direct response messages redirecting the devices to a database proprietor; and
   in response to not receiving demographic information corresponding to the time segments of the media, for ones of demographic groups, calculate demographic impression counts based on exposure distribution ratios and the site census impression counts.

9. The at least one non-transitory computer readable storage medium of claim 8, wherein the instructions cause the at least one processor to calculate the demographic impression counts based on ones of the exposure distribution ratios corresponding to ratios of exposures of the media that are attributable to corresponding ones of the demographic groups.

10. The at least one non-transitory computer readable storage medium of claim 9, wherein the instructions cause the at least one processor to determine the exposure distribution ratios based on proportions of exposures attributable to ones of the demographic groups for exposures of the media for which the database proprietor has access to demographic information.

11. The at least one non-transitory computer readable storage medium of claim 8, wherein the instructions cause the at least one processor to calculate a product of the exposure distribution ratios and the site census impression counts to determine the demographic impression counts.

12. The at least one non-transitory computer readable storage medium of claim 8, wherein the instructions cause the at least one processor to calculate demographic durations for ones of the demographic groups based on duration distribution ratios and site census durations.

13. The at least one non-transitory computer readable storage medium of claim 12, wherein instructions cause the at least one processor to calculate the demographic durations based on ones of the duration distribution ratios corresponding to ratios of durations of the media that are attributable to corresponding ones of the demographic groups.

14. The at least one non-transitory computer readable storage medium of claim 13, wherein the instructions cause the at least one processor to determine the duration distribution ratios based on proportions of durations attributable to ones of the demographic groups for durations of exposures to the media for which the database proprietor has access to demographic information.

15. A method, comprising:
accessing, by executing instructions with at least one processor, first network communications received via a first server associated with an audience measurement entity, the first network communications including first beacon request messages, the first beacon request messages indicating first impressions corresponding to media accessed on devices, the first beacon request messages identifying time segments of the media presented at the devices, the time segments corresponding to site census impression counts;
causing, by executing instructions with the at least one processor, the first server to send second network communications to the devices, the second network communications including first re-direct response messages redirecting the devices to a database proprietor; and
in response not receiving to demographic information corresponding to the time segments of the media, for ones of demographic groups, calculating, by executing instructions with the at least one processor, demographic impression counts based on exposure distribution ratios and the site census impression counts.

16. The method of claim 15, further including calculating, by executing instructions with the at least one processor, the demographic impression counts based on ones of the exposure distribution ratios corresponding to ratios of exposures of the media that are attributable to corresponding ones of the demographic groups.

17. The method of claim 16, further including determining, by executing instructions with the at least one processor, the exposure distribution ratios based on proportions of exposures attributable to ones of the demographic groups for exposures of the media for which the database proprietor has access to demographic information.

18. The method of claim 15, further including calculating, by executing instructions with the at least one processor, a product of the exposure distribution ratios and the site census impression counts to determine the demographic impression counts.

19. The method of claim 15, further including calculating, by executing instructions with the at least one processor, demographic durations for ones of the demographic groups based on duration distribution ratios and site census durations.

20. The method of claim 19, further including calculating, by executing instructions with the at least one processor, the demographic durations based on ones of the duration distribution ratios corresponding to ratios of durations of the media that are attributable to corresponding ones of the demographic groups.

21. The method of claim 20, further including determining, by executing instructions with the at least one processor, the duration distribution ratios based on proportions of durations attributable to ones of the demographic groups for durations of exposures to the media for which the database proprietor has access to demographic information.

* * * * *